US012583675B2

(12) United States Patent
Parks et al.

(10) Patent No.: US 12,583,675 B2
(45) Date of Patent: Mar. 24, 2026

(54) TRACK ASSEMBLY FOR A STORAGE SYSTEM

(71) Applicant: Ocado Innovation Limited, Hatfield (GB)

(72) Inventors: Ian Parks, St Albans (GB); Nicholas Mclarney, Glasgow (GB)

( * ) Notice: Subject to any disclaimer, the term of this patent is extended or adjusted under 35 U.S.C. 154(b) by 0 days.

(21) Appl. No.: 19/203,086

(22) Filed: May 8, 2025

(65) Prior Publication Data

US 2025/0270041 A1 Aug. 28, 2025

Related U.S. Application Data

(63) Continuation of application No. PCT/EP2023/081537, filed on Nov. 10, 2023.

(30) Foreign Application Priority Data

Nov. 11, 2022 (GB) ..................................... 2216881
Nov. 11, 2022 (GB) ..................................... 2216891

(51) Int. Cl.
*B65G 1/04* (2006.01)
*B65G 1/06* (2006.01)
*B65G 43/00* (2006.01)

(52) U.S. Cl.
CPC ......... *B65G 1/0464* (2013.01); *B65G 1/0478* (2013.01); *B65G 1/0492* (2013.01); *B65G 1/065* (2013.01); *B65G 43/00* (2013.01)

(58) Field of Classification Search
CPC ...... B65G 1/0464; B65G 1/0478; B65G 1/02; B65G 1/0492; B65G 2201/0235; B65G 43/00; B61B 3/00
See application file for complete search history.

(56) References Cited

U.S. PATENT DOCUMENTS 12,004,646 B2 * 6/2024 Straatsma ............ A47B 47/027
2013/0129454 A1 * 5/2013 Salichs .................. B65G 1/026
414/277

(Continued)

FOREIGN PATENT DOCUMENTS

FR       2590289 A1    11/1985
WO    2018146304 A1    8/2018
WO    2022034187 A1    2/2022

OTHER PUBLICATIONS

PCT International Search Report and Written Opinion of International Patent Application PCT/EP2023/081537, mailed Feb. 5, 2024, 11 pages, International Searching Authority (EPO).

(Continued)

*Primary Examiner* — Zachary L Kuhfuss
(74) *Attorney, Agent, or Firm* — Gregory Matt McCloskey

(57) ABSTRACT

A track system for a storage and retrieval system comprising one or more load handling devices operable on the track system is provided. The track system comprises a plurality of tracks arranged in a grid pattern and a plurality of track supports arranged in a grid pattern comprising a first set of track supports extending in a first direction and a second set of track supports extending in a second direction being substantially perpendicular to the first direction. Each of the plurality of track supports being formed from a sheet metal blank folded along a plurality of bend lines. The first set of track supports intersects the second set of track supports by the second set of track supports being received within one or more cut-outs in the first set of track supports at one or more nodes in the track system.

9 Claims, 30 Drawing Sheets

(56)     References Cited

U.S. PATENT DOCUMENTS

| | | |
|---|---|---|
| 2023/0128175 A1 | 4/2023 | Phaneuf et al. |
| 2023/0303326 A1 | 9/2023 | Cogley et al. |
| 2025/0066120 A9 | 2/2025 | Cogley et al. |

OTHER PUBLICATIONS

Combined Search and Examination Report issued on May 10, 2023 by the UK Intellectual Property Office in corresponding GB Application No. 2216881.9 (6 pages) corresponding to Applicant's U.S. Appl. No. 19/203,086.

Combined Search and Examination Report issued on May 3, 2024 by the UK Intellectual Property Office in corresponding GB Application No. 2317297.6 (5 pages) corresponding to Applicant's U.S. Appl. No. 19/203,086.

* cited by examiner (a)

(b)

56

64

58

60

62

180

160b

160a

TRACK ASSEMBLY FOR A STORAGE SYSTEM

CROSS-REFERENCE TO RELATED APPLICATIONS

This Application is a continuation of PCT International Patent Application No. PCT/EP2023/081537, filed on Nov. 10, 2023, which claims priority to UK Patent Application No. GB2216881.9, filed Nov. 11, 2022, and UK Patent Application No. GB2216891.8, filed Nov. 11, 2022, the entire contents of each of which are hereby incorporated by reference.

TECHNICAL FIELD

The present invention relates to the field of a storage or fulfilment system in which stacks of bins or containers are arranged within a grid framework structure, more specifically to a track system configured to guide one or more load handling devices operative to move one or more containers stored in the storage or fulfilment system.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A system of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. The grid framework structure is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the grid framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal grid members 18 is arranged perpendicularly to a second set of parallel horizontal members 20 in a grid pattern to form a plurality of horizontal grid structures 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 comprises a grid or grid structure 15 which includes rails or tracks 22 arranged in a grid pattern across the top of the stacks 12 to define a track system. Referring additionally to FIG. 3, the rails or tracks 22 guide a plurality of load handling devices 30. The track system comprises a first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

The upright columns of the grid framework structure are interconnected at their top ends by the rails or tracks intersecting in the grid. The intersections of the rails or tracks in the grid structure are generally termed 'nodes' of the grid structure. Typically, the first and second set of rails comprise individual elongated rail or track sections that are interconnected together in the first and second direction at the interconnections where the track or rail sections meet at the top ends of the upright columns. The rails or tracks typically comprise an elongated element which is profiled to guide a load handling device on the grid structure and are typically profiled to provide either a single track surface so as to allow a single load handling device to travel on the track, or a double track so as to allow two load handling devices to pass each other on the same track. In the case where the elongated element is profiled to provide a single track, the track comprises opposing lips (one lip on one side of the track and another lip at the other side of the track) along the length of the track to guide or constrain each wheel from lateral movement on the track. In the case where the profile of the elongated element is a double track, the track comprises two pairs of lips along the length of the track to allow the wheels of adjacent load handling devices to pass each other in both directions on the same track. To provide two pairs of lips, the track typically comprises a central ridge or lip and a lip either side of the central ridge. In all cases, when traversing on the grid structure, the wheels of the load handling device are constrained on both sides or faces of the wheels of the load handling device.

The track or rail can be a separate component to the grid member (referred to as a 'track support') or alternatively, the track is integrated into the grid member as a single body, i.e. forms part of the grid member. For example, each of the first and second sets of horizontal grid members 18, 20 of the grid structure can function as a track support and the first and second sets of tracks of the track system can be mounted to the grid structure for guiding the load handling devices in two dimensions on the grid structure.

WO2018/146304 (Autostore Technology AS) teaches a rail arrangement for wheeled vehicles in a storage system, where the rail arrangement comprises a first set of parallel rails and a second set of parallel rails. The first and second sets of parallel rails form a grid where the second set is arranged perpendicular to the first set and intersect the first set at their crossroads, thus forming a grid of parallel rails. The crossroads of the intersecting rails correspond to the interconnections of the upright columns. Each of the rails of both sets of rails comprises two parallel tracks adapted for guiding the wheels of the vehicles or load handling devices. The rails or tracks comprise a number of longitudinal segments or sections with two edge ridges running along each longitudinal edge of the longitudinal segments and a central ridge running parallel with the edge ridges. The area between the ridges forms the tracks for receiving and guiding the wheels of the vehicles. The width of the central ridge is adapted to ensure that two vehicles can pass each other when running on the tracks in different directions on the same segment. The edge ridges of each intersecting rail are in contact with each other, forming a corner ridge. The corner ridges are arranged tightly connected in order to prevent the vehicle from snagging at the joints. In order for the vehicles have a smooth drive across the intersections, the corner ridges are rounded at the insides.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction, and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction on the grid.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 41, in the lower part. The recess is sized to accommodate the container 10 when it is lifted by the crane mechanism, as shown in FIGS. 5(*a* and *b*). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

To ensure stability of the grid framework structure, prior art storage systems are largely dependent on various supports and bracing arranged within or at least partly along the periphery of the grid framework structure. However, the use of various supports and bracing (anti-movement braces) to stabilize the grid framework structure from internal and external forces is disadvantageous for a number of reasons.

The grid framework structure occupies space or area which could be utilized to store containers, in that it prevents optimum usage of available space or area for the storage of containers. The need of a supporting structure may limit the available options for positioning of the grid framework structure since any auxiliary grid supporting structure often requires connection to a surrounding structure such as the inner walls of a building. The requirement of a supporting structure to stabilize the grid framework structure is generally not cost efficient and occupies useful storage space.

To erect the grid framework structure in the art, a plurality of vertical uprights are individually positioned one piece at a time in a grid-like pattern on the ground. The assembling of individual vertical uprights together one piece at a time is sometimes referred to as "stick-built" structures. The "stick-built" approach of the assembling the grid framework structure requires numerous time-consuming adjustments to be made for reliable operation of the robotic load handling devices on the tracks. The height of the vertical uprights and thus the level of the grid mounted thereon is adjusted by one or more adjustable feet at the base or bottom end of each of the vertical uprights. A sub-group of the vertical uprights are braced together to provide structural stability to the grid framework structure. The vertical uprights are interconnected at their top ends by grid members so that the grid members adopt the same grid pattern as the vertical uprights, i.e. the vertical uprights support the grid members at the point or node where each of the grid members intersect in the grid pattern. For the purpose of explanation of the present invention, the points or junctions where the grid members intersect or are interconnected constitute the nodes of the grid structure and correspond to the area where the grid structure is supported by a vertical upright. The resultant grid framework structure can be considered as a free standing rectilinear assemblage of upright columns supporting the grid formed from intersecting horizontal grid members, i.e. a four wall shaped framework.

The arrangement of the vertical uprights provides multiple vertical storage columns for the storage of one or more containers in a stack. The vertical uprights help to guide the grabber device of the lifting mechanism as the grabber device engages with a container within the grid framework structure and is lifted towards the load handling device operative on the grid. The size of the grid framework structure and thus the ability to store containers containing different items or stock keeping units (SKUs) is largely dependent on the number of vertical uprights spanning over a given footprint of the grid framework structure. However, one of the biggest bottlenecks in the building of a fulfilment or distribution center is the erection of the grid framework structure. The time and cost to assemble the grid framework structure represents a huge proportion of the time and cost to build a fulfilment or distribution center.

Further, to erect the track system in the art, the rails or tracks are extruded from metal, e.g. aluminum, and multiple rail or track sections are necessary to build the track system. The greater the number of rails or track sections necessary to build the track, the more complicated the assembly of the track system. In a majority of cases, there is a two to one relationship between the number of rail or track sections or segments at each of the nodes or the intersections of the track or rail sections in the grid framework structure—in the sense that multiple rail or track sections are connected together at each node of the grid structure. For example, in WO 2018/146304 (Autostore Technology AS), when making the intersections between the first and second sets of rails or tracks, the second set of rails or tracks all comprise a recess into which the first set of rails or tracks may be arranged. Additionally, to provide a plurality of rectangular or square shaped grid cells, multiple different sized track or rail sections are connected together in the grid structure. For example, for each grid cell there is a rail or track section extending in one direction of one length and another track or rail section extending in a second direction of a different length. The different lengths of the rail or track sections meet at a node in the grid structure where they intersect. The need to have different lengths of rail or track sections complicates the assembly of the track or rail sections in a grid pattern.

A track or rail system is thus required which requires the use of a smaller number of rail or track sections when assembling the track and allows easy assembly.

This application claims priority from GB application number 2216881.9 filed 11 Nov. 2022 and GB application number 2216891.8 filed 11 Nov. 2022, the contents being herein incorporated by reference.

SUMMARY

Aspects are set out in the accompanying claims.

A track system for a storage and retrieval system comprising one or more load handling devices operable on the track system is provided. The track system comprises a plurality of tracks upon which the load handling device may move on a grid structure, the plurality of tracks being arranged in a grid pattern to define a grid structure lying in a horizontal plane, each of the plurality of tracks is subdivided into a plurality of elongated track elements; wherein each of the plurality of elongated track elements is formed from a sheet metal blank comprising at least two bend lines to form a substantially U-shaped cross section having a top and bottom flange and a vertical element extending between the top and bottom flanges, wherein one of more of the plurality of tracks is integrated into the top flange.

A track system for a storage and retrieval system comprising one or more load handling devices operable on the track system, the track system comprising a plurality of tracks arranged in a grid pattern comprising a plurality of grid cells upon which the load handling device may move on a grid structure, the plurality of tracks being arranged in a grid pattern to define a grid structure lying in a horizontal plane, each of the plurality of tracks subdivided into a plurality of elongated track elements; wherein the track system further comprises a track support structure comprising a plurality of track supports arranged in a grid pattern corresponding to the grid pattern of the track system, wherein each of the plurality of track supports is formed from a sheet metal blank comprising at least two bend lines to form a substantially U-shaped cross section having a top and bottom flange and a vertical element extending between the top and bottom flanges, wherein one or more of the plurality of tracks is mounted onto the track support structure.

As described above, the track system may either comprise elongated track elements in which a track is integrated into a top flange of a substantially U-shaped cross section formed from a sheet metal blank, or a track which is separate to and mountable to a track support having a substantially U-shaped cross section formed from a sheet metal blank. Specifically, the separate track may be mountable to a top flange of the U-shaped cross section of the track support structure. Thus in both track systems, a sheet metal blank is used to form a substantially U-shaped cross section.

Sheet metal is versatile and can be processed in a variety of ways, such as bending, punching, curling, stamping etc.

By virtue of the metal being in sheet form, a uniform thickness is also guaranteed before processing. Sheet metal is durable, has a high strength-to-weight ratio and good malleability which enables it to be formed into a variety of different configurations. By applying tension to the sheet metal, the rigidity of the sheet metal can be improved allowing it to retain its formed shape. Specifically, tension can be introduced to the sheet metal by bending it.

Each of the elongated track elements or track supports can be formed from the sheet metal blank by folding or bending the blank along the at least two bend lines to form the U-shaped or substantially U-shaped cross-section. The bend lines may be mechanically marked by, for example, perforations in the sheet metal blank or may be marked by a marker pen. Alternatively, the bend lines may not be marked and may be measured from the edge of one or both of the sides of the sheet metal blank. A force is required to bend the sheet metal blank along each of the bend lines into the desired shape. Specifically, the sheet metal blank is bent along a bend line (a first straight axis) at an angle of substantially 90° and bent once more along a second bend line (a second straight axis) lying parallel to the first straight axis at an angle of substantially 90° to form a U-shaped cross-section.

By bending the sheet metal blank along additional bend lines (i.e. more than two bend lines), it is possible to form raised and lowered regions in the top flange of the U-shaped cross section. These raised and lowered regions form a track in the top flange, thereby allowing a track to be integrated into the top flange. Thus, no extra material is required for forming a track and therefore the integral track provides a less complex track system compared to prior art. This arrangement minimizes the number of parts required for forming a track system whilst still retaining structural integrity.

In contrast, where the track is mounted onto the top flange of the U-shaped cross section, the track can be made of any suitable material, for example metal or plastic, and can be made of a different material to the track support. As such, the combination of different materials in the track support and the track can result overall, in a mechanically improved track system.

There may be further bend lines in the sheet metal blank for forming protrusions or recesses in the substantially U-shaped cross section. The formation of protrusions or recesses in the cross section by bending along bend lines in the sheet metal blank may improve the rigidity of the formed shape.

The metal sheet blank may be stamped or punched to remove material from the blank to create cut-outs in the metal sheet blank. The cut-outs may be used for joining two or more elongated track elements together, and/or for screw holes for fastening a separate part onto the elongated track element, for example. The stamping/punching processing may be carried out before the sheet metal blank is bent into a substantially U-shaped cross-section.

Mechanically bending, pressing or stamping the sheet metal blank requires the use of presses or other pressure processing equipment to make the sheet metal blank undergo plastic deformation. The sheet metal blank is bent along the two or more bend lines. When the sheet is bent, the inner surface of the sheet metal blank is shortened due to compression, and the outer surface of the metal sheet blank is elongated due to tension. The introduction of tension into the sheet metal blank causes the formed metal to have increased rigidity. Compared to extrusion processing, which requires high temperatures to deliver liquid metal into molds, bending or stamping the sheet metal blank can be carried out at much lower temperatures. Bending or stamping the sheet metal blank in this way allows the formed elements to have high dimensional accuracy and good product consistency at high speed and low cost.

The metal sheet blank is folded into a substantially U-shaped cross section. A U-shaped cross section has 3 sides which are a top flange, a bottom flange and a vertical element extending between the top and bottom flanges. By having a 3 sided elongated track element or track support, the material costs are reduced compared to a 4 sided elongated track element or track support. Further, the weight of each elongated track element or track support is reduced compared to 4 sided elongated track elements of the same material. Considering the number of elongated track elements or track supports required for a track system, this reduction in weight may be significant and may result in a reduction in overall cost too.

Further, by having a U-shaped cross-section or a substantially U-shaped cross-section, the elongated track element or track support has improved structural integrity in both the x and y directions. This is because the bend lines extend along the length of the elongated track element and provide rigidity both along the length of the elongated track element or track support and in a perpendicular direction to the length of the elongated track element or track support.

It is important that each of the plurality of elongated track elements and track supports is fabricated to tight dimensional tolerances as variation in the dimensional tolerances of the elongated track elements or track support, such as height, would have an impact on the connection between adjacent tracks, which in turn affects or creates dimensional disparity of the track surface of the track between the adjacent tracks or track sections. This would create one or more steps and/or gaps between adjacent tracks or track sections that would cause the wheels of the load handling device to strike as it passes across the junction between the adjacent track sections or tracks, leading to noise and vibration of the wheels.

Instead of using extrusion processing, which requires high temperatures to deliver liquid metal into molds, the U-shaped cross section of the elongated track elements or track supports may be formed by cold rolling by bending or stamping the sheet metal blank which is carried out at much lower temperatures. Bending or stamping the sheet metal blank in this way allows the formed elements to have high dimensional accuracy and good product consistency at high speed and low cost.

Cold rolling strengthens the metal sheet blank by using mechanical stress to change the microstructure of the metal as it is being bent. Cold rolling or work hardening involves passing a sheet metal blank between two rollers that impose pressure on the sheet metal. This deforms the metal and elongates the grains within the metal, resulting in dislocations piling up in the bending deformation zone. This stops the movement of dislocations through the metal. The dislocation become entangled at the bend deformation zone therefore stopping further deformation occurring in a particular grain, unless significantly greater energy is used. This therefore increases the strength of the metal under further loading. Further, by rolling the sheet metal blank at room temperature, as opposed to a high temperature, the cost of forming the elongated track element is reduced. Cold rolling stainless steel can be precision manufactured, allowing the metal to be produced to extremely tight tolerances. It is a particularly effective technique of bending metal without the risk of breaking.

Optionally, the sheet metal blank comprises steel. Making the track system and particularly the elongated track elements or track supports from steel offers a high strength and low weight structure. Steel is also a ductile material which is ideal for mechanically bending into a U-shaped cross section. Preferably, the sheet metal blank may be formed from stainless steel or galvanized steel which are both resistant to corrosion.

Optionally, the track is mounted onto the top flange by a fastener. The top flange and/or the track may comprise the fastener for attaching the track onto the top flange. Either the track may be fastened directly onto the top flange by using a clip located on the top flange or the track, or if a clip is located on the track and a clip is located on the top flange the clips may interact with each other such that they hold the track on the top flange. Alternatively, the track may be fastened to the top flange by a bracket which attaches to either to a lower surface of the track and/or to one or two sides of the track and/or to an upper surface of the track. If the bracket is attached to the upper surface of the track, the bracket does not interfere with the movement of a load handling device moving along the track. If the bracket is attached to one or two sides of the track, the bracket may be bolted or screwed onto the track. If the bracket is attached to the lower surface of the track, the bracket may be screwed or bolted to the lower surface of the track or the bracket may be clipped onto the lower surface of the track.

Optionally, the fastener comprises one or more U-shaped brackets configured to clamp the top flange against the track. The U-shaped brackets are configured to envelope the track support such that the base of the U-shaped bracket is located beneath the bottom flange of the track support and one of the sides of the U-shaped bracket runs parallel with vertical flange of the track support. The U-shaped brackets are therefore sized and shaped to fit around the track support with little room for the track support to move once with the U-shaped bracket is fitted to the track. The U-shaped brackets may be engageable with an underside of the track which reduces the possibility of the load handling device interacting with the bracket when the load handling device moves along the track. Preferably, a lower surface of the track comprises two protrusions located at opposing sides of the lower surface and extending along the length of the lower surface of the track. Preferably, the U-shaped bracket is attachable to the two protrusions.

Optionally, the track comprises a recess for receiving the track support. The recess may be sized and shaped to accommodate the size and shape of the top flange of the track support. The recess allows easy positioning of the track onto the track support. The recess may be located on a lower surface of the track and may be formed between two protrusions located at opposing sides of the lower surface and extending along the length of the lower surface of the track.

Optionally, the track comprises plastic. Plastic offers a lighter alternative to using metals. The use of plastic material to fabricate the track sections allows the track sections to be fabricated to tighter tolerances that can be achieved by extrusion alone. The use of plastic material to fabricate the track sections of the present invention allows the track sections to be injection molded. Unlike extrusion, injection molding allows parts to be formed to very tight tolerances, removing or mitigating the need to carry out excessive machining on the finished part. In addition, injection molding allows one or more profiles to be incorporated to the track in precise or intricate detail, which is essential to guide the wheels of the load handling device on the track without the possibility of derailing. Optionally, the plastic track may be fastened to the top flange using glue and/or the track is bolted onto the top flange. Specifically, the glue may be applied to the lower surface of the plastic track and/or the top flange.

Optionally, the track is configured to snap-fit onto the track support. The snap-fitting mechanism means that no excessive force is required to fit the track onto the track support and no tools are required.

Optionally, the track comprises steel. Steel offers high strength at low weight and so is ideally suited to providing support to a load handling device. In particular, the track may be cast steel which provides a higher surface quality than other types of steel and as such provides a smoother surface on which the load handling device can run. Further, casting the track allows complex geometries and shapes to be integrated into the track. The track may comprise, for example, galvanized steel or stainless steel.

Optionally, the track comprises a raised central region running along the longitudinal length of the track. The raised central region is arranged such that one or more load handling devices can be guided along the tracks. The raised central region may comprise a radio frequency identification (RFID) sensor to notify one or more load handling devices of their location in the track system.

Optionally, the track comprises a pair of depressions running side by side along the longitudinal length of the track, wherein the pair of depressions define a path for the one or more load handling devices. The pair of depressions may be formed between the raised central region and a pair of opposing ridges or lips. The opposing ridges may run along the edges of the track and may run along the longitudinal length of the track. The opposing ridges prevent a load handling device from moving off the track. The pair of depressions have a width greater than the width of the wheels of the one or more load handling devices to allow the one or more load handling devices to move along the pair of depressions.

Optionally, the plurality of tracks are subdivided into a plurality of track sections, each track sections comprising a first track section element extending in the first direction and a second track section extending in the second direction. Each track section element can move independently. As each of the plurality of track sections comprises track elements extending in substantially transverse directions, relative movement between one or more of the plurality of track sections and the underlying track support structure are largely concentrated around the region of the track elements extending from the nodes of the track sections.

Optionally, each track section is formed as a single integral body. By having each track section formed as a unitary or single integral body so as to provide a track surface or path extending in transverse directions, the number of track sections necessary to build the track system is reduced in comparison to prior art grid structures thereby simplifying the layout of the track sections on the grid structure. For example, a one to one relationship can exist between each of the plurality of track sections and a single node in the grid structure, in the sense that only a single track section is required at each of the nodes of the grid structure. In prior art track systems, there is a two to one relationship between the number of track sections and a single nodes in the grid structure in the sense that the prior art systems have one track section extending in a first direction and another separate track section extending in the second direction at each node. Each of the plurality of track sections may therefore be cross shaped, having a first track section element extending in the first direction and a second track section element intersecting with the first track section element and extending in the second direction. The first and second track section elements can also be termed transverse portions or branches of the track section. Being formed as a single or unitary body allows the track section to be mounted at each of the nodes of the track supports where the first set of track supports intersects the second set of track supports, and therefore the track section is able to extend in both the first and second direction of the track system. This removes the need to have separate track or rail elements that separately extend in the first and second direction as found in prior art solutions. The track section however is not limited to having a one to one relationship between the number of track sections and the number of nodes in the grid framework structures. For example, a single track section formed as a unitary body can be configured to extend across multiple nodes of the grid structure and yet provide a track surface extending in transverse direction.

Preferably, the plurality of track sections are arranged so that adjacent track sections meet between their respective intersections. The term "meet" covers abutments or connection or engagement between adjacent track sections. The distal ends of the first and second track section elements of adjacent track sections may meet between their respective intersections. Optionally, the first and/or second track sections elements of adjacent track sections meet half way or mid-point between their respective intersections. This has an advantages that only track sections having a single size would be necessary to cover a substantially portion of the grid members instead of having multiple separate parts, thereby improving the manufacturability of the track sections, i.e. a single tool design or one size fits all. In the case where the grid cells are square, preferably, each track section of the plurality of track sections can have rotational symmetry in a horizontal plane with an order of rotational symmetry of four. Having an angle of rotational symmetry of 90°, the track section of the present invention can be rotated four times and still coincide with itself. This provides the flexibility of mounting the track section of the present invention to the grid structure in multiple different orientations and thereby removing the "jigsaw" effect of assembling the track, i.e. limited to one orientation. In addition to simplifying the laying of the plurality of tracks to the track support structure, the cross shaped configuration of the track sections enables the track sections to bridge the interface between adjacent modular storage cells so as to provide a continuous track surface extending across adjacent modular storage cells.

The ability to have adjacent track sections meet between the nodes or intersections of the grid structure also allows different types or shapes of the joints or connecting ends to be incorporated into the track sections. To mitigate the up and down bumping of the wheels of the load handling device, preferably, the plurality of track sections are connected by a joint comprising tapered edges. For the purpose of the present invention, the term "joint" is broadly construed to mean abutting ends of adjacent track sections. The meeting ends of adjacent track sections are cut or shaped in such a way that they are mitred together. Preferably, the plurality of track sections are connected by a joint comprising tapered edges. Before the wheel of the load handling device rolls over the edge of a track section element completely, part of the wheel already has touched the mitred edge of the track section element of an adjacent track section. This provides a gradual transition of the track joint and prevents a greater portion of the wheel from striking an edge of the joint, further mitigating this up and down bumping impact reducing any noise and vibration of the wheels of the load handling device, in comparison to a joint cut at right angles to the direction of travel of the load handling devices on the track. To further increase the structural integrity of the joint connecting adjacent track sections together, preferably, the joint comprises at least one tongue receivable in a correspondingly shaped groove. Preferably, the joint comprises an overlapping joint.

However, the present invention is not limited to having a one to one relationship between a single track section and the number of nodes of the track system. For example, a single track section formed as a unitary body can be configured to extend across multiple nodes of the track system and yet provide a track surface extending in transverse directions.

A track system for a storage and retrieval system comprising one or more load handling devices operable on the track system is provided. The track system comprises: a plurality of tracks arranged in a grid pattern for guiding one or more load handling devices operable on the track system; a plurality track supports arranged in a grid pattern comprising a first set of track supports extending in a first direction and a second set of track supports extending in a second direction, the second direction being substantially perpendicular to the first direction such that the first set of track supports intersect the second set of track supports at one or more nodes in the track system, each of the plurality of track supports being formed from a sheet metal blank folded along a plurality of bend lines; wherein the first set of track supports intersects the second set of track supports by the second set of track supports being received within one or more cut-outs in the first set of track supports at the one or more nodes in the track system.

The present track system enables a plurality of track supports to be easily and quickly fitted together. For example, the first set of track supports may comprise 2, 3, 4 or 5 cut-outs to allow 2, 3, 4, or 5 additional track supports to be received into the first set of track supports. The cut-outs may be cut into the track support after it has been formed from the sheet metal blank. Alternatively, and more conveniently, the cut-outs may be cut in the sheet metal blank and then the sheet metal blank may be folded to form the track support. The cut-outs may be formed by laser cutting the metal sheet blank. The metal sheet blank from which the track support is formed may be stamped or punched to remove material from the blank to create the one or more cut-outs in the metal sheet blank. Thus, each track support may comprise 2, 3, 4, or 5 cut-outs and therefore a single track supports may receive a plurality of perpendicularly arranged track supports, for example, 2, 3, 4 or 5 track supports. The connections at the intersections of the first set of track supports and the second set of track supports include but are not limited to a snap-fit mechanism.

Optionally, the one or more of the first set of track supports snap fits onto one of more of the second set of track supports at their intersections. For example, the profile of the cut-outs is shaped such that the first track support snap-fits and/or locks onto the second track support at their intersections. An advantage of forming the track support from a sheet metal blank is that it is possible to incorporate a level of resiliency within the track support to enable the track supports to snap-fit together.

Optionally, at least a portion of the cross-sectional profile of the cut-outs in the first set of track supports corresponds to at least a portion of the cross-sectional profile of the second set of track supports. This allows at least a portion of the second set of track supports to slot into the cut-outs in the first set of tracks supports. Advantageously, this provides easy and quick installation of the track system, and limits the amount of (horizontal) movement of the second set of track supports within the cut-outs of the first set of track supports, thereby creating a more stable surface on which to mount the tracks. The cross-sectional profile of the cut-outs in the first set of track supports may correspond to the cross-sectional profile of the second set of track supports. Alternatively, the cross-sectional profile of the cut-outs in the first set of track supports may correspond to a portion, for example, a half, of the cross-sectional profile of the second set of track supports. In this arrangement, the second set of track supports advantageously can be lowered onto the first set of track supports such that the second set of track supports aligns with the cut-outs of the first set of track supports. Alternatively, the first set of track supports and the second set of track supports may both comprise cut-outs such that the cut-outs of the first track supports connect with the cut-outs of the second track supports when the track supports are arranged in a grid pattern. The cut-outs on both the first and second set of track supports may correspond to a portion, for example, a half of the cross-sectional profile of the first and the second set of track supports.

Optionally, each of the plurality of track supports may have a substantially rectangular cross section formed from a sheet metal blank folded along a plurality of bend lines. Advantageously, the rectangular corrugation formed from the sheet metal blank is both rigid, as a result of the multiple bends required to form the track support cross section and has a high strength-to-weight ratio. The substantially rectangular shaped cross-section comprises a pair of parallel vertical sides connected by a horizontal element, and wherein the parallel vertical sides comprise the one or more cut-outs. Thus, when the second track support is inserted into a cut-out in the vertical sides or flanges of the first track support, the second track support is arranged substantially perpendicular with the first track support to form an intersection. Preferably, the second track support is arranged at substantially 90° to the first track support. As the rectangular cross section has two vertical sides, when the second set of track supports is received within one or more cut-outs in the first set of track supports, the second set of track supports passes through the two vertical sides of the first set of track supports, thereby providing stability at the nodes of the track system.

The first set of track supports may have a height which is greater than the height of the second set of track supports. This arrangement allows the second set of track supports to fit into the first set of track supports. Preferably, the first set of track supports is 5% higher than the height of the second set of track supports, or preferably the first set of track supports is between 5% and 10%, or preferably between 10 and 15%, or preferably between 15% and 20%, or preferably between 20% and 25% higher than the height of the second set of track supports. This arrangement allows the second set of track supports to be supported from all sides (in particular from the top and bottom) when positioned within the one or more cut-outs of the first set of track supports. A shim may be mounted onto a track support surface of the second track support and a track may be mounted onto the shim and onto a track support surface of the first track support. In this arrangement, the track masks a step formed at the intersection of the track supports and the shim allows the track to be mounted onto a surface which is equal in height to the track support surface of the first track support.

The plurality of tracks may be mounted on the plurality of track supports. Thus, the plurality of tracks are separate from the plurality of track supports allowing the possibility of the tracks to be formed from a different material to the track supports. For example, the plurality of tracks may comprise plastic, offering a lighter alternative to using metals. The use of plastic material to fabricate the track sections allows the track sections to be fabricated to tighter tolerances that can be achieved by extrusion alone. The use of plastic material to fabricate the track sections allows the track sections to be injection molded. Unlike extrusion, injection molding allows parts to be formed to very tight tolerances, removing or mitigating the need to carry out excessive machining on the finished part. In addition, injection molding allows one or more profiles to be incorporated to the track in precise or intricate detail, which is essential to guide the wheels of the load handling device on the track without the possibility of derailing.

One possible drawback of using plastic tracks is the accumulation of static electricity as the tires of the load handling device continuously ride over the track. The static electricity may build up on the track surface until there is opportunity for the static electricity to electrically discharge. In an extreme case, the build-up of static electricity on the tracks can be large enough to cause harm when discharged through a person touching the tracks. To mitigate the build-up of static electricity on the tracks, the tracks are preferably made conductive so as to safely conduct the build-up of charge on the tracks to ground. To maintain the benefits of injection molding the track sections from plastic, preferably, the track is made conductive by incorporating a conductive material into the plastic. Various conductive materials are known to be incorporated into plastic material to make them conductive. These include but are not limited to various types of carbon materials, e.g. graphite in micro- or nano-form.

Alternatively, the plurality of tracks may comprise metal. Specifically, the tracks may formed of a cast metal allowing complex geometries and shapes to be integrated into the track. The track may comprise, for example, galvanized steel or stainless steel. Alternatively, the track may be formed from extruded aluminum.

Optionally, at least one free end of the folded sheet metal blank along the longitudinal length of the track support is inwardly turned to form at least one track support surface for mounting a track. It is therefore very easy to form a track support surface from the sheet metal blank. The folded sheet metal blank is folded inwardly to minimize the space required for the track support.

Optionally, at least one free end of the folded sheet metal blank comprises a pair of opposing free ends to provide a pair of opposing track support surfaces for mounting a track. This arrangement has increased rigidity over only folding one free end of the folded sheet metal blank because additional bending of the sheet metal blank introduces tensions to the sheet metal blank.

Optionally, the pair of opposing free ends are spaced apart to provide a channel running along the longitudinal length of the track support. This reduces the amount of material required for forming the track support. The open channel also provides a way in which a track may engage with the track support.

Optionally, the one of more cut-outs in the first set of track supports have a profile that corresponds to the cross sectional profile of the second set of track supports. Optionally, the second set of track supports have a cross sectional area and the one or more cut-outs in the first set of track supports have a cross sectional area, wherein the cross-sectional area of the one or more cut-outs in the first set of track supports is sized and shaped such that it is complementary to the size and shape of the cross-sectional area of the second set of track supports. For example, the second set of tracks supports may have a substantially rectangular cross-sectional area and the one or more cut-outs in the first set of track supports may be sized and shaped such that the second set of tracks fits exactly into the cross-sectional area of the one or more cut-outs. Alternatively, or additionally, the second set of track supports may have a cross-sectional area that comprises one or more notches and the cross-sectional area of the one or more cut-outs in the first set of track supports comprises one or more slots to accommodate the one or more notches of the second set of track supports. Alternatively, or additionally, the second set of track supports may have a cross-sectional area that comprises one or more slots and the cross-sectional area of the one or more cut-outs in the first set of track supports comprises one or more notches to accommodate the one or more slots of the second set of track supports.

Having complementary cross-sectional areas in the second track supports and the one or more cut-outs of the first track supports allows the second track support to be more easily fed or slid into the one or more cut-outs of the first track supports. It allows a fitter to easily identify where the second track support should be inserted into the first track support and the orientation of the second track support. It also ensures that once the second track support is in position in the one or more cut-outs in the first track supports, there is minimal movement between the second track support and the first track support.

Optionally, each of the track supports comprises an H-shaped cross-sectional profile. The H-shaped cross-sectional profile is formed from a single sheet metal blank. The single sheet metal blank may be rolled formed to form the track support. Roll forming is a cost-effective method of forming the track supports and produces little material waste. An advantage of having an H-shaped cross-sectional profile is that each track support can be inverted and have a similar cross-sectional profile to a non-inverted track support. This means that track supports having an H-shaped cross-sectional profile can be used throughout the track system, without the need for other types (specifically different cross-sectional profiles) of track support. The height of all of the H-shaped track supports in the track system may also be the same or substantially the same such that a track may be supported on either an inverted or a non-inverted track support.

The H-shaped cross sectional profile may comprise a pair of opposing vertical sides, a pair of horizontal flanges and a U-shaped portion located centrally and interiorly between the pair of opposing vertical sides. The U-shaped portion may comprise a pair of vertical edges extending parallel to and interiorly to the pair of vertical sides, and a horizontal edge extending between the pair of vertical edges. The horizontal edge may be positioned approximately centrally of the H-shaped cross-sectional profile, and may provide a connection surface on which to attach the track support to an underlying horizontal bracing member. The horizontal edge of a first track support may also be used as a resting surface on which the horizontal edge of a second track support arranged in a perpendicular direction to the first track support may rest at a node. Alternatively or additionally, the horizontal edge of a second track support may be used as a resting surface on which the horizontal edge of a first track support arranged in a perpendicular direction to the second track support may rest at a node or intersection.

The cross-sectional profile of the first set of track supports may be the same as the cross-sectional profile of the second set of track supports. This means that the same track supports may be used throughout the whole track system, thereby saving in manufacturing and installation costs. For example, the second set of track supports may have the same H-shaped cross-sectional profile as the first set of track supports but in an inverted state.

Optionally, each of the track supports comprise a track connecting portion for connecting to the track, wherein the second set of track supports comprise one or more cut-outs and wherein each intersection of the track system is formed by assembling the second set of tracks with the first set of track supports in a substantially vertical direction such that their respective track connecting portions are co-planar or flush. This arrangement ensures the tracks are supported on a level surface (i.e. no steps are formed at the nodes across the whole grid pattern of the track system). This means that when the tracks are positioned on top of the track supports, the tracks are all level with each other, so the plurality of load handling devices operative on the tracks can move smoothly on the tracks. In order to assemble the track supports into a grid pattern, the second set of the tracks can be lowered onto the first set tracks when the one or more cut-outs of the second set of track supports align with the one or more cut-outs of the first track supports. Thus, the positioning of the cut-outs on both the first and second set of track supports offers a self-jigging mechanism so that the first and second set of track supports can easily be assembled in the correct position, thereby providing positional accuracy and helping to speed up installation.

The one or more cut-outs may each have a height corresponding to approximately half the height of the track support. This allows the one or more cut-outs of the second set of track supports to slot into the one or more cut-outs of the first set of track supports, whilst keeping their respective track support surfaces co-planar such that there is a smooth surface on which to mount the tracks.

Optionally, the first set of track supports may be rotated about their longitudinal axis such that the one or more cut-outs are upwardly facing. The set of track supports comprising the one or more cut-outs which are upwardly facing may be termed the 'second set of track supports'. The set of track supports comprising the one or more cut-outs which are downwardly facing may be termed the 'first set of track supports'. Thus, the same track supports can be used throughout the track system and the upwardly facing cut-outs of the rotated first set of track supports can connect with the downwardly facing cut-outs of the first set of track supports to create the grid pattern.

The plurality of tracks may be secured to the plurality of track supports by use of fasteners or an adhesive. Preferably, each of the plurality of track supports may comprise a plurality of slots spaced apart in the direction along the longitudinal length of the track support, and each of the plurality of tracks comprises a plurality of tabs for engaging with the plurality of slots in the track supports so as to prevent the plurality of tracks from detaching from the plurality of track supports. For example, the tabs may be configured to be snap fitted to the track support such that the tabs are arranged to deflect and be received in the slots in the track support, thereby securing the plurality of tracks to the plurality of track supports. Other forms of securing the track section to the track support besides a snap fit joint are also possible, e.g. the use of fasteners or an adhesive.

Optionally, the size of each of the slots is such that at least a portion of each of the plurality of tracks are moveable in a direction along the longitudinal length of a respective track support. Each slot may be enlarged in or more directions so as to permit movement of each tab within each slot in the track support.

Optionally, the tracks are orientated such that the length of each slot extends in a direction along the longitudinal length of the track support. For example, each slot may be orientated such that the longest edge of the slot extends in the direction of the longitudinal length of the track support and the shortest edge (i.e. width of the slot) extends in the direction substantially perpendicular to the longitudinal length of the track support. The orientation and configuration of each slot is such that the tabs engaged with the slots can move along the slots which in turn allows thermal expansion or contraction of the track elements attached thereto relative to the underlying track support. Equally, plausible is that expansion or contraction of the underlying track support as a result of thermal expansion causes the slots to move relative to the tabs engaged therein.

Optionally, each of the plurality of tracks is configured to snap-fit onto each of the plurality of track supports. Snap-fitting between the plurality of tracks and the plurality of track supports is configured such that the connection allows one or more of the track to expand or contract along a substantially horizontal direction, i.e. along the plane in which the track system lies, but is prevented from movement in a substantially vertical direction to prevent the track section from detaching from the underlying track support.

Optionally, the plurality of tracks are subdivided into a plurality of track sections, each track section comprising a first track section element extending in the first direction and a second track section element extending in the second direction, such that when mounted to the plurality of slots, the first track section element is moveable relative to the second track section element on the track support. Each track section element can move independently. As each of the plurality of track sections comprises track elements extending in substantially transverse directions, relative movement between one or more of the plurality of track sections and the underlying track support structure are largely concentrated around the region of the track elements extending from the nodes of the track sections. A node in a track section is the area where the track elements in a given track section intersect. The nodes experience minimal movement between track sections and the underlying track support structure.

Optionally, each track section is formed as a single integral body. By having each track section formed as a unitary or single integral body so as to provide a track surface or path extending in transverse directions, the number of track sections necessary to build the track system is reduced in comparison to prior art grid structures thereby simplifying the layout of the track sections on the grid structure.

A grid framework structure for a storage and retrieval system is provided. The grid framework structure comprises: a track system as described above; a supporting framework structure supporting the track system; and a plurality of stacks of containers arranged in storage columns located below the track system.

The grid framework structure comprises steel, such as galvanized steel or stainless steel. Specifically, the supporting framework structure supporting the track system may comprise steel, such as galvanized steel or stainless steel.

The supporting framework may be erected from a plurality of prefabricated panels or frames. For the purpose of definition, the term "prefabricated" in the context of the grid framework structure build is construed to cover manufacturing sections of the grid framework structure prior to assembly of the grid framework structure on site so that the grid framework structure can be assembled at a different location to the manufacture of the prefabricated sections of the grid framework structure, wherein each of the prefabricated sections comprises a plurality of the parts or components of the grid framework structure. The different location can be a location remote from where the grid framework structure is assembled, i.e. in another building, or alternatively, assembled in the same location but in a different area of the same location, e.g. into a different area of the same building. The prefabricated modular panels are load bearing in the sense that when assembled together to form the supporting framework structure, they provide a load bearing structure to support one or more load handling devices moving on the track system mounted to the supporting framework structure. Having each of the prefabricated modular panels extend in a single plane also facilitates the ability to flat pack the supporting framework structure for transport. The prefabrication of the modular panels permits quick assembly of the supporting framework structure at a site or within a building. This has the advantage that the supporting framework structure can be constructed in existing vacant buildings or warehouses.

Typically, the grid framework structure is a rectilinear structure comprising a central section, a peripheral section and a corner section. The different sections of the grid structure require different shaped track sections having different numbers of track section elements in a different arrangement. For example, a corner section of the grid structure would require a track section having two track section elements extending in transverse directions corresponding to the corner of the rectilinear structure. Likewise, for the peripheral section of the grid structure, the track section comprises an elongated track section element and one or more track section elements branching from the elongated track section element in a transverse direction. For the central section which represents a greater portion of the grid structure, each track section of the plurality of track sections is generally cross shaped having first and second track section elements extending in transverse directions. In all of the different sections of the grid structure, the relationship between the track sections and the grid structure at the node can still optionally be a one to one relationship, removing the need to have separate track or rails elements separately extending in the first and second directions of the grid structure. Equally, the track section elements or branches of the track sections at the different areas or sections of the grid structure extend in transverse direction.

The term "track" can be construed to encompass an assembly of the first set of parallel tracks extending in the first direction and a second set of parallel tracks extending in the second direction.

Optionally, the track system further comprises one or more anti-crush devices, wherein the one or more anti-crush devices are interposed between the supporting framework structure and the track system comprising the track supports. The one or more anti-crush devices may be positioned between the nodes of the track system, where typically the track supports are less supported. In particular, if each track support in the first set and the second set of track supports extends across the entire length or width of the track system, it is useful to support the sections of the track supports between the intersections where the weight of load handling devices may potentially cause sagging or bending in these regions. Thus, by providing anti-crush devices along the length and width of the track system, the track supports are provided with additional support to withstand the weight of the load handling devices operating above. In particular, the anti-crush devices may be positioned beneath or within the U-shaped portion of a track support having an H-shaped cross-sectional profile, thereby supporting the horizontal edge of the track support, the horizontal edge being positioned substantially centrally within the H-shaped track support. The one or more anti-crush devices may rest on the underlying horizontal bracing members, and the track supports may rest on the one or more anti-crush devices.

The one or more anti-crush devices may comprise steel, in particular the one or more anti-crush devices may comprise cast steel. Cast steel is mechanically strong and can be easily formed into most shapes and sizes. The anti-crush devices may be galvanized to prevent rusting.

The one or more anti-crush devices may be attachable to the underlying supporting framework structure and the track supports. The one or more anti-crush devices may be each be attachable to the supporting framework structure and the track supports by a screw or bolt and a nut. The screw or bolt may extend or pass through the height of the anti-crush device. Alternatively, each anti-crush device may be attachable to the supporting framework structure and a track support by two screws which fit into threaded openings within the anti-crush device, whereby one threaded opening extends from a top surface of the anti-crush device and one threaded opening extends from a bottom surface of the anti-crush device, such that the two threaded openings are separate from each other. Thus, in order to attach the anti-crush device to the underlying supporting framework structure, a screw is fitted through a hole in the supporting framework structure and fitted into the threaded opening extending from the bottom surface of the anti-crush device, and in order to attach the anti-crush device to the track support, a screw is fitted in a hole in the track support and fitted into the threaded opening extending from the top surface of the anti-crush device.

The one or more anti-crush devices may extend in the same direction as the track supports above the one or more anti-crush devices. For example, the one or more anti-crush devices may extend in a y-direction if the track supports and underlying horizontal bracing member extend in a y-direction, and/or the one or more anti-crush devices may extend in a x-direction if the track supports and underlying horizontal braving member extend in a x-direction. The one or more anti-crush devices may each have an elongate shape, such that each anti-crush device is long in relation to its width, therefore fewer anti-crush devices are required along the length of each track support and horizontal bracing member.

Optionally, the one or more anti-crush devices each comprise at least one raised positioning feature, and the plurality of track supports and the underlying supporting framework structure each comprise one or more holes for accommodating at least one raised positioning feature of the one or more anti-crush devices. The accommodating holes in the supporting framework structure (in particular the horizontal bracing members) allows easy identification of where to position each anti-crush device, thereby enabling faster installation of the grid framework structure. Further, the raised positioning features mean that it is not necessary to attach the one or more anti-crush devices to the track support or horizontal bracing member beneath with screws or bolts, as the raised positioning features allow each anti-crush device to be slotted into position within the accommodating holes and therefore the anti-crush device is restricted from movement along at least the horizontal direction/longitudinal direction of the respective track support. The one or more anti-crush devices may each comprise a single raised positioning feature, which may, for example, be centrally located on the anti-crush device. The single raised positioning feature may extend from the top surface to the bottom surface of the anti-crush device such that the raised positioning feature is raised above the top surface of the anti-crush device and extends below the bottom surface of the anti-crush device.

The at least one raised positioning feature may comprise a pair of raised positioning features on a top surface of the anti-crush devices and a pair of raised positioning features on a bottom surface of the anti-crush device. The pair of raised positioning features may be arranged on either side of the anti-crush device.

The one or more anti-crush devices may each comprise a plurality of raised positioning features. Each raised positioning feature may comprise a dome which protrudes from a top surface of the anti-crush device and/or a bottom surface of the anti-crush device. Each raised positioning feature may be positioned differently on the top surface compared to the bottom surface of the anti-crush device. For example, there may be three raised positioning features protruding from the top surface of the anti-crush device and five raised positioning features protruding from the bottom surface of the anti-crush device. Alternatively, there may be three raised positioning features protruding from the top surface of the anti-crush device and positioned on one side of the anti-crush device, whilst there may be three raised positioning features protruding from the bottom surface of the anti-crush device and positioned on an opposing side of the anti-crush device. The raised positioning features on the top surface may be shaped differently to the raised positioning features on the bottom surface, for example, the raised positioning features on the top surface may have a triangular profile, whilst the raised positioning features on the bottom surface may have a square profile, and the holes in the track support and the horizontal bracing member are shaped to accommodate the profile of the raised positioning features of the anti-crush device.

The one or more anti-crush devices may comprise a plurality of anti-crush devices. Optionally, the plurality of anti-crush devices may be spatially distributed in a direction along the length of the track system and/or the supporting framework structure. The anti-crush devices may be evenly distributed i.e. positioned at regular intervals. Alternatively, the anti-crush devices may be unevenly distributed, for example, there may be more anti-crush devices positioned closer to the center of the length of each track support.

Optionally, the one or more anti-crush devices are positioned between nodes in the track system. Thus the one or more anti-crush devices provide additional support to the track supports, particularly the U-shaped portion of track supports having a H-shaped cross sectional profile, in regions where the track supports have the possibility of sagging or bending due to the weight of the load handling devices operating above.

A storage and retrieval system, comprising the grid framework as described above and one or more load handling devices for lifting and moving containers stacked in the stacks, each load handling device comprising: a wheel assembly for moving the load handling device on the track system; a container-receiving space located above the track system; and a lifting device arranged to lift a single container from a stack into the container-receiving space.

DESCRIPTION OF THE DRAWINGS

These and other aspects of the invention will now be described, by way of example only, and with reference to the accompanying drawings, in which:

FIG. 16(*b*) is a cross-sectional profile of the elongated track element of FIG. 16(*a*).

FIG. 16(*c*) is an illustration of a sheet metal blank used for forming the elongated track element of FIGS. 16(*a*) and 16(*b*).

FIG. 17(*b*) is a perspective view of an insert inserted into two elongated track elements thereby joining the two elongated track elements.

FIG. 18(*b*) is a perspective view of the three elongated track elements of FIG. 18(*a*) joined together using an insert to form a four way junction or intersection.

FIG. 19(*b*) is a perspective view of the two elongated track elements of FIG. 19(*a*) fitted together to form a four way junction or intersection.

FIG. 20(*a*) is a cross sectional profile of the assembled track system of FIG. 20(*a*).

FIG. 20(*c*) is an illustration of a sheet metal blank used for forming the track support of FIGS. 20(*a*) and 20(*b*).

FIG. 21(*b*) is a cross sectional profile of an assembled track system of FIG. 21(*a*).

FIG. 21(*c*) is an illustration of sheet metal blank used for forming the track support of FIGS. 21(*a*) and 21(*b*).

FIG. 23(*b*) is a perspective view of the track support of FIGS. 22 and 23 intersecting a second track support.

FIG. 27(*b*) is a perspective view of the track section of FIG. 27(*a*) which is inverted.

FIG. 29(*b*) is a side view of the track support of FIG. 29(*a*).

FIG. 29(*c*) is a side view of the track support of FIGS. 29(*a*) and (*b*) which has been inverted/rotated by 180 degrees about the longitudinal axis of the track support.

FIG. 30(*b*) is a closer view of the intersection shown in FIG. 30(*a*).

FIG. 30(*c*) is a cross-sectional profile of the intersection shown in FIGS. 30(*a*) and (*b*).

FIG. 31(*a*) is a perspective view of an anti-crush device.

FIG. 31(*b*) is a top down view of the anti-crush device of FIG. 31(*a*).

FIG. 33(*b*) is a top down view of the anti-crush device of FIG. 33(*a*).

FIG. 34(*b*) is a perspective view of four anti-crush devices positioned on a horizontal bracing member.

FIG. 35(*b*) is a perspective view of an anti-crush device in position between a track support that has been rotated 180 degrees along its longitudinal axis, and a horizontal bracing member.

DETAILED DESCRIPTION

The following embodiments represent preferred examples of how the invention may be practiced, but they are not necessarily the only examples of how this could be achieved. These examples are described in sufficient detail to enable those skilled in the art to practice the invention. Other examples may be utilized and structural changes may be made without departing from the scope of the invention as defined in the appended claims. Moreover, direction references and any other terms having an implied orientation are given by way of example to aid the reader's understanding of the particular examples described herein. They should not be read to be requirements or limitations, particularly as to the position, orientation or use of the invention unless specifically set forth in the appended claims. Similarly connection references (e.g. attached, coupled, connected, joined, secured, and the like) are to be construed broadly and may include intermediate members between a connection of elements and relative motions between elements. As such, connection references do not necessary infer that two elements are directly connected and in fixed relation to each other, unless specifically set forth in the appended claims. Similarly, wording such as "movement in the n-direction" and any comparable wording, where n is one of x, y, or z, is intended to mean movement substantially along or parallel to the n-axis in either direction (i.e. towards the positive end of the n-axis or towards the negative end of the n-axis).

It is against the known features of the storage system such as the grid framework structure and the load handling device described above with reference to FIGS. 1 to 5, that the present invention has been devised.

Figure 1:
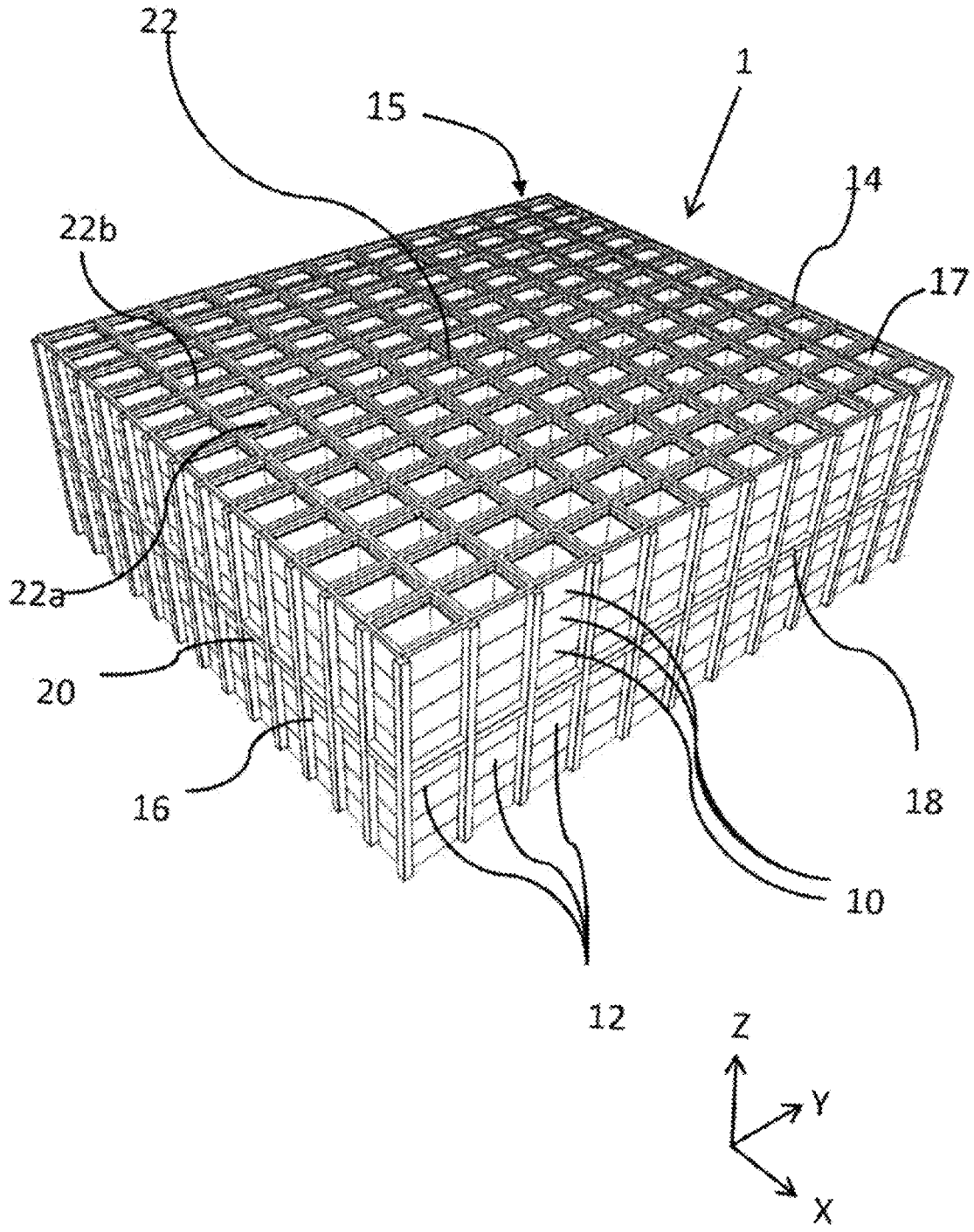
FIG. 1 is a schematic diagram of a known grid framework structure.
Figure 2:
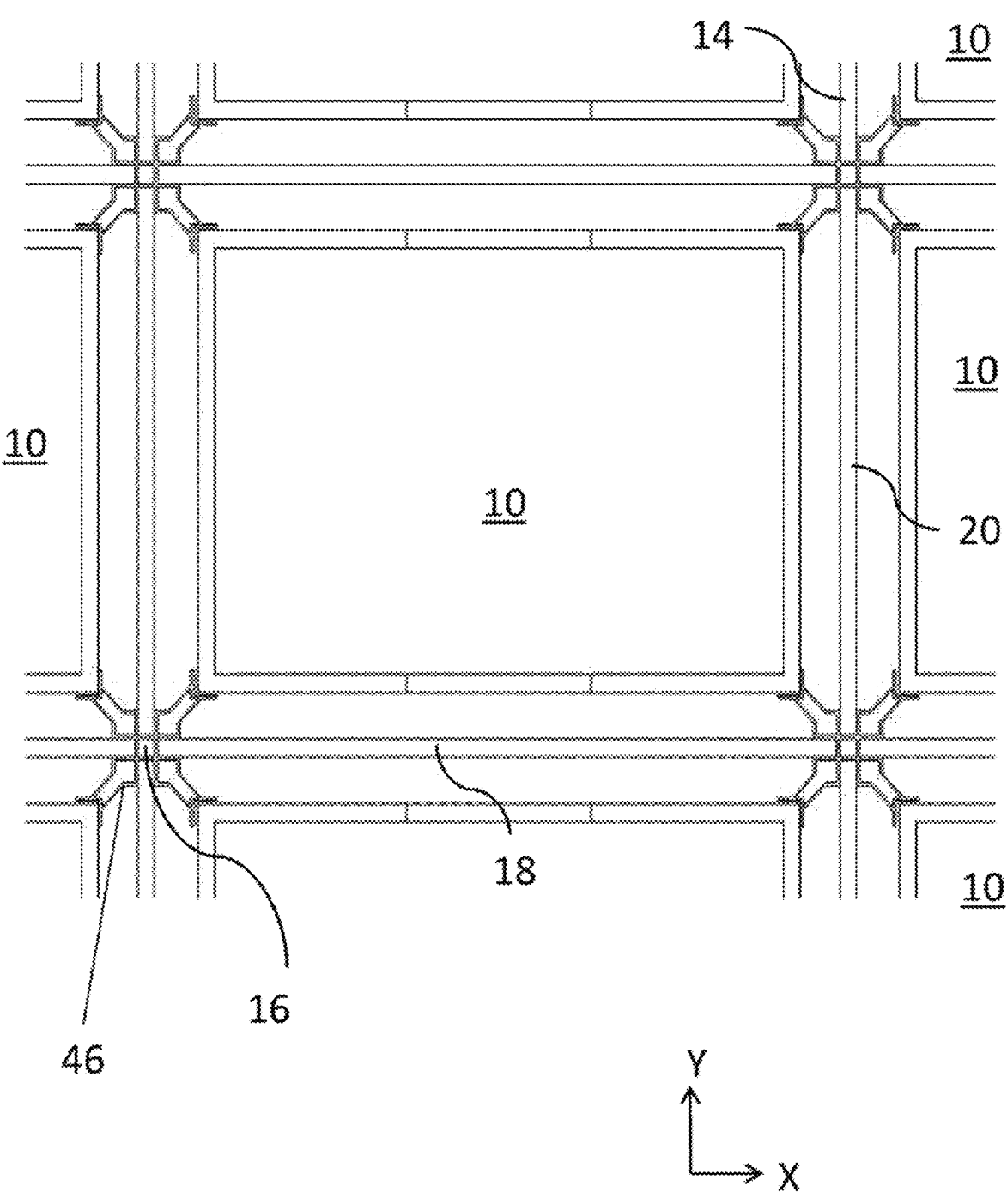
FIG. 2 is a schematic diagram of a top down view showing a stack of bins arranged within the framework structure of FIG. 1.
Figure 3:
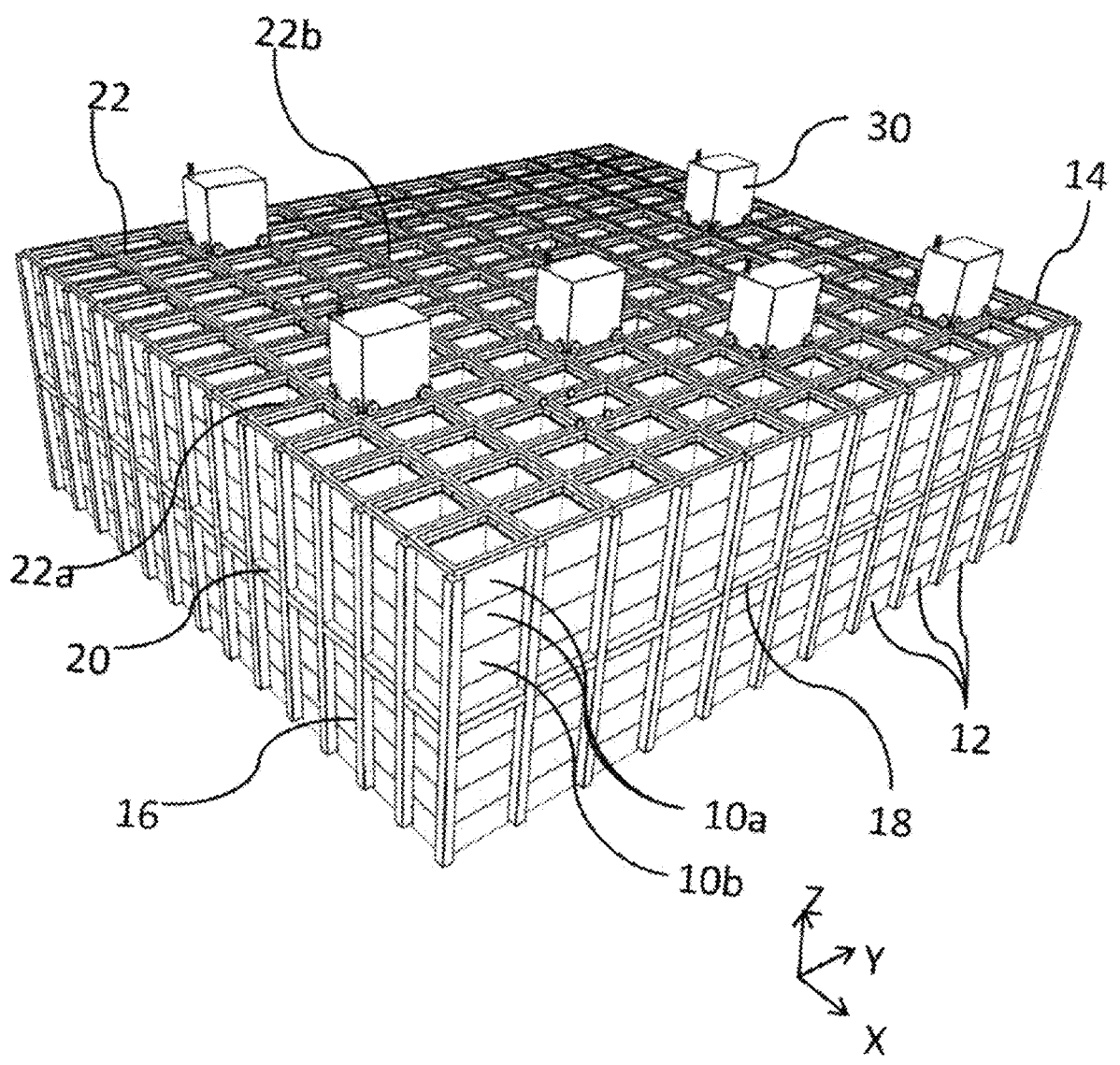
FIG. 3 is a schematic diagram of a load handling device operating on the grid framework structure.
Figure 4:
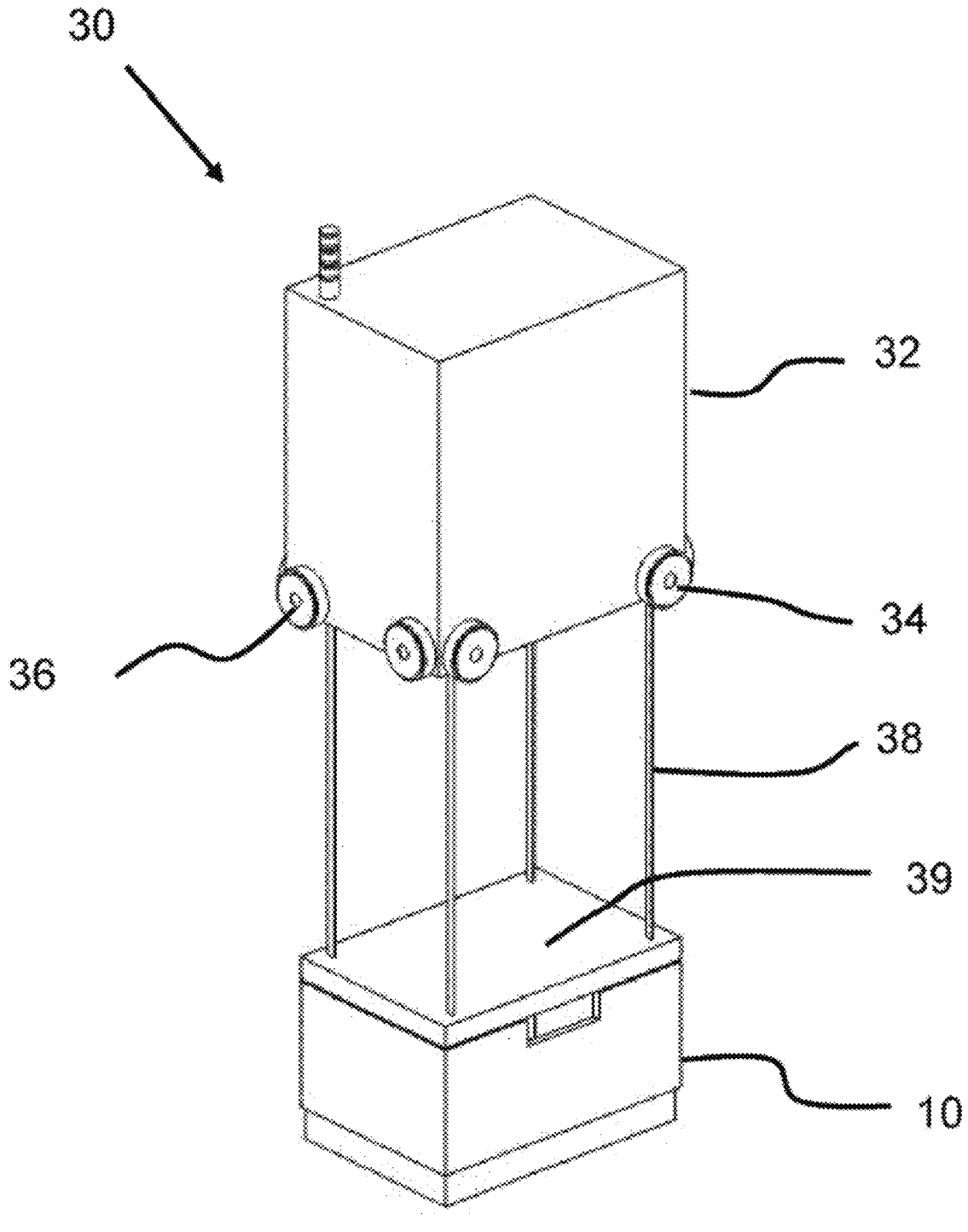
FIG. 4 is a schematic perspective view of the load handling device showing the lifting device gripping a container from above.
Figure 5:
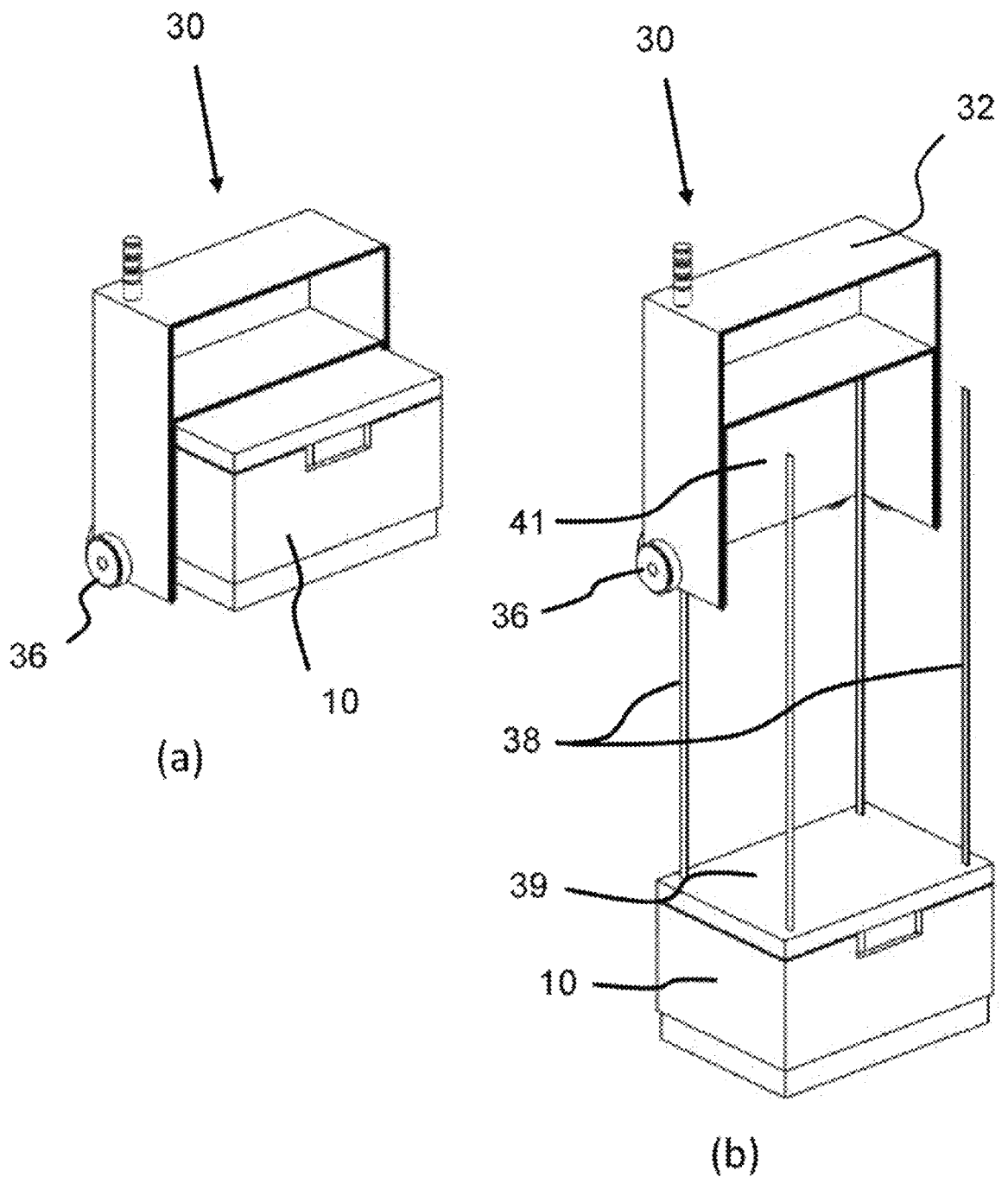
FIGS. 5(*a*) and 5(*b*) are schematic perspective cut away views of the load handling device of FIG. 4 showing (a) a container accommodated within the container receiving space of the load handling device and (b) the container receiving space of the load handling device.
Figures 6, 7:
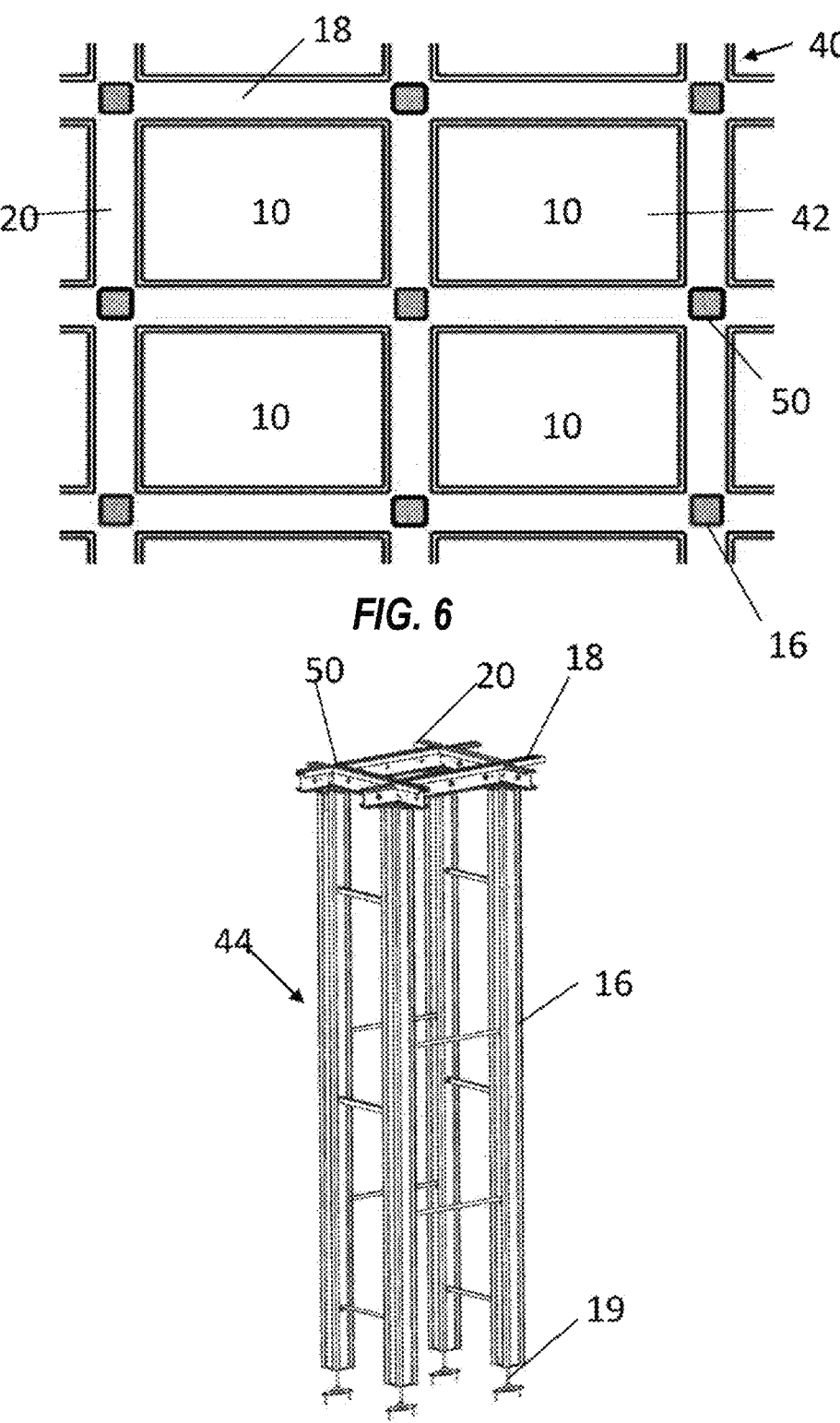
FIG. 6 is a top plan view of a section of a known grid structure comprising four adjoined grid cells showing the intersections or nodes of the grid members being supported by a vertical upright, each of the grid cells constituting a storage column.
FIG. 7 is a perspective view showing four vertical uprights making up a storage space or storage column within a grid framework structure.

FIG. 6 shows a top view of a section or a portion of a traditional track system 40 comprising four adjoined grid cells 42 and FIG. 7 shows a perspective side view of a single grid cell 42 supported by four vertical uprights 16 to form a single storage column 44 for the storage of one or more containers 10 in a stack. The grid framework structure can be considered to be divided into a supporting framework structure comprising the plurality of vertical uprights and a track system. The track system is supported by the supporting framework structure and comprises a plurality of grid members arranged in a grid pattern comprising a plurality of grid cells.

FIG. 6 shows a series of horizontal intersecting beams or grid members 18, 20 arranged to form a plurality of rectangular frames constituting grid cells 42, more specifically a first a set of grid members 18 extending in a first direction x and a second set of grid members 20 extending in a second direction y, the second set of grid members 20 running transversely to the first set of grid members 18 in a substantially horizontal plane, i.e. the track system is represented by Cartesian coordinates in the X and Y direction. The term "vertical upright(s)", "upright member(s)" and "upright column(s)" are used interchangeably in the description to mean the same thing. For the purpose of explanation of the present invention, the points or junctions where the grid members intersect or cross shown by the shaded squares in FIG. 6 can be defined as nodes or intersections 50. It is clearly apparent from the layout of at least a portion or section of a known track system 40 constituting four adjoining grid cells 42 shown in FIG. 6 that each intersection or node 50 of the track system 40 is supported by a vertical upright 16. From the section or at least a portion of the track system 40 shown in FIG. 6, the four adjoining grid cells are supported by nine vertical uprights 16, i.e. three sets of vertical uprights 16 supporting the track system at three rows, where each row comprises three nodes 50.

Figure 8:
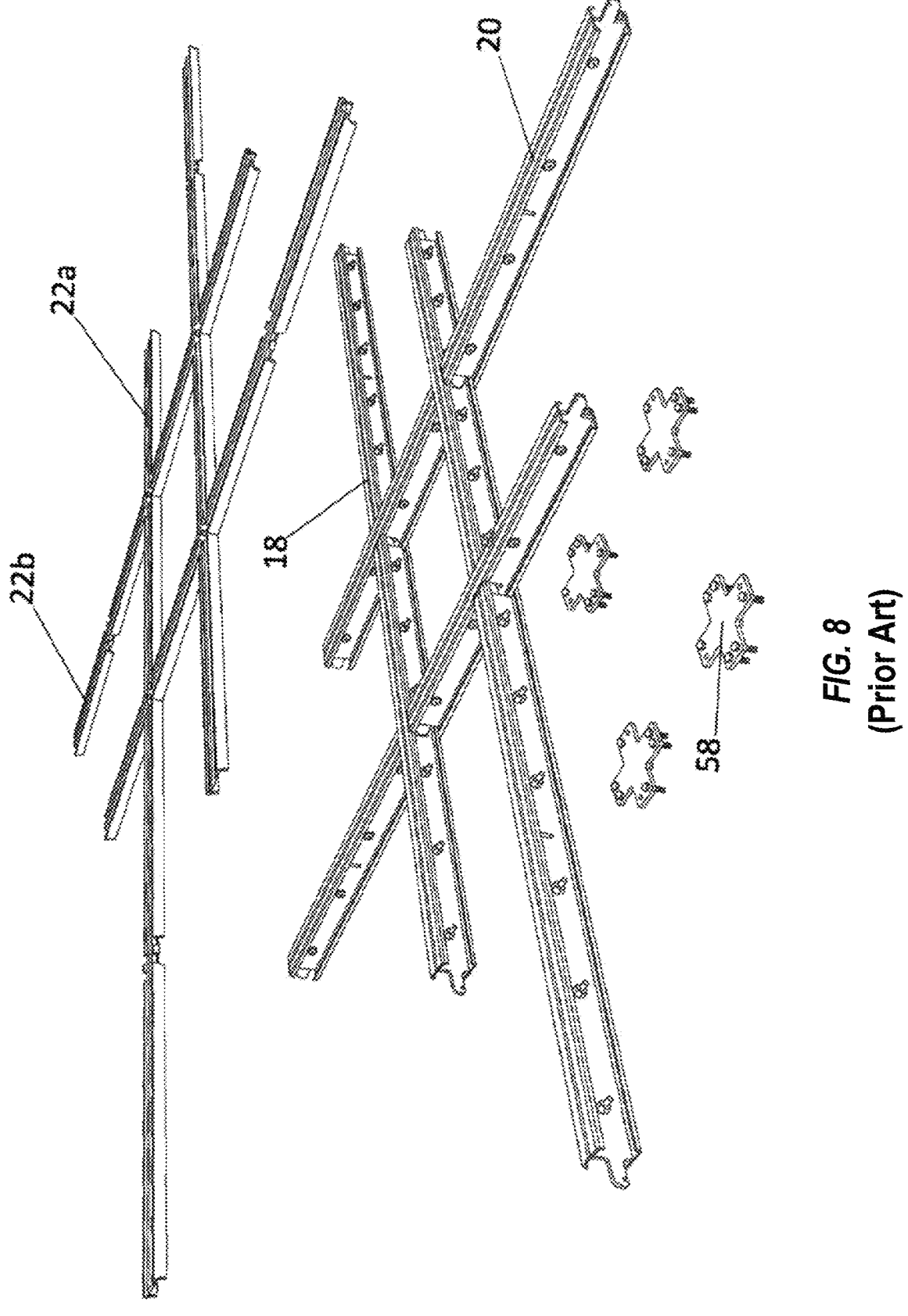
FIG. 8 is a perspective view showing the arrangement of the tracks and track supports interconnected at their nodes or intersections by a cap plate.
Figure 9:
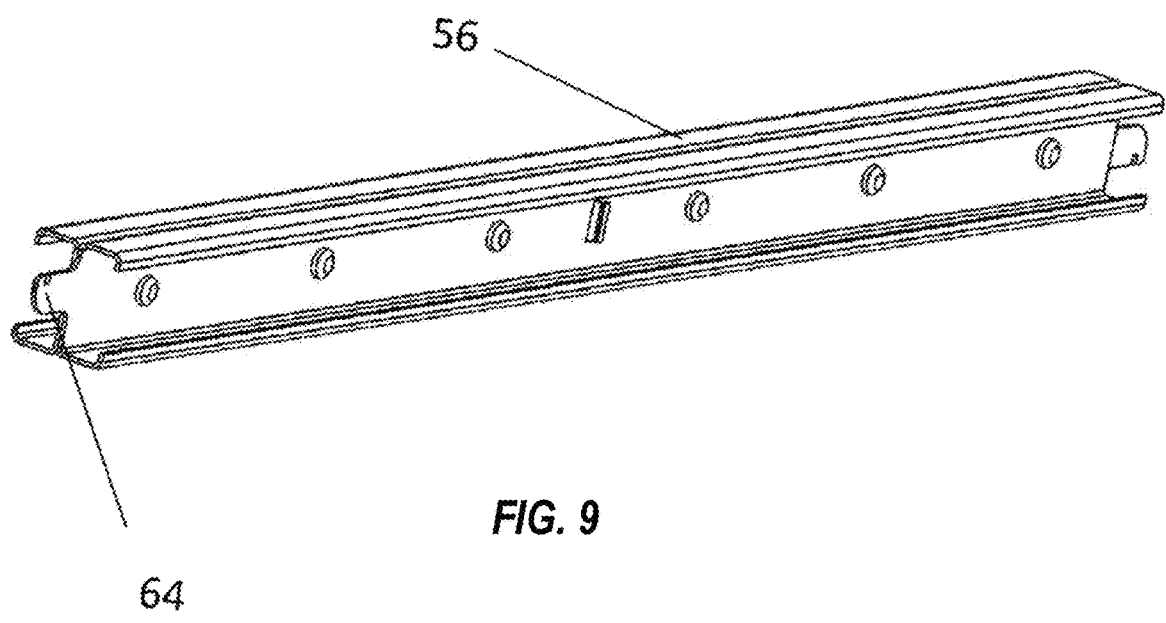
FIG. 9 is a perspective view of a track support or grid member.

Each of the grid members can comprise a track support 18, 20 and/or a track or rail 22a, 22b (see FIG. 8) whereby the track or rail 22a, 22b is mounted to the track support 18, 20. A load handling device is operative to move along the track or rail 22a, 22b of the present invention. Alternatively, the track 22a, 22b can be integrated into the track support 18, 20 as a single body by extrusion. At least one grid member in a set, e.g. a single grid member, can be sub-divided or sectioned into discrete grid elements that can be joined or linked together to form a grid member 18, 20 extending in the first direction or in the second direction. Where the grid members comprise a track support, the track support can also be sub-divided into discrete track support elements that are linked together to form the track support. The discrete track support elements making up a track support extending in the first axial direction and in the second axial direction are shown in FIG. 8. An individual track support element 56 used to make up a track support 18, 20 is shown in FIG. 9. The track support element 56 of FIG. 9 is a double back-to-back C section bolted together.

Figure 10:
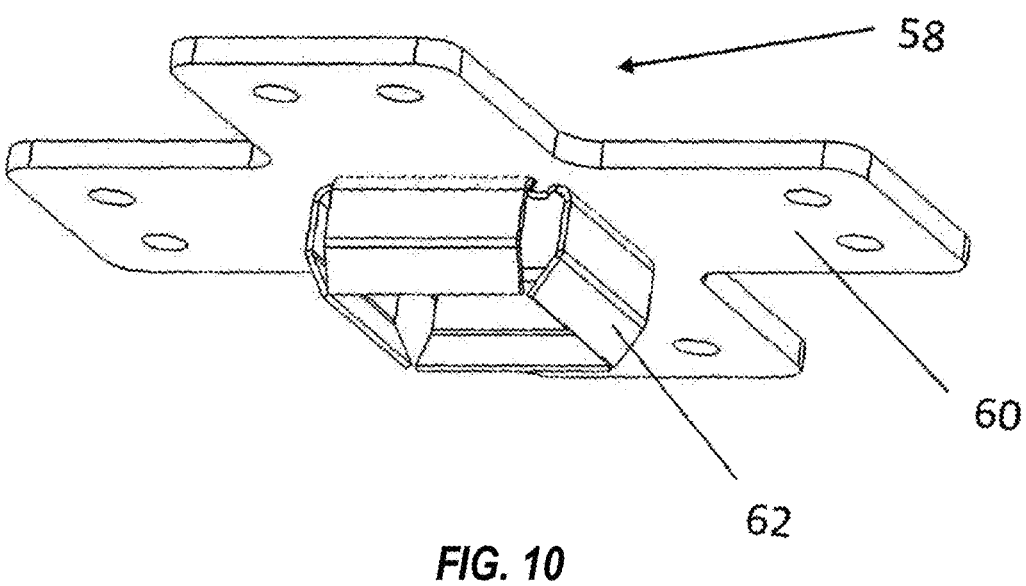
FIG. 10 is a perspective view of a cap plate for interconnecting the vertical uprights to the grid members at the nodes.
Figure 11:
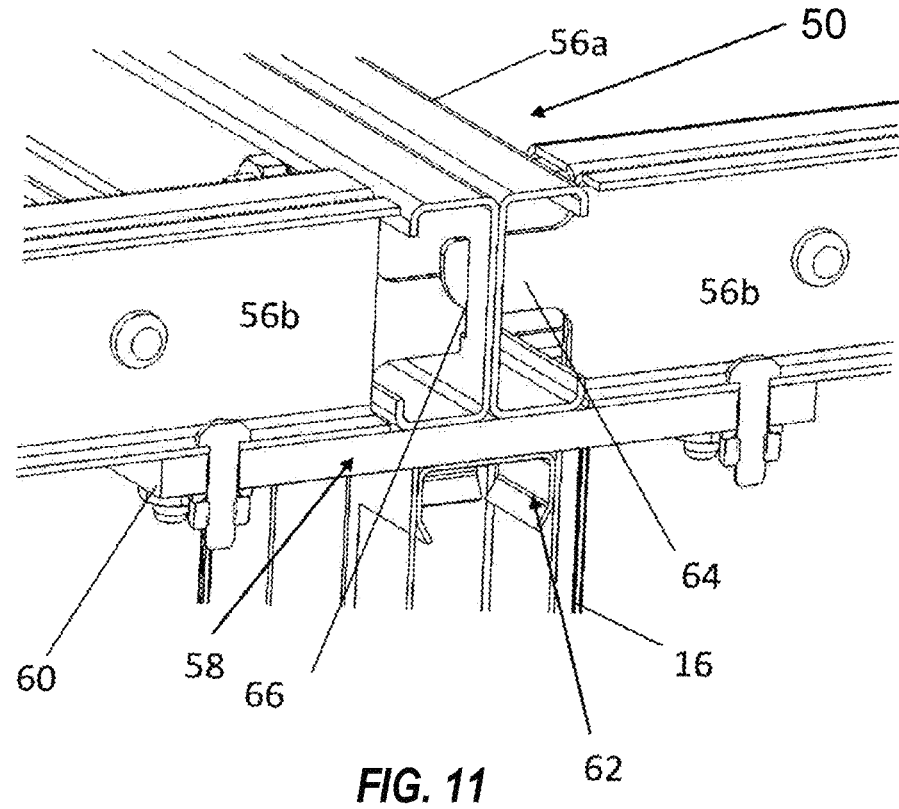
FIG. 11 is a perspective cross sectional view of the interconnection of the vertical uprights to the grid members by the cap plate at a node.

A connection plate or cap plate 58 as shown in FIG. 10 can be used to link or join the individual track support elements 56 together in both the first and the second direction at the junction where multiple track support elements cross in the track system 40, i.e. the cap plate 58 is used to connect the track support elements 56 together to the vertical uprights 16. As a result, the vertical uprights 16 are interconnected at their upper ends at the junction where the multiple track support elements cross in the track system 40 by the cap plate 58, i.e. the cap plate is located at the node 50 of the track system 40. As shown in FIG. 10, the cap plate 58 is cross shaped having four connecting portions 60 for connecting to the ends or anywhere along the length of the track support elements 56 at their intersections 50. The interconnection of the track support elements to the vertical uprights at the nodes by the cap plate 58 is demonstrated in the cross-sectional profile of the node 50 shown in FIG. 11. The cap plate 58 comprises a spigot or protrusion 62 that is sized to sit in the hollow central section 46 of the vertical upright 16 in a tight fit for interconnecting the plurality of vertical uprights 16 to the track support elements as shown in FIG. 11. Also shown in FIG. 11 are the track support elements 56a, 56b extending in both perpendicular directions corresponding to the first direction (x-direction) and the second direction (y-direction). The connecting portions 60 are perpendicular to each other to connect to the track support elements 56a, 56b extending in the first direction and in the second direction respectively. The cap plate 58 is configured to be bolted to the ends of the track support elements 56a, 56b or along the length of the track support elements. Each of the track support elements 56a, 56b is arranged to interlock with each other at the nodes to form the track system 40. To achieve this, distal or opposing ends of each of the track support elements 56a, 56b comprise hooks or tongues 64 for interconnecting to corresponding openings or cut-outs or slots 66 of adjacent track support elements. Opposing or distal ends of one or more track support elements comprise at least one hook or tongue 64 that is receivable in cut-outs or slot 66 midway along an adjacent track support element 56 at the junction where the track support elements cross in the track system 40. Referring back to FIG. 9 in combination with FIG. 11, the hooks 64 at the end of a track support element 56 are shown received in an opening 66 of an adjacent track support element extending across a vertical upright 16 at the junction where the track support elements 56 cross. Here, the hooks 64 are offered up to an opening 66 either side of a track support element 56b. The opening 66 is halfway along the length of the track support element 56 so that when assembled together, adjacent parallel track support elements 56 in the first direction and in the second direction are offset by at least one grid cell. This is demonstrated in FIG. 8.

Figure 12:
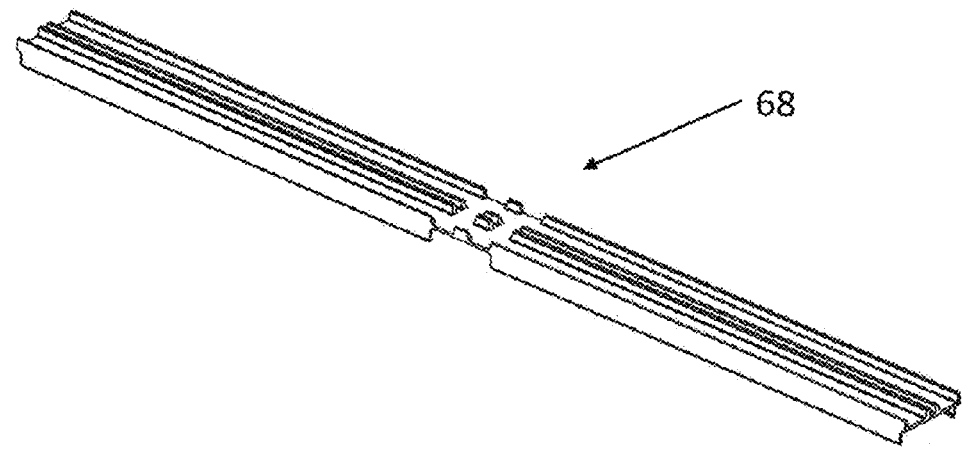
FIG. 12 is a perspective view of a track or rail.

To complete the track system 40 once the track support elements are interlocked together in a grid pattern comprising track supports 18 extending in the first direction and track supports 20 extending in the second direction, a track 22a, 22b is mounted to the track support elements 56. The track 22a, 22b is either snap-fitted and/or fitted over the track support 18, 20 in a slide fit arrangement (see FIG. 8). Like the track support, the track comprises a first set of tracks 22a extending in the first direction and a second set of tracks 22b extending in the second direction, the first direction being perpendicular to the second direction. A first set of tracks 22a is sub-divided into multiple track elements 68 in the first direction such that, when assembled, adjacent parallel track elements in the first direction are offset by at least once grid cell. Similarly, a second set of tracks 22b is sub-divided into multiple track elements 68 in the second direction such that, when assembled, adjacent track elements in the second direction are offset by at least one grid cell. This is demonstrated in FIG. 8. An example of a single track element 68 is shown in FIG. 12. As with the track support elements, multiple track elements in the first direction and the second direction are laid together to form a track in both directions.

As can be appreciated from the above description, the process of assembling the grid framework structure involving erecting the vertical uprights, connecting the grid members and mounting the tracks is very time consuming since multiple separate components are necessary to assemble the grid framework structure. The process of erecting the grid framework structure can take several weeks and in a worst case scenario, the process can take several months. As the demand for e-commerce grows rapidly, particularly in the retail sector, there has been an increased demand for distribution centers, otherwise known as customer fulfilment centers (CFCs), in more locations rather than just a few locations that serve major cities in order to fulfil a growing demand from customers. The increased presence of distribution centers in more locations also has the effect of reducing the time to complete the last mile logistics for the movement of goods from the distribution center to its final destination. Such last mile logistics is also an important consideration in order to keep goods such as perishable grocery products fresh at their final destination. One of the major bottlenecks to providing distribution centers in more locations is the time and cost to erect the grid framework structure. Not only is the time and cost to erect the grid framework structure a cause of concern when setting up a distribution center, but also the grid framework structure should have the flexibility to be assembled in a number of existing locations including existing warehouses rather than bespoke warehouses purely to house the grid framework structure.

The above problem has been mitigated by forming a track system from fewer structural components than is currently practiced described above, while still maintaining the structural integrity of the track system for bearing the weight of one or more robotic load handling devices operative on the grid framework structure.

Figures 13, 14:
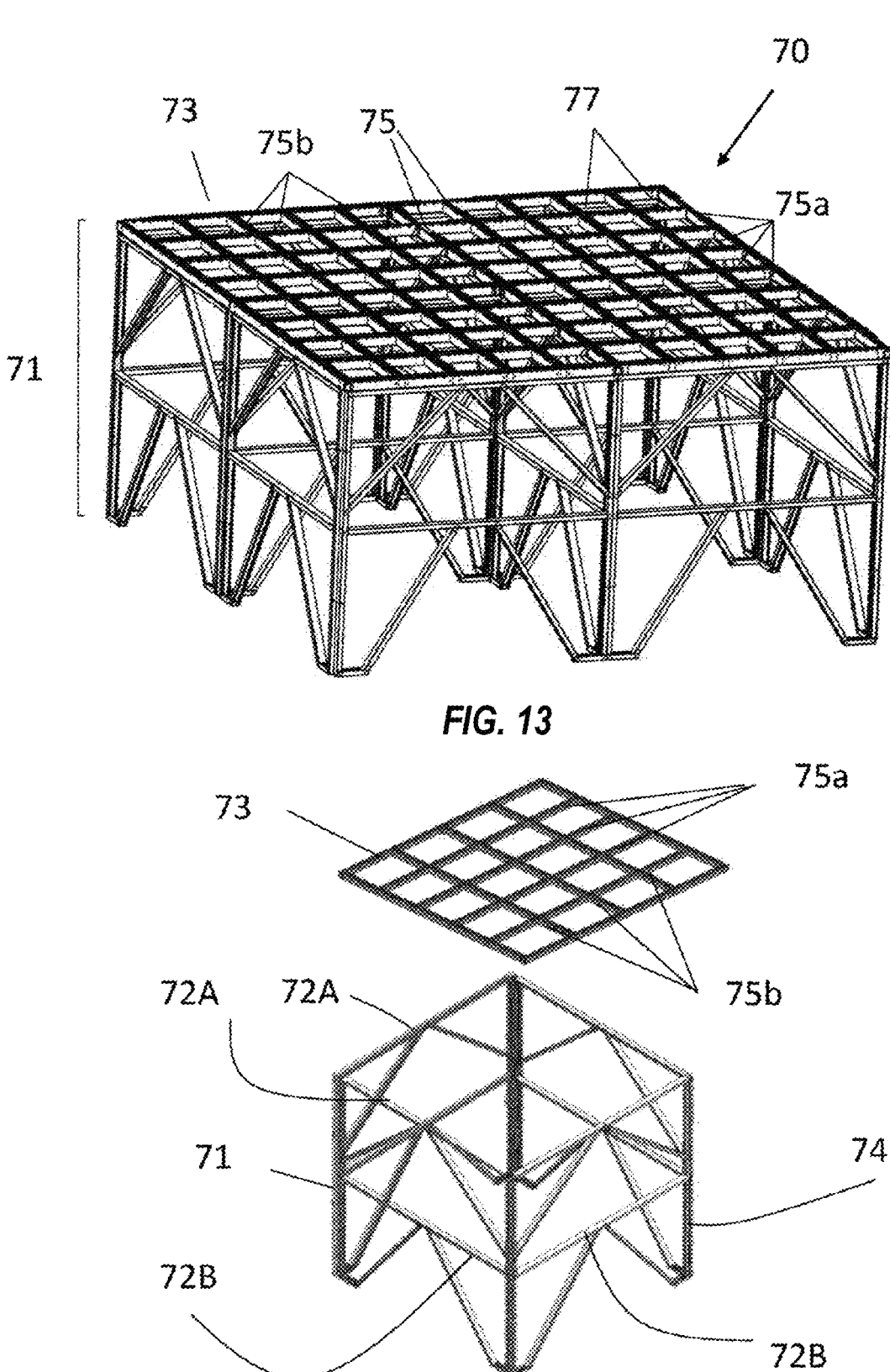
FIG. 13 is a perspective view showing the assembled grid framework structure.
FIG. 14 is a perspective view showing a track system being mounted to a support structure

There is provided a track system 73 for guiding movement of one or more robotic load handling devices on a supporting framework structure 71. The combination of the track system 73 and the supporting framework structure 71 is termed a grid framework structure 70, as shown in FIG. 13. When assembling the grid framework structure 70, the supporting framework structure 71 is first assembled and then the track system 73 is mounted to the supporting framework structure 70. The track system 73 is raised above the ground by the supporting framework structure 71 to create an open storage space for the storage of multiple stacks of storage containers. The supporting framework structure 71 or the track system 73 or both the supporting framework structure 71 and the track system 73 can be assembled from modular structural components. In the particular embodiment shown in FIG. 13, both the supporting framework structure 71 and the track system 73 are assembled from prefabricated modular structural components to form a three dimensional grid framework structure 70. Each of the prefabricated frames comprises a plurality of vertical members 74 braced by horizontal bracing members 72A, 72B. As shown in FIGS. 13 and 14, there are both upper horizontal bracing members 72A which form a frame on which the track system 73 is mounted, and lower horizontal bracing members 72B which together with the upper horizontal bracing members 72A increase the rigidity of the supporting framework structure 71.

The track system 73 is mounted to the supporting framework structure 71 such that the track system extends across a plurality of modular storage cells created a plurality of prefabricated frames, as shown in FIG. 13. The track system 73 comprises a plurality of tracks 75 arranged in a grid pattern comprising a plurality of grid cells 77. More specifically, the track system 73 comprises a first set of parallel tracks 75a extending in the first direction and a second set of parallel tracks 75b extending in the second direction, the second direction being substantially perpendicular to the first direction to adopt a grid like pattern.

Figure 15:
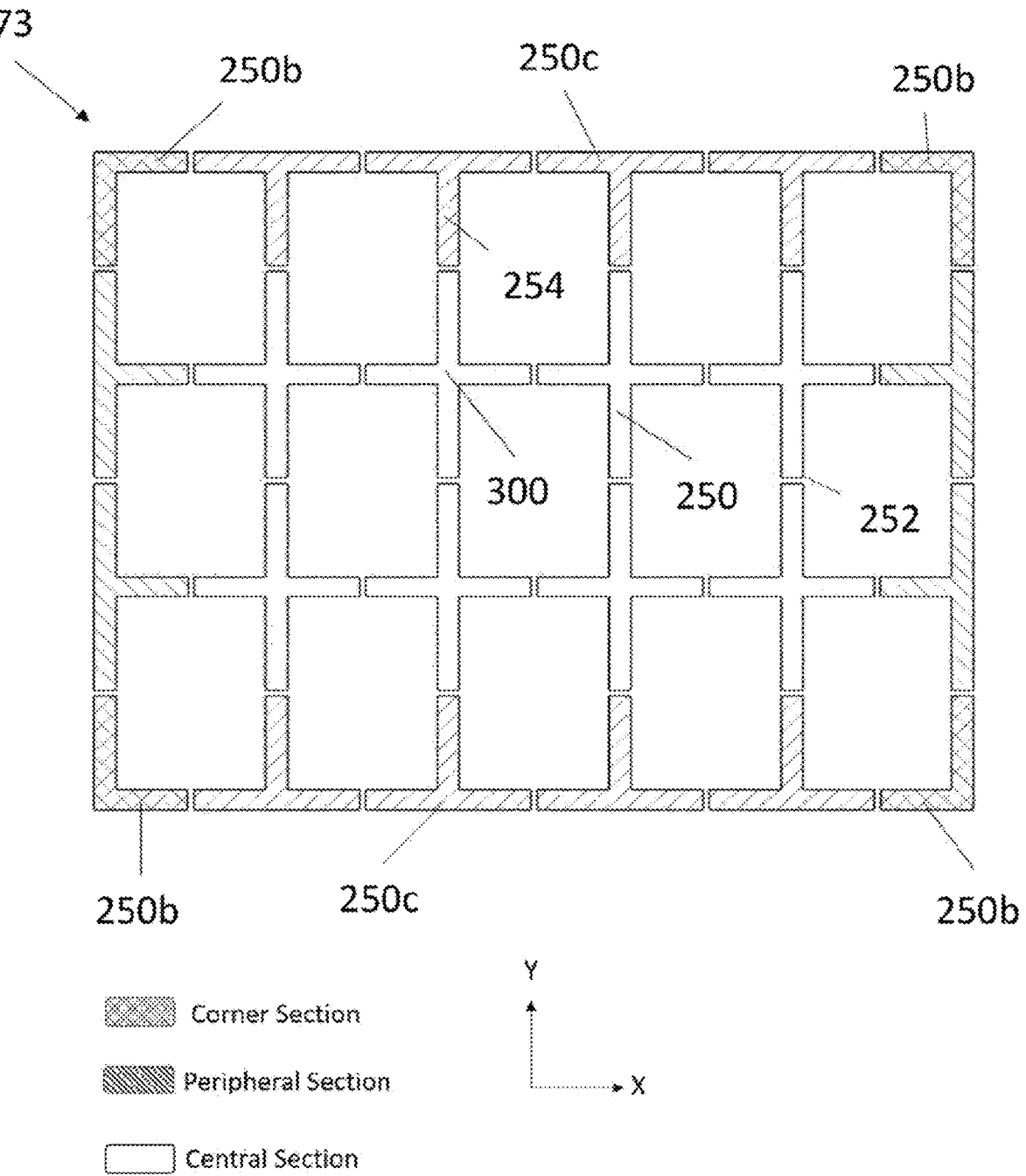
FIG. 15 is an illustration of the arrangement of track sections in a track system.

The different areas of the track system 73 where the track system has a rectilinear shape is shown in the sketch drawing of the pattern of the track sections in FIG. 15. The sketch of the pattern of track sections shown in FIG. 15 is not to scale and it is simply for illustration purposes. The track sections 250 at the corner section 250b of the track system 73 are shown with a different shaded area and each of the track sections 250b at the corner has two track elements 254, i.e. two branches. The track sections at the peripheral section 250c of the track system 73 are shown with a different shaded area. As shown in FIG. 15, each of the track sections 250c at the periphery of the track comprises three track elements 254, i.e. three branches. In the embodiment illustrated in FIG. 15, the track sections 250c at the periphery can have two track elements 254 extending in opposite directions along the first direction and a third track element 254 extending in the second direction, or two track elements 254 extending in opposite directions along the second direction and a third track element 254 extending in the first direction. The track sections 250c at the peripheral sections are not limited to having three track elements (or branches) 254 and can comprise more than three track elements depending on whether the peripheral section extends across more than one node 300. The nodes 300 represent the areas of the track system 73 where the individual track sections' 250 elements or branches intersect. For example, a peripheral section can comprise two track elements extending in opposite directions along the first direction and multiple track elements extending in the second direction for connecting to or meeting with adjacent track sections in the central section of the grid structure, i.e. more than three branches.

As is clearly apparent in the schematic sketch shown in FIG. 15, a substantial portion of the track system falls within the central section of the track where each of the track sections 250 is cross shaped having track elements that branch or extend in transverse directions, i.e. first direction (X) and second direction (Y). In all of the differently shaped track sections 250, 250b, 250c in the particular embodiment shown in FIG. 15, there is a one to one relationship between each of the plurality of track sections and each of the nodes 300 of the track system. For example, there is a one to one relationship between a track section 250b and the node 300 at the corner of the track/grid structure. Likewise, there is a one to one relationship between each of the track sections 250c and each node 300 at the periphery of the track system.

However, the present invention is not limited to there being a one to one relationship between each of the plurality of track sections and each of the nodes since a single track section can extend across more than one node in the track system. For example, the branches or track elements 254 of one or more of the track sections 250 can be sized to extend across one or more nodes of the track system. The larger sized track sections 250 would mean that fewer track sections 250 would be needed to make up the track system 73, i.e. to assemble the track system together. The distal ends 252 of one or more of the track elements 254 of adjacent track sections extend to meet between the nodes of the track system 73 as this is the area of the track system where the underlying track support is less susceptible to any vertical displacement. In all cases, each track section 250, 250b, 250c is a single unitary body having portions or elements 254 extending in transverse directions so as to provide a track surface or path for a load handling device to move on the track system extending in transverse directions. A single piece track section having a track surface or path extending in transverse directions greatly reduces the complexity and the components required to assemble the grid framework structure according to the present invention. Various materials can be used to fabricate the track section. These include various metals, e.g. aluminum, plastics, e.g. nylon and/or composite materials.

Figures 16A, 16B, 16C:
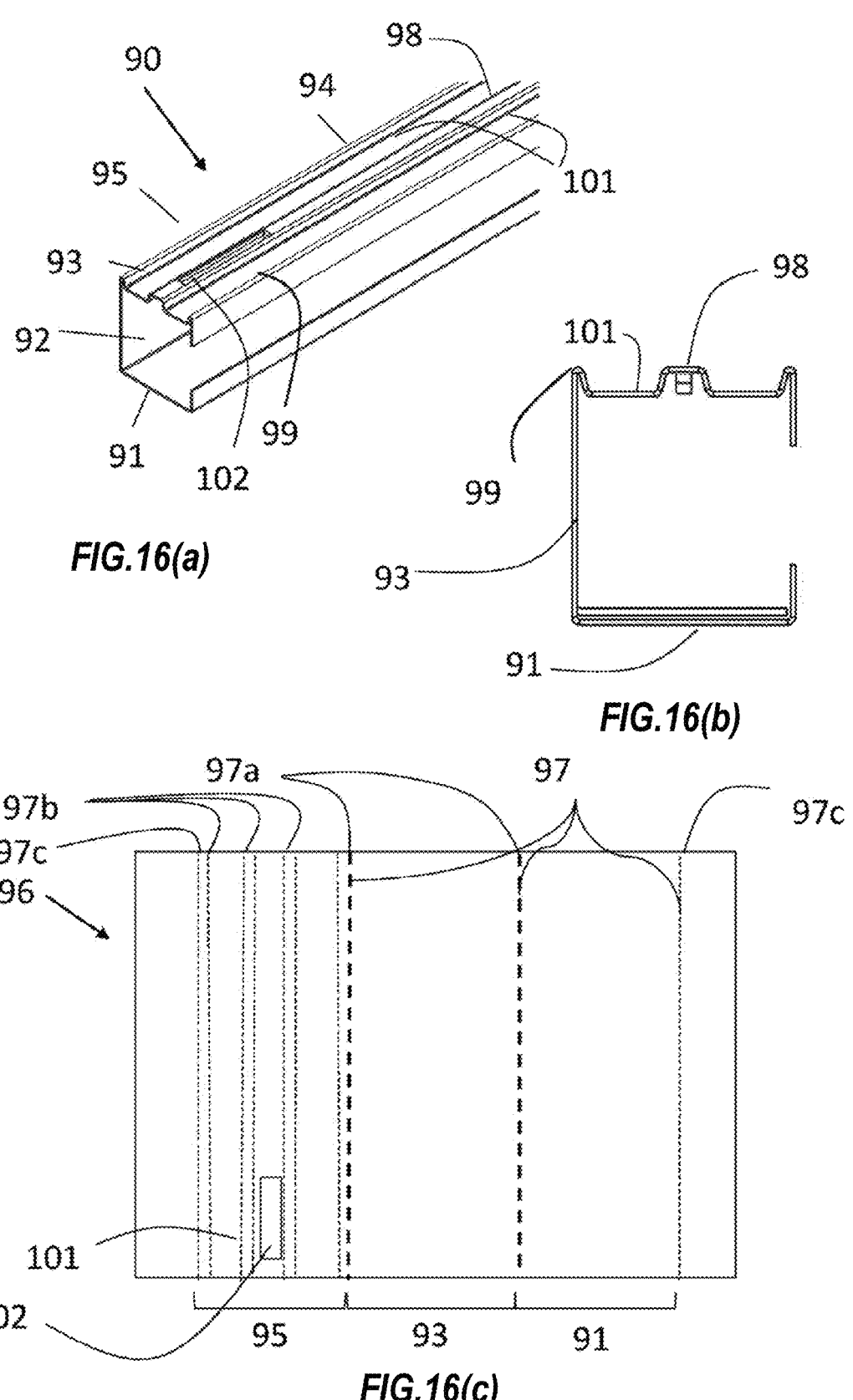
FIG. 16(*a*) is a perspective view of an elongated track element.

Whilst the track system 73 shown in FIG. 15 shows predominantly cross shaped and T shaped track sections 250, the track system can also be formed of a plurality of elongated track elements. One embodiment of an elongated track element is shown in FIG. 16. The elongate track element 90 is formed from a sheet metal blank 96 shown in FIG. 16(*c*). The sheet metal blank 96 is bent along bend lines 97 to form a substantially U-shaped cross-section. The bend lines divide the sheet metal blank into three sections which when folded form a bottom flange 91, a vertical element 93 and a top flange 95. The top flange 95 forms the track 94. The top flange 95, vertical element 93 and bottom flange 91 act as a track support i.e. the track is integral to the track support, as shown in FIG. 16(*a*). In FIG. 16(*c*), the bend lines 97 are formed as perforated lines which extend parallel with the longitudinal length of the elongate track element 90. Two bend lines 97a form the basis of the U-shaped cross section and divide the sheet metal blank into the three sections. As shown in FIG. 16(*c*), additional bend lines 97b located on the top flange 95 when folded form the track. FIG. 16(*c*) also shows bend lines 97*c* located near the free ends of the metal sheet blank 96 allowing the free ends to be inwardly turned, thereby forming a substantially U shaped or C-shaped elongated track element cross-section.

When formed from the metal sheet blank, the track 94 comprises a central raised region 98 for guiding the load handling device along the track system. The central raised region 98 extends along the longitudinal length of the track 94. Further, the track 94 comprises opposing ridges or lips 99 which run along the edges of the track 94 and extend along the longitudinal length of the track 94. The opposing ridges 99 act as retainers to ensure that a load handling device travelling along the track does not travel off the track. It is not necessary to have the opposing ridges 99 on the track as it may be sufficient to have a central raised region 98 to guide the load handling device but the opposing ridges 99 provide extra assurances that a load handling device stays travels along its designated course. The combination of the central raised region 98 and the ridges 99 extending along the longitudinal length of the elongated track element creates a pair of depressions 101 running side by side which extend along the longitudinal length of the elongated track element. The pair of depressions 101 create a path for the load handling device to travel, such that the wheels of the load handling device are cradled within the pairs of depressions meaning that it is difficult for the wheels to move out of the depressions onto a different course. The width of the depressions is wide enough so that the wheels of the load handling device do not rub up against the central raised region 98 and/or the opposing ridges 99.

As shown in FIGS. 16(*a*) and 16(*c*), there is an aperture 102 arranged in the track. The aperture is arranged such that a radio-frequency identification (RFID) sensor can be located beneath the aperture allowing the sensor to communicate with a load handling device passing over the RFID sensor. This allows the load handling device to be tracked and its location recorded on the grid framework structure 70.

Figure 17A:
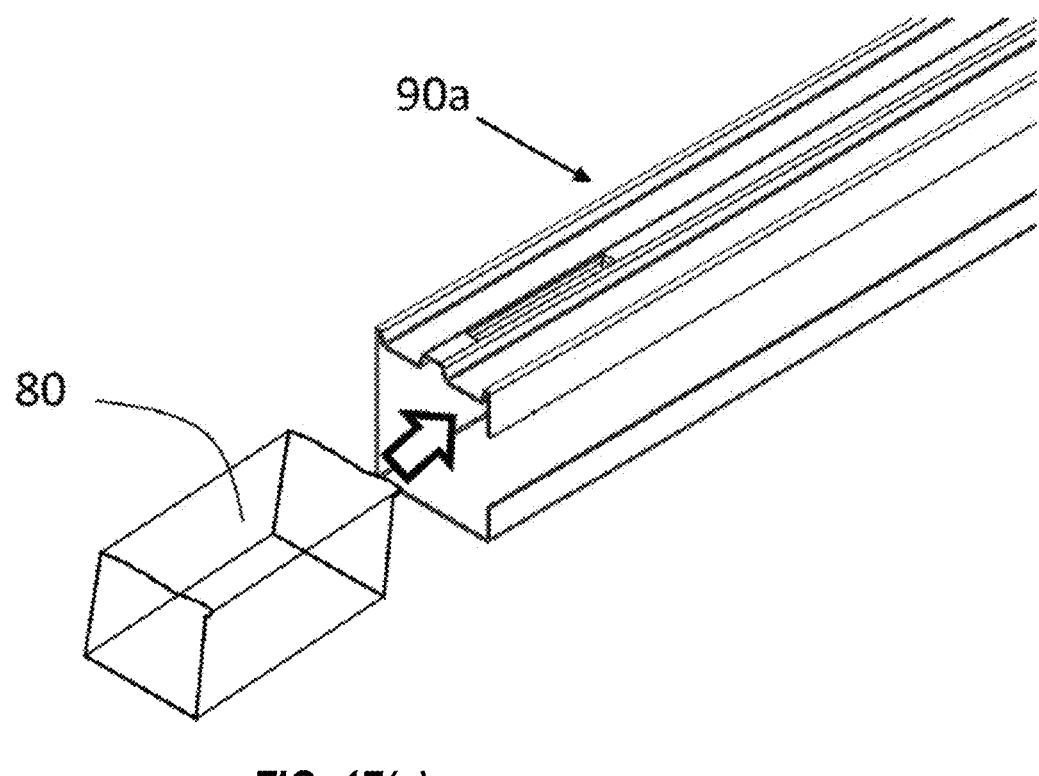
FIG. 17(*a*) is a perspective view of an insert being inserted into the elongated track element of FIGS. 16(*a*) and 16(*b*).
Figure 17B:
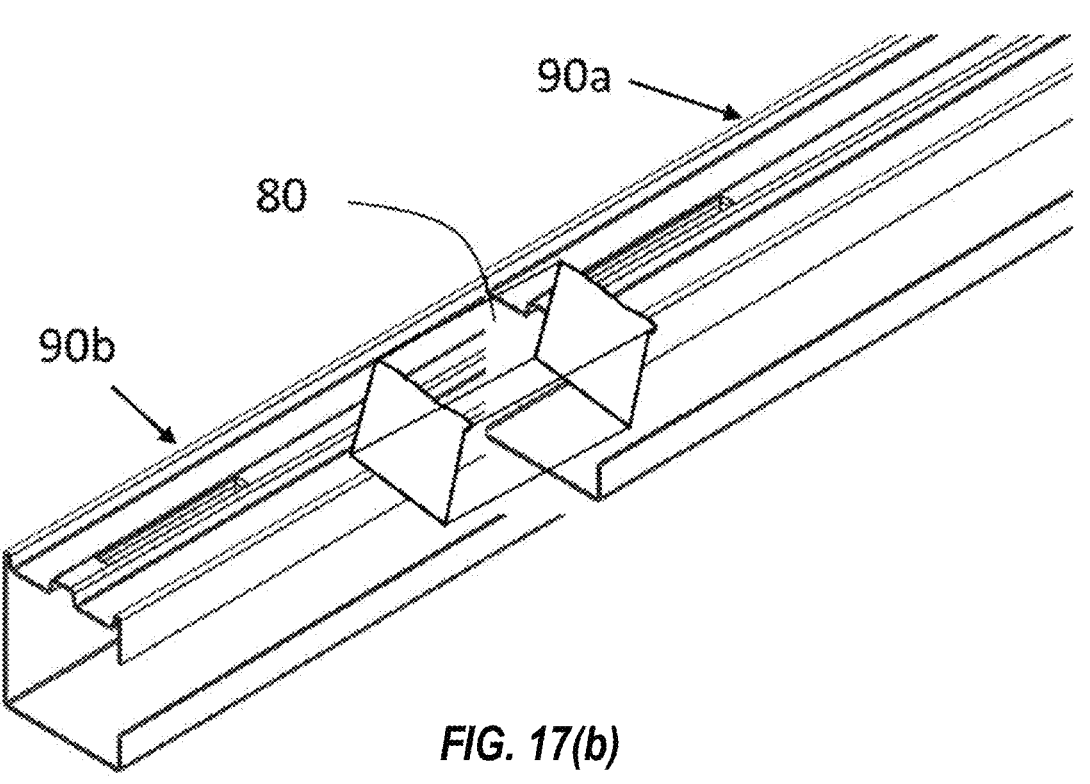

The elongated track elements 90 are joined to each other by an insert 80 as shown in FIG. 17(*a*). The insert 80 is cuboid shaped such that it fits within an elongated track element. The size (height and width) of the insert 80 is determined by the size of the cross-section of the elongated track element 90. The insert 80 has a slightly smaller height and a slightly smaller width than the height and width of the cross section of the elongated track element 90 such that the elongated track element 90 can slide over the insert 80 but there is some resistance between the elongated track element 90 and the insert 80 meaning that the insert 80 cannot readily be removed from the elongated track element 90. In order to join two elongated track elements 90*a*, 90*b* together such that the elongated track elements extend in the same direction, as shown in FIG. 17(*b*), the insert 80 is inserted into both an end of a first elongated track element 90*a* and an end of a second elongated track element 90*b* such that the respective ends of the first elongated track element and the second elongated track element connect or butt-up to each other. Thus, multiple track elements can be connected in a single direction in this way.

Figure 18A:
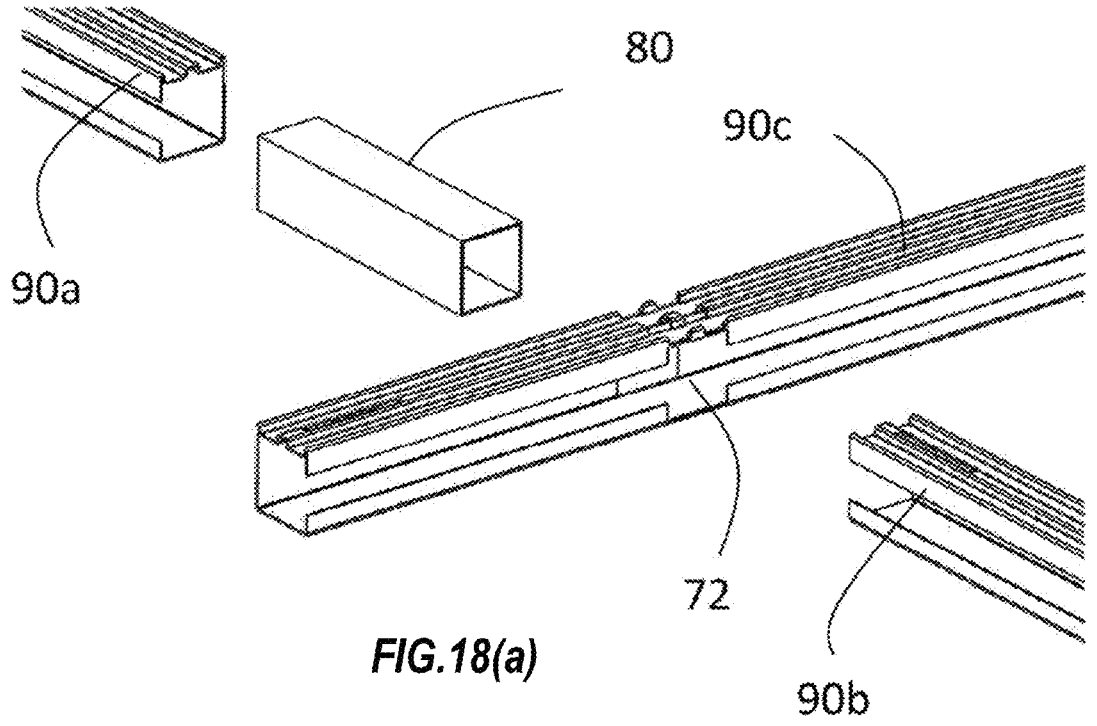
FIG. 18(*a*) is a perspective view of an insert being inserted into three elongated track elements in such a way as to form a four way junction.
Figure 18B:
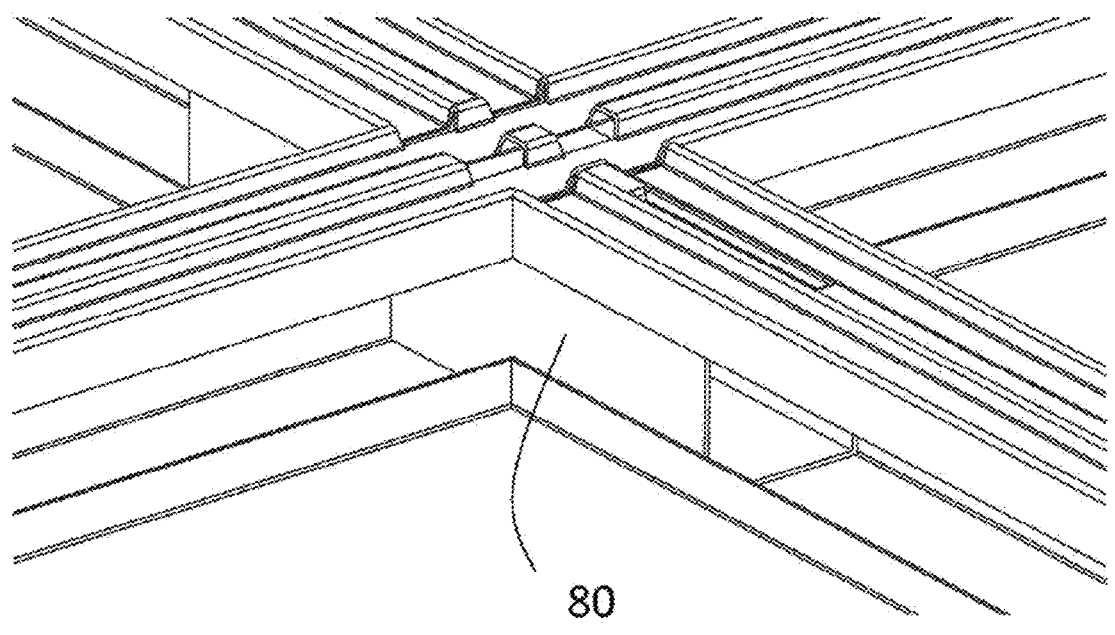

The elongated track elements 90 can also be joined to each other by an insert 80 to form a four way junction or node or intersection or intersection portion, as shown in FIG. 18. The junction comprises three elongated track elements: a first elongated track element 90*a*, a second elongated track element 90*b* and a third elongated track element 90*c*. The third elongated track element 90*c* comprises an opening 72 arranged to receive the insert 80 orientated perpendicular to the longitudinal length of the third track element 90*c*. Specifically, the opening 72 has a height and a width greater than the height and width of the insert 80, such that the insert 80 can fit within the opening 72 and is restricted from moving horizontally or vertically within the opening. The longitudinal length of the insert 80 is greater than the width of the third elongated track element 90*c*. Therefore when the insert 80 is positioned in the opening 72 of the third elongated track element 90*c*, the insert extends beyond third elongated track element 90*c* such that the second elongated track element 90*b* can be fitted onto one free end of the insert 80 and the first elongated track element 90*a* can be fitted onto the second free end of the insert 80. Thus the first elongated track element 90*a* and the second elongated track element 90*b* are connected together in a similar way to that shown in FIG. 17, but in FIG. 18, the first and second elongated track elements sandwich the third elongated track element 90*c* between them, as shown in FIG. 18(*b*).

Figure 19A:
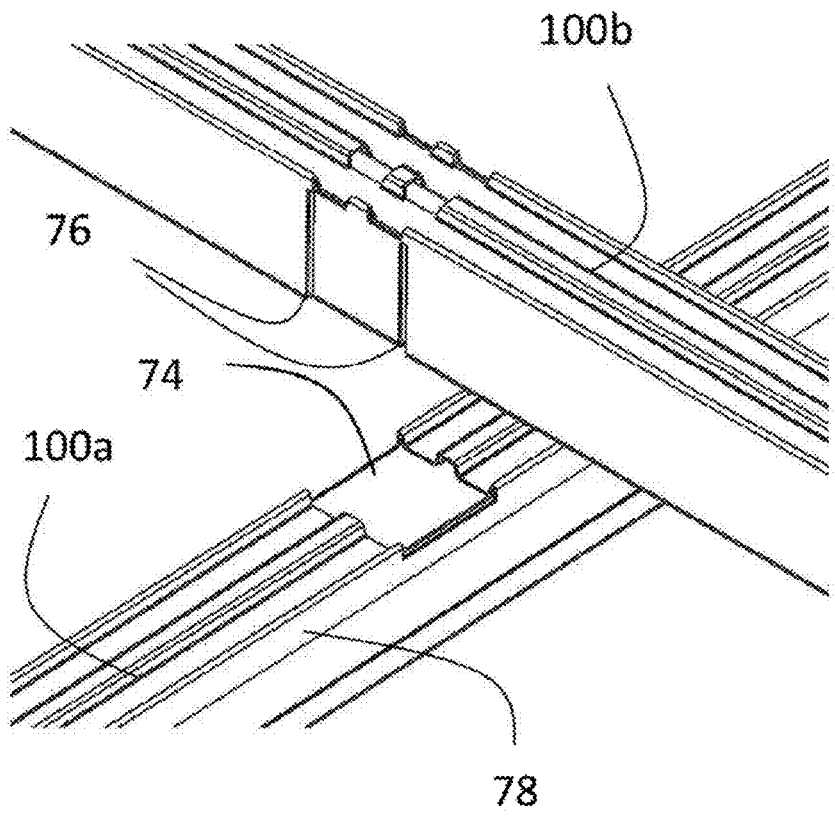
FIG. 19(*a*) is a perspective view of two elongated track elements being fitted together to form a four way junction or intersection.
Figure 19B:
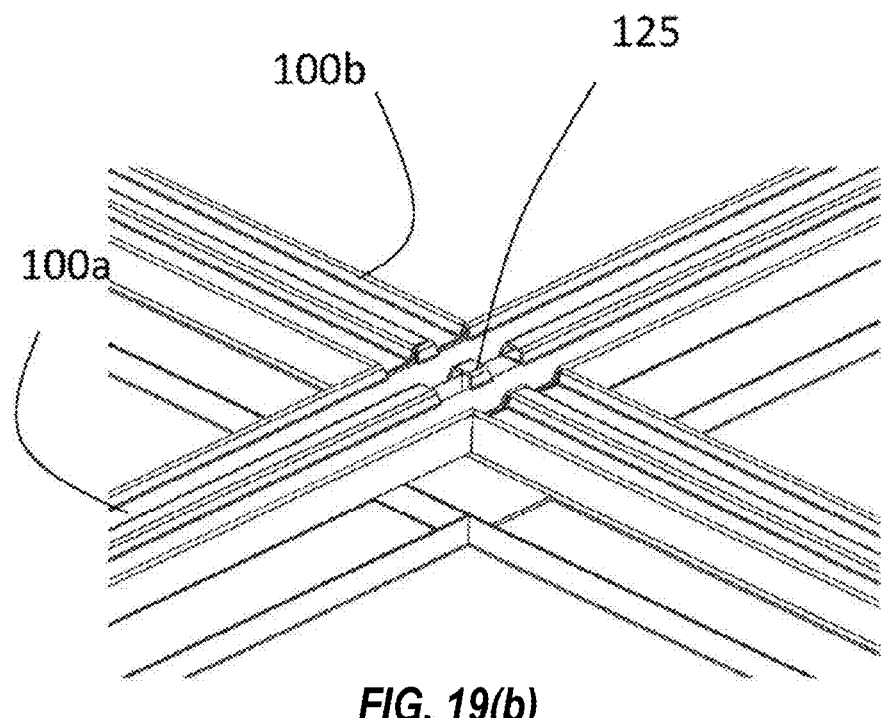

Alternatively, the elongated track elements 90 can be joined to form a four way junction or node or intersection as shown in FIG. 19. In contrast to FIG. 18, which requires elongated three track elements to form a four way junction, in FIG. 19 only two elongated track elements are required to form a four way junction and there is no need for an insert. Further, in FIG. 18, the elongated track elements are fitted together by moving the insert and elongated track elements in a horizontal direction whilst in FIG. 19, the elongated track elements are fitted together by moving the elongated track elements in a vertical direction. In FIG. 19, a first elongated track element 100*a* comprises an cut-out 74 in its top flange. Additionally, and similar to the first elongated track element shown in FIGS. 17 and 18, the first elongated track element comprises a vertical element (not shown) and a folded free end 78 which is aligned parallel with the vertical element of the first elongated track element 100*a*. A second elongated track element 100*b* comprises a pair of slots 76 in the vertical element extending between the top and bottom flanges. The second elongated track element 100*b* is orientated in a first direction and the first elongated track element 100*a* is orientated in a second direction perpendicular to the first direction. To connect the first elongated track element with the second elongated track element, the second elongated track element 100*b* is pushed down onto the first elongated track element 100*a* such that one of the pair of slots 76 is aligned with and fully engages with the vertical element and the folded free end 78 of the first elongated track element 100*a*. The first elongated track element 100*a* has the same height as the second elongated track element 100*b* so when the two elongated track elements are interlocked with each other, as shown in FIG. 19(*b*), the integral tracks are at the same level. Further, the track of the second elongated track element 100*b* comprises an island 125 at the intersection between the first and second elongated track elements allowing a load handling device to change direction at the intersection.

In contrast to the track system having a track integrated into the top flange of the U-shaped cross section as shown in FIGS. 17 to 19, it is also possible to have a track system where the track is separate to the track support and the track is mounted to the track support. Examples of track systems having separate tracks and track supports are shown in FIGS. 20 and 21.

Figures 20A, 20B, 20C:
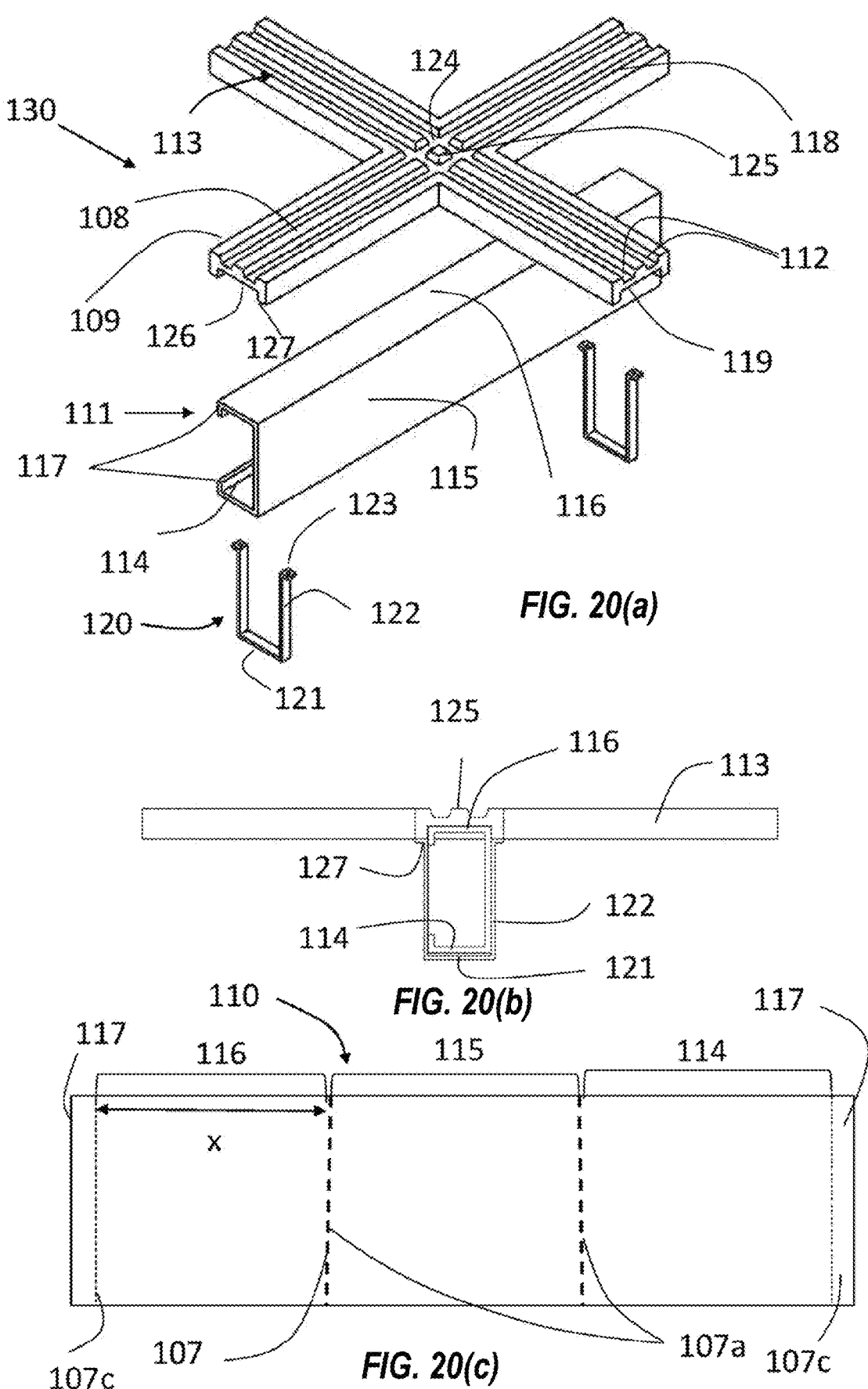
FIG. 20(*a*) is a perspective view of a track system comprising a track and track support and brackets.

In FIG. 20, the track system 130 comprises a track support 111 and a separate track section 113. The track support 111 is formed from a metal sheet blank, as shown in FIG. 20(*c*). The metal sheet blank 110 comprises bend lines 107 indicating where the metal sheet blank needs to be bent in order to form a U-shaped cross-section. Bending along only two bend lines 107a is required to form the U-shaped cross-section. But as FIG. 20(c) shows, additional bend lines may be incorporated in the metal sheet blank. In particular, additional bend lines 107c are located near the free ends of the metal sheet blank 110 such that the free ends of the metal sheet blank can be inwardly turned towards each other to form a substantially U shaped or a substantially C-shaped cross section. As shown in FIG. 20(c), the metal sheet blank 112 can be bent into shape to form a bottom flange 114, a vertical element 115 and a top flange 116. The bottom flange 114, vertical element 115 and top flange 116 may have the same width x in the sheet metal blank, or the top and bottom flanges may have shorter widths compared to the vertical elements. The width x of the top flange 116 needs to be able to fit under a track section 113.

The track shown in FIG. 20 is specifically a track section, similar to the track sections 250 shown in the central section in FIG. 15. The track section 113 in FIG. 20 is cross shaped having track elements that branch or extend in transverse directions, i.e. first direction (X) and second direction (Y). There is a one to one relationship between each of the plurality of track sections and each of the nodes 300 of the track system. For example, there is a one to one relationship between a track section 250b and the node 300 at the corner of the track/grid structure.

The track section 113 shown in FIG. 20(a) comprises an upper surface 118 and a lower surface 119. The upper surface 118 comprises a raised central portion 108 running down the longitudinal length of the track and a pair of opposing ridges or lips 109 running parallel down the edges of the longitudinal length of the track. Between the raised central portion 108 and the pair of opposing ridges 109 are a pair of depressions 112 running side by side along the longitudinal length of the track, creating a path for a load handling device to travel. The track section 113 of FIG. 20(a) extends in both a transverse direction and a perpendicular direction and is formed as a single body. The track section comprises a node or intersection portion 124 where the track elements extending in the transverse direction meet the track elements extending in the perpendicular direction. The intersection portion 124 is devoid of a raised central portion and instead has an isolated raised cube or island 125 allowing a load handling device to change direction at the intersection portion 124. Whilst the track section of FIG. 20(a) is shown with an intersection and track elements of equal length, it is also possible to have tracks elements of different lengths. The lower surface 119 of the track section comprises a recess 126 into which the top flange 116 of the track support 111 can fit. Protrusions 127 on either side of the recess 126 means that the track section is not moveable laterally when positioned on the top flange 116 of the track support 111.

The track system 130 of FIG. 20 also comprises brackets 120. The brackets are U-shaped such that each bracket comprises a horizontal base element 121, a pair of vertical elements 122 extending from each end of the horizontal base element 121, and a pair of horizontal fixation points 123. The horizontal fixation points 123 extend horizontally from each of the free ends of the vertical elements 122. When the lower surface 119 of the track section 113 is fitted onto the top flange 116 of the track support 111, the bracket 120 can be fitted such that the horizontal base element 121 of the brackets 120 supports the bottom flange 114 of the track support 111 and one of the pair of vertical elements 122 of the bracket extends parallel and next to the vertical element 115 of the track support 111. The brackets 120 are fastened to the lower surface 119 of the track section, and specifically fastened to each of the protrusions 127 of the lower surface of the track section 113, as shown in FIG. 20(b). In FIG. 20, two brackets are used to fasten the track section 113 to the track support 111. Specifically one bracket 120 is used to fasten one track element to the track support.

Figures 21A, 21B, 21C:
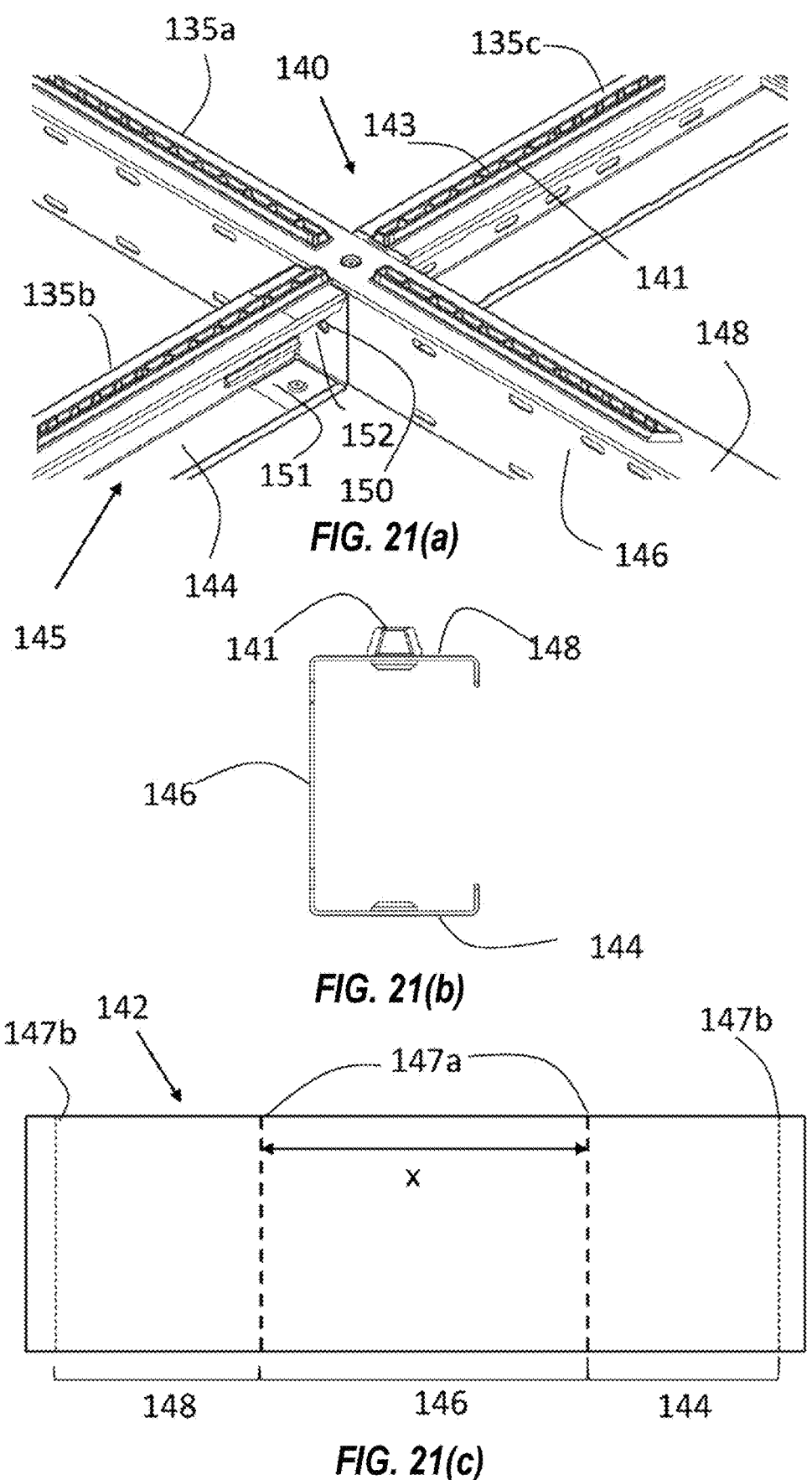
FIG. 21(*a*) is a perspective view of a further track system comprising a track and track support.

FIG. 21 shows a further embodiment of a track system 140. The track system 140 comprises a track support 145 and a track subdivided into track sections 141. The track support 145 has a U-shaped cross section and comprises a bottom flange 144, a vertical element 146 and a top flange 148. The top flange 148 and the bottom flange 144 oppose each other. The track support 145 is formed from a metal sheet blank 142, as shown in FIG. 21(c). The metal sheet blank 142 comprises bend lines 147a for bending the metal sheet blank into a U-shaped cross-section. In order to form the U-shaped cross-section, the metal sheet blank only needs to be bent along 2 bend lines. As shown in FIG. 21(c), there are additional bend lines 147b for inwardly bending the free ends of the metal sheet blank. FIGS. 21(b) and 21(c) show that the vertical element 146 has a greater width x than the bottom flange 144 and top flange 147. However, the vertical element 146 may alternatively have the same width as the bottom flange 144 and top flanges 148.

The track section 141 comprises a raised central region 143 and is fitted directly onto the top flange 148 of the track support 145. Specifically, the track section 141 may be glued onto the track support, or as shown in FIG. 21(b), the track section 141 may be bolted or screwed onto the top flange 148 of the track support. The track section 141 may be made from plastic, or metal.

FIG. 21(a) shows that three track supports (a first track support 135a, a second track support 135b and a third track support 135c) are required to form a four way junction or intersection or node in the track system. Specifically, a bracket 150 comprising a top flange (not shown), a bottom flange 151 and a vertical element 152 extending between the top flange and the bottom flange 151 is connected to the second track support 135b such that the bottom flange 151 of the bracket 150 is fastened to the bottom flange 144 of the second track support 135b and the top flange of the bracket 150 is fastened to the top flange 148 of the second track support 135b. The vertical element 152 of the bracket 150 is then bolted to a vertical element 146 of a second track support 135b, such that first track support 135a and second track support 135b are fastened to each other at 90 degrees forming an intersection portion and specifically a T-junction. Similarly, an identical bracket to the one attached to the first and second track supports 135a, 135b is used to fasten the third track support 135c to the first track support 135a to form a cross-shaped intersection.

The second track support 135b and third track support 135c are positioned such that both the second and third track supports 135b, 135c are perpendicular to the first track support 135a and such that the second and third track supports extend in the same direction and along the same path. The first track support 135a can extend for the entire length of the grid framework structure and other track supports can be bolted onto the vertical elements at appropriate points along the first track support. As shown on FIG. 21(a), there is no track at the node to allow a load handling device to change direction.

Figure 22:
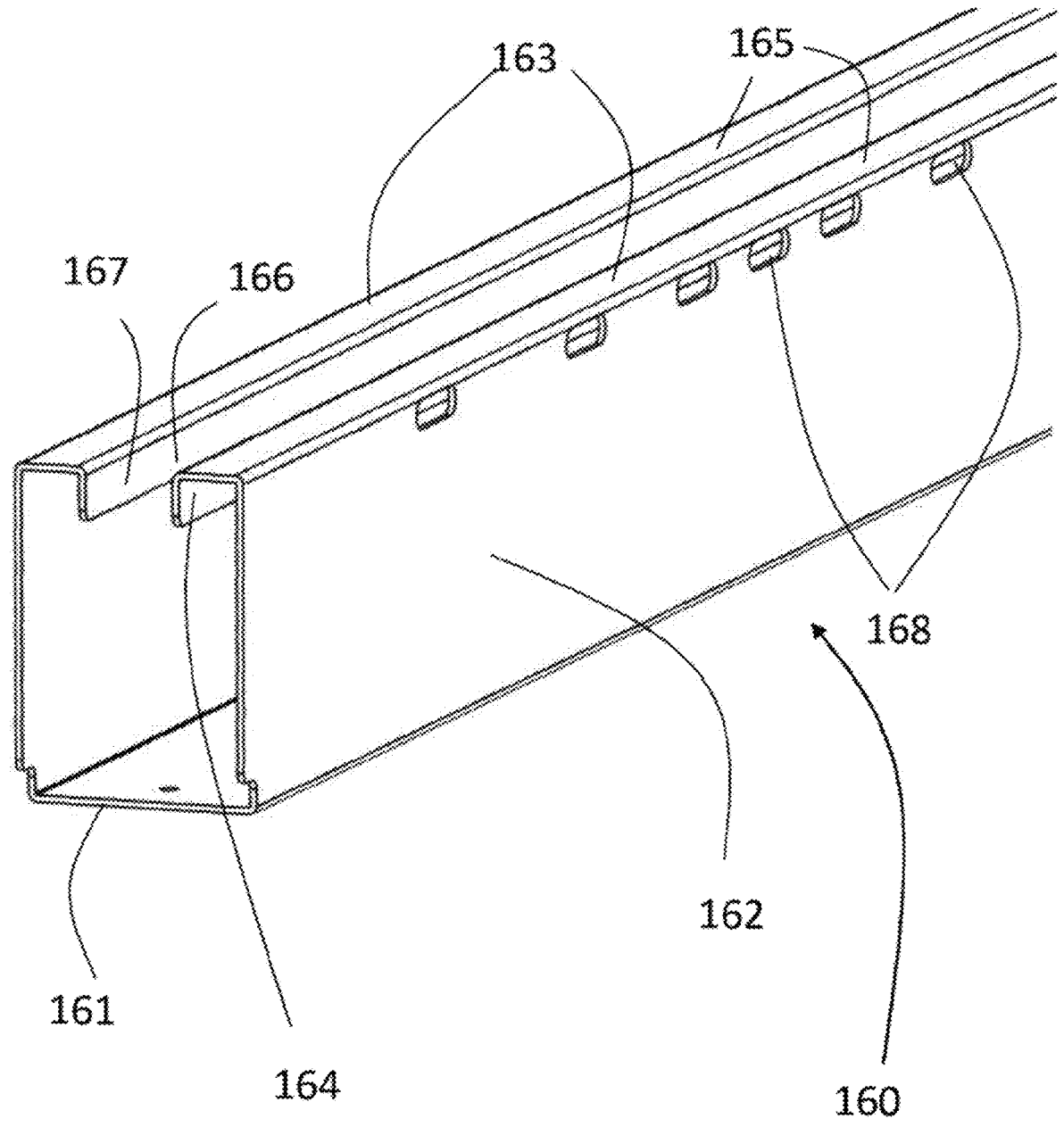
FIG. 22 is a perspective view of a further track support.

FIG. 22 shows a further embodiment of a track support. The track support 160 comprises a base horizontal element 161, a pair of vertical sides 162 and a pair of horizontal elevated flanges 163. The base horizontal element 161 and the pair of vertical sides 162 together form a U-shaped cross-section. The pair of horizontal elevated flanges 163 are formed by inwardly folding both free ends of a folded sheet metal blank such that the free ends extend towards each other and form a track support surface 165 on which the track can be mounted. Thus, the combination of the base horizontal element 161, the pair of vertical sides 162 and the horizontal elevated flanges 163 forms a substantially rectangular cross section. However, the pair of horizontal elevated flanges 163 do not meet. Instead, the track support surface 165 comprises an open channel 166 extending along the longitudinal length of the track support 160. Downwardly extending elements 167 extend from the horizontal elevated flanges 163 towards the base horizontal element 161. The downwardly extending elements 167 define the sides of the open channel 166. The track support 160 also comprises slots or cut outs 168 on the vertical sides 162. The slots 168 are spaced relatively evenly apart in FIG. 22 and each slot extends along a portion of the longitudinal length of the track support 160. The slots 168 provide a means of engagement between the track and the track support.

The track support 160 of FIG. 22 may be formed from a metal sheet blank, by for example, cold rolling. As shown in FIG. 22, there are four bends within the vicinity of the supporting surface 165. By having multiple bends within the vicinity of the supporting surface 165, there is increased rigidity within the track support 160 and particularly the supporting surface 165.

Figure 23A:
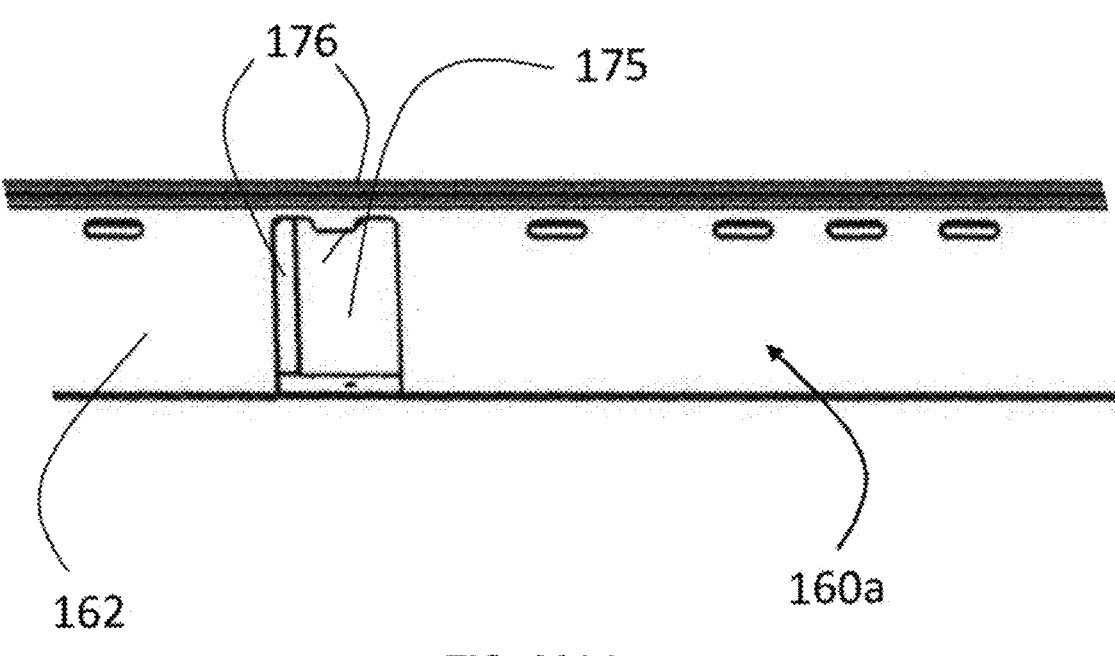
FIG. 23(*a*) is a side view of the track support of FIG. 22.
Figure 23B:
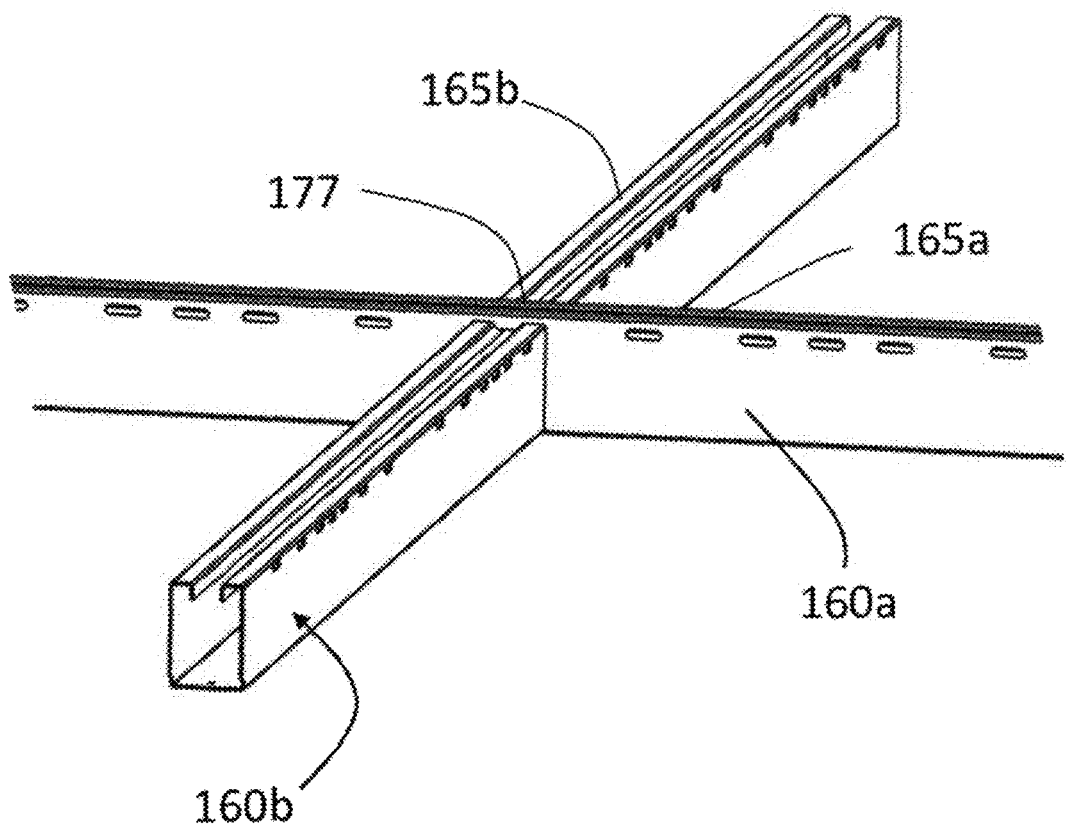

The track support 160a of FIG. 22 comprises an cut-out 175 in the pair of vertical sides 162, as shown in FIG. 23(*a*). The cut-out 175 has a profile that corresponds to the cross sectional profile of a second track support 160b such that a second track support 160b can be inserted into the cut-out 175 thereby forming an intersection portion between a first track support 160a and a perpendicular second track support 160b. In particular, the cut-out 175 is substantially rectangular and the cut-out is shaped such that it engages with the open channel 166, downwardly extending elements 167 and supporting surface 165 of a second track support 160b. Thus the interaction between the shape of the cut-out 175 of the first track support 160a and the downwardly extending elements 167 and supporting surface 165 of the second track support 160b creates a guiding mechanism for fitting and sliding the two track supports together. The cut-out 175 is fully defined by the first track support 160a such that when the second track support 160b is inserted into the cut-out 175, the second track support 160b is supported vertically (from beneath and above) and horizontally (from both sides) by the first track support 160a. When the second track support 160b is inserted into the cut-out 175, the base horizontal element 161 of the second track support 160b rests on the base horizontal element 161 of the first track support 160a.

In order for the second track support 160b to fit within the cut-out 175 of the first track support 160a, the height of the second track support is smaller than the height of the first track support. Thus, in a track system, a first set of track supports 160a extending in a first direction will have a particular height, and a second set of track supports 160b extending in a second direction will have a particular height smaller than the height of the first set of track supports. Other than the difference in height between the first set of track supports 160a and the second set of track supports 160b, the first set of track supports 160a and the second set of track supports 160b have identical features. The second set of track supports 160b may or may not comprise cut-outs like the cut-out 175 shown in FIG. 23(*a*).

Figure 24:
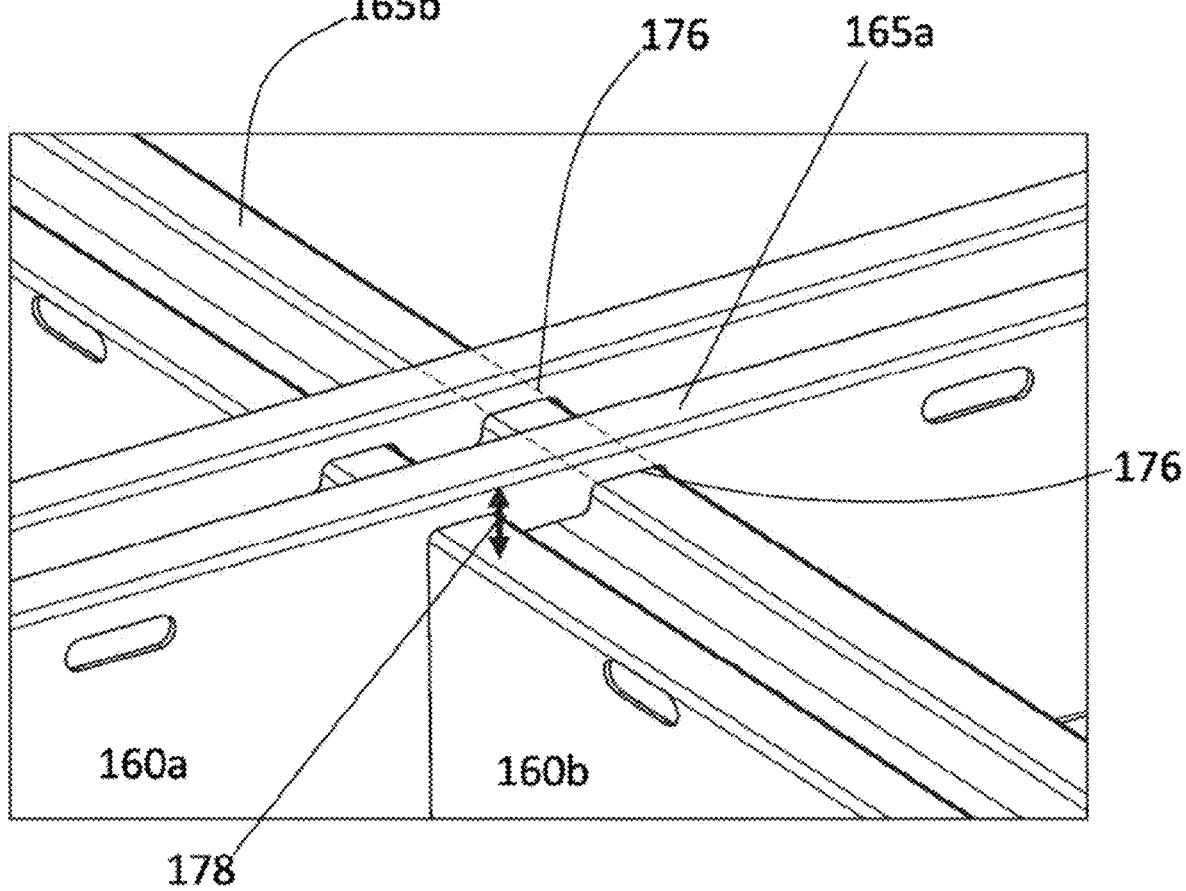
FIG. 24 is a close-up perspective view of the intersection between the track support and second track support of FIG. 23(*b*).

As shown in FIG. 23(*b*), a second track support 160b is inserted into the cut-out 175 of the first track support 160a such that an intersection portion or node 177 is formed centrally along the longitudinal length of the second track support. The cut-out 175 is formed of two apertures 176 which are identical, each aperture 176 being formed in each vertical side 162 of the first track support 160a, as shown in FIG. 24. In a track system, the second track support can have a length of 0.5 m, to 1 m, or 1 m to 1.5 m, or 1.5 m to 2 m, or greater than 2 m and can therefore pass through one or more first track supports. Similarly, the first track supports can have a length of 0.5 m to 1 m, or 1 m to 1.5 m, or 1.5 m to 2 m, or greater than 2 m and comprise one or more cut-outs for receiving one or more second track supports. Thus overall in the track system, there may be few track supports which extend over large areas, thereby minimizing labor and material costs.

Figure 25:
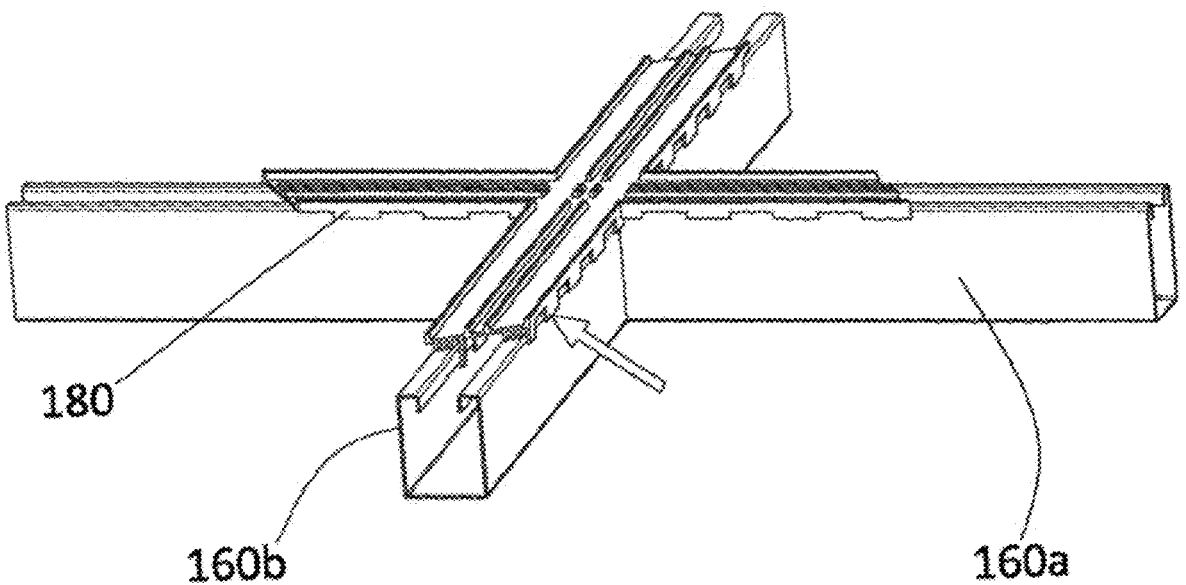
FIG. 25 is a perspective view of a track system comprising a track mounted on the track support of FIGS. 22 to 24.
Figure 26:
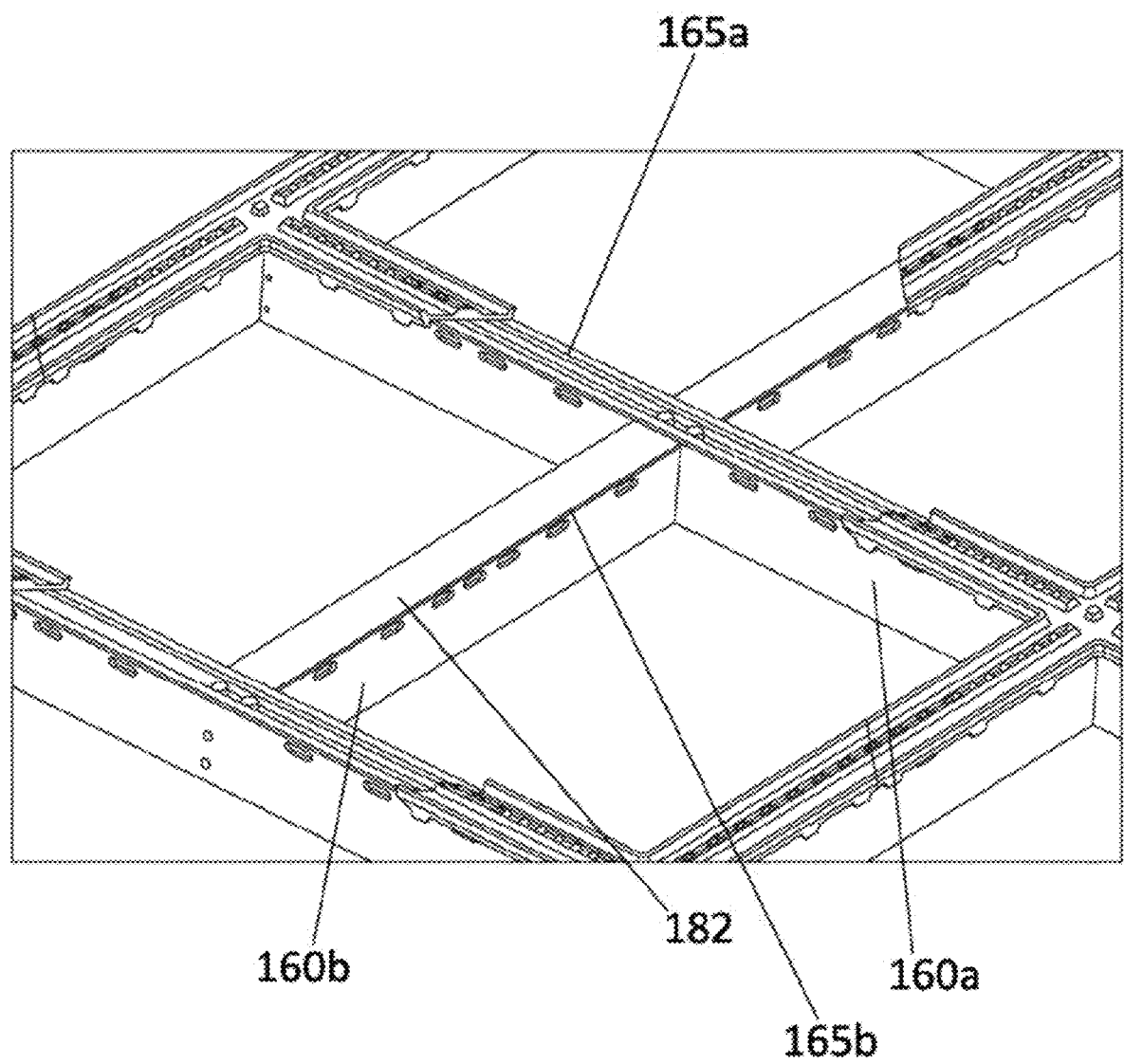
FIG. 26 is a perspective view of shims mounted onto track supports of the track system.

Since the first track support 160a is greater in height than the second track support 160b, when the second track support is inserted into the cut-out 175 of the first track support, a step 178 is formed at the interface between the first and second track supports. The step 178 is shown in FIG. 24. The step 178 may be less than 10 mm or may be less than 5 mm, which although small, may cause difficulties for a load handling device travelling along the path of the second track support 160b. To solve this problem, a separate track 180 is fitted onto the track supports 160a, 160b, as shown in FIG. 25. The track 180 is arranged such that it extends in a transverse and a perpendicular direction to form a track intersection portion. The track 180 is fitted such that it rests on the track support surface 165a of the higher first track support 160a. In order to avoid the track becoming imbalanced and vertically tilting in the direction of the lower second track support 160b, a shim 182 is mounted onto the track support surface 165b of the second track support 160b (shown in FIG. 26) and the track 180 is mounted onto the shim 182 and onto the track support surface 165a of the first track support 165b. The track therefore masks the step formed at the intersection or node 177 of the track supports and the shim 182 allows the track 180 to be mounted onto a surface which is equal in height to the track support surface 165a of the first track support 160a.

The term "track" in the context of the present application can be construed to encompass an assembly of a first set of parallel tracks extending in the first direction and a second set of 10 parallel tracks extending in the second direction. The track or plurality of tracks are subdivided into a plurality of track sections, each track section comprises a first track section element extending in a first direction and a second track section element extending in a second direction. The term "track" can therefore also be construed to encompass an individual track section.

Figure 27A:
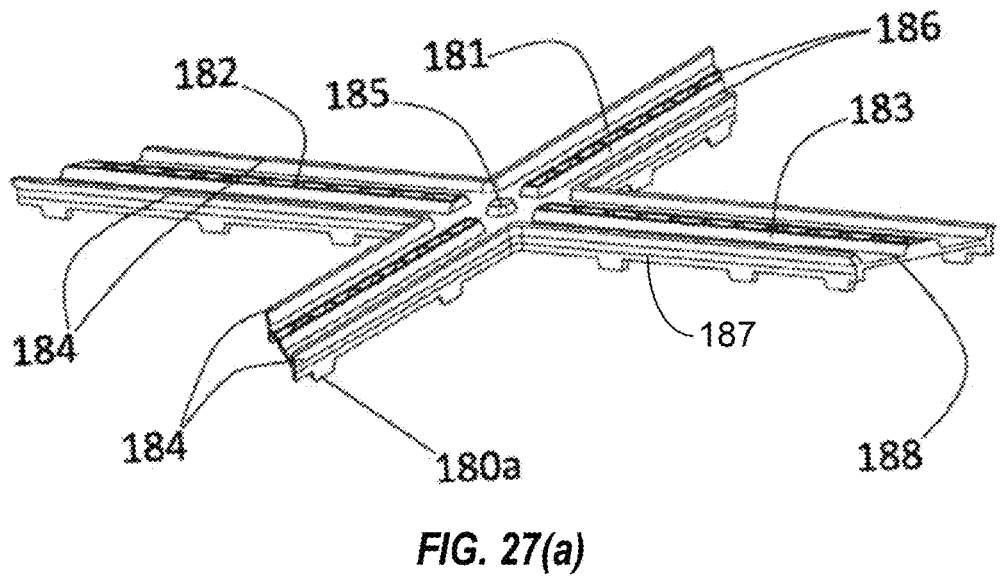
FIG. 27(*a*) is a perspective view of a track section for mounting onto the track support of FIGS. 22 to 26.
Figure 27B:
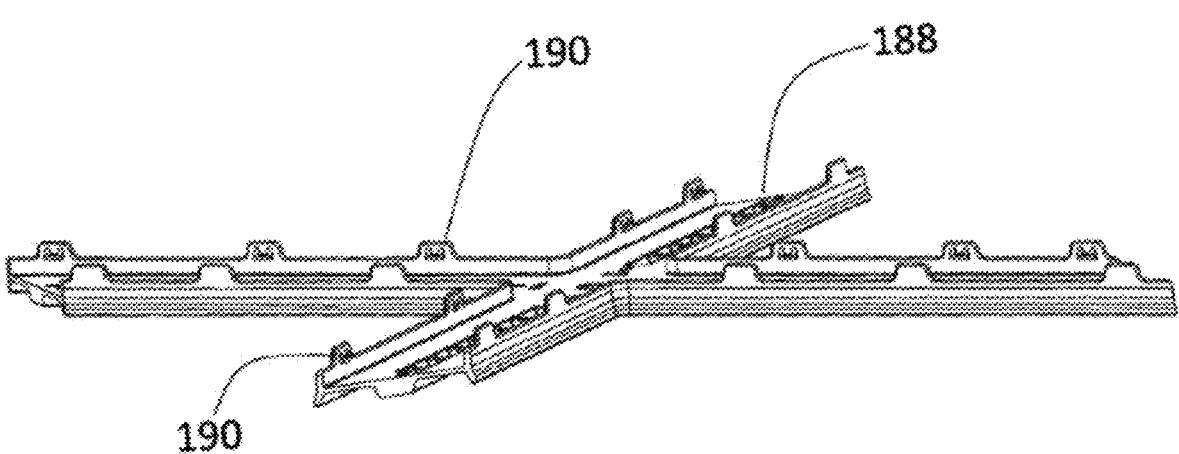

FIGS. 27(*a*) and 27(*b*) show the same track 180 as FIG. 25. Specifically, the track comprises a track section 180a for mounting onto a track support surface on a track support. The track section is formed as a single integral body in that the track section comprises a first track section element 181 extending in a first direction and a second track section element 187 extending in a second direction, and the second direction is perpendicular to the first direction, thereby creating a cross shape track section. Each of the track section elements comprise a raised central portion 183 and a pair of opposing ridges 184. Between the raised central portion 183 and the pair of opposing ridges is a pair of depressions 186 running side by side along the longitudinal length of the track. The pair of depressions define a path for the one or more load handling devices.

To allow one or more load handling devices to cross at the crossing or intersection of the track section, i.e. cross at the cross roads, which correspond to the nodes of the track system, the crossing or intersection of the tracks comprises a small island 185 as shown in FIG. 27(*a*) so as to permit the wheels to be guided in transverse directions. This is particularly the case in areas where the tracks cross or intersect, which are predominantly around the central section of the track system.

Whilst having cross shaped track sections help to mitigate the unevenness of the underlying track support structure, the distal ends of the track section elements of adjacent track sections are also susceptible to unevenness, particularly, when they meet between the nodes. The distal ends of the track section elements 181, 187 may create a step at the junction between adjacent track sections 180*a* and if left unchecked cause a vertical displacement of the wheels of a travelling load handling device across the junction between the connecting adjacent track sections. To mitigate this step, the distal ends of the track section elements 181, 187 are mitred or tapered as shown in FIGS. 27(*a* and *b*). The junction between adjacent track sections comprises at least one tapered (or mitred) edge 188 changing the conventional 90° angle cut to a substantial 45° angle cut edge. Thus, before the wheels of the load handling device rolls over the edge of a first track section completely, part of the wheels already has touched the tapered (or mitred) edge 188 of a second track section This provides a gradual transition of adjoining track sections and prevents the wheels from sinking into any gap between the distal ends of adjacent track section portions.

Figure 28:
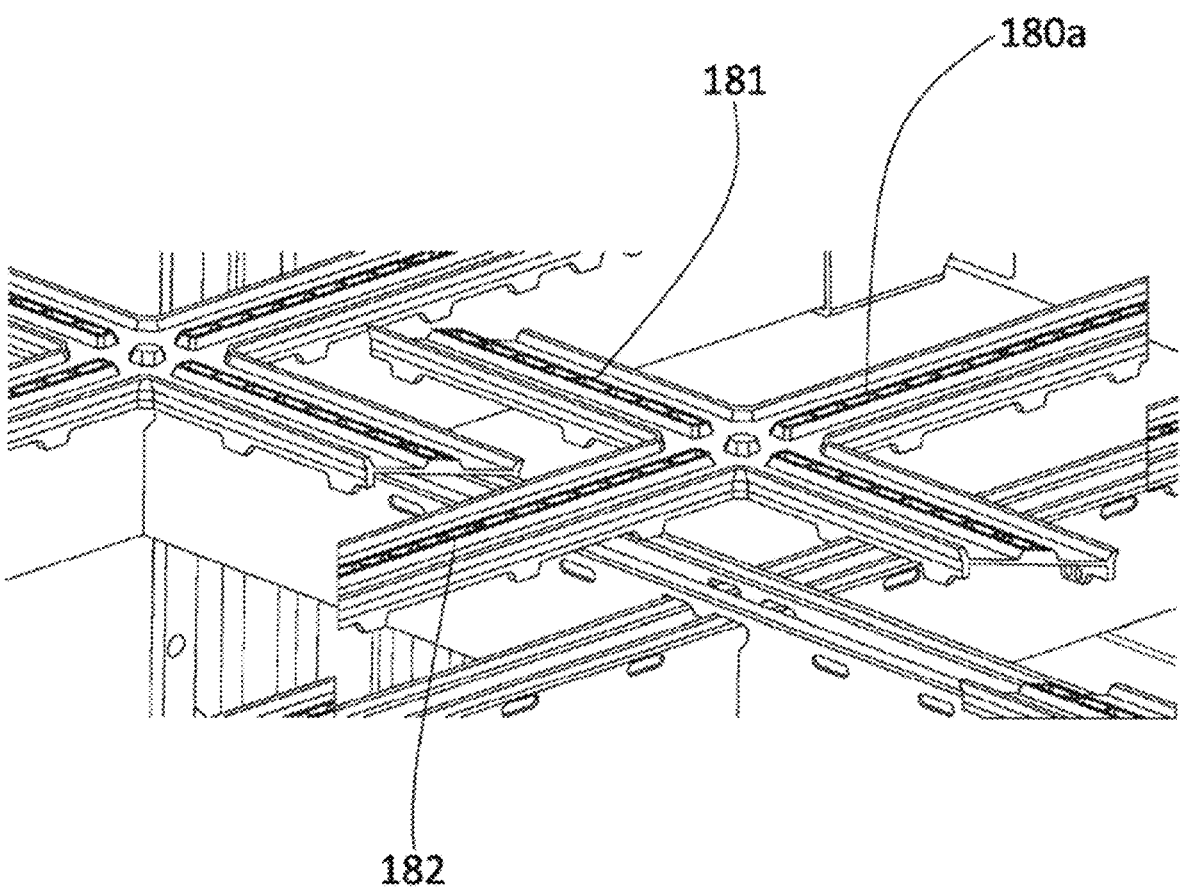
FIG. 28 is a perspective view of a plurality of the track sections of FIGS. 27(*a*) and 27(*b*) mounted onto the track support of FIGS. 22 to 26.

To secure the plurality of tracks to the track support structure, each of the track sections can be snap fitted to the track supports. As shown in FIG. 27(*b*), the underside of the track section comprises one or more lugs (or tabs) 190 that are configured to be snap fitted to the track support 160. The one or more lugs 190 can comprises a bead or protruding edge that is arranged to deflect and be received in one or more slots 168 in opposing vertical side walls (or vertical sides) 162 of the track support 160 in a snap fit arrangement as shown in FIG. 28. The snap fit feature may be a cantilever snap fit. However, other forms of snap fit connections commonly known in the art for securing the track section to the track support are applicable in the present invention. Equally, other forms of securing the track section to the track support besides a snap fit joint are applicable in the present invention, e.g. the use of fasteners or an adhesive.

In addition to thermal expansion of the different components of the supporting framework structure and the track support structure discussed above, one or more tracks of the plurality of tracks are also susceptible to thermal expansion. This is particularly the case where the plurality of tracks are separately mounted to the track supports. In the case, where the track is composed of a plastic material and the track support is largely composed of metal, there will be a disparity in the thermal expansion coefficients between the tracks and the underlying track support to the extent that there will be differential movement between both components as a result of thermal expansion. As each of the plurality of track sections comprises track elements extending in substantially transverse directions, relative movement between one or more of the plurality of track sections and the underlying track support structure are largely concentrated around the region of the track elements extending from the nodes of the track sections. A node in a track section is the area where the track elements in a given track section intersect. In the case, where the plurality of tracks are firmly secured to the underlying track support structure, differential movement between one or more of the plurality of tracks and the underlying track support as a result of the differences in thermal expansion between the track and the track support may cause the one or more of the tracks to distort. For example, where the underlying track support thermally expands to a greater extent than the track, the forces generated as a result of thermal expansion of the track support may have a tendency to impact the connection between the track and the track support. In a worst case scenario, the difference in thermal expansion between the track and the track support may result in the connection between the tracks and the track support failing ultimately leading to delamination or detachment of one or more tracks from the track support. As the plurality of track sections are snap-fitted to the track support structure, failure of the connection between the one or more of the plurality of tracks and one or more of the underlying track supports largely occurs at the snap-fitted joints between the plurality of tracks and the track support structure.

To mitigate the relative movement between the plurality of tracks and the underlying track support structure as a result of thermal expansion, the connection between each of the track sections and the underlying track support comprises a slip or movement joint. Where the connection between each of the plurality of track sections 180*a* and the underlying track support structure 160 comprises a snap-fitting joint, the snap-fitting joint between the track section and the track support is configured such that the connection allows one or more of the track section elements 181, 187 to expand or contract along a substantially horizontal direction, i.e. along the plane in which the track system lies, but is prevented from movement in a substantially vertical direction to prevent the track section 180*a* from detaching from the underlying track support 160. To accommodate a thermal expansion joint within a snap-fitting joint, the one or more slots 168 in the opposing vertical side walls 162 of the track support 160 are enlarged in or more directions so as to permit movement of the lugs or tabs 190 within the one or more slots 168 in the track support 160. As shown in FIG. 22, each slot 168 is orientated such that the longest edge of the slot extends in the direction of the longitudinal length of the track support 160 and the shortest edge (i.e. width of the slot) extends in the direction substantially perpendicular to the longitudinal length of the track support. The orientation of the slot is such that the lugs or tabs 190 engaged with the slots 168 permits the lugs or tabs 190 to move along the slots 168 which in turn allows expansion or contraction of the track section elements 181, 187 attached thereto relative to the underlying track support 160. Equally, plausible is that expansion or contraction of the underlying track support 160 as a result of thermal expansion causes the slots 168 to move relative to the lugs or tabs 190 engaged therein. Various other means to incorporate a slip or movement joint in the connection between one or more of the plurality of tracks and the underlying track support structure. For example, the connection between each of the plurality of tracks and the underlying track support structure can comprises one or more runners, e.g. telescopic drawer runners. Other means to provide one or more slip joints in the connection between each of the plurality of track sections, in particular the track elements of the track sections, include replacing the one or more slots in the opposing side walls of the track support with a depression that extends along the longitudinal length of the track support and configured to cooperate with the lugs or tabs of the tracks in a slide arrangement. Like the one or more slots, the one or more tabs or lugs of the track sections are configured to snap fit with the depression.

To accommodate for the thermal expansion of one or more of the plurality of track sections in the track system, the distal ends of the track section elements 181, 187 of adjacent track sections 180a are spaced apart. The spacing is sufficient to allow the track elements of adjacent track sections to expand on the underlying track support such that their respective distal ends connect or butt-up without buckling. The spacing is also dependent of the diameter of the wheels of the robotic load handling device operable on the track system. If the spacing between the distal ends of adjacent track elements is too large in comparison to the diameter of the wheel, this has the effect of introducing a step between adjacent track elements causing the wheels of the robotic load handling device to snag or bump the ends of the track elements and in a worst case scenario cause the wheel to sink or fall within the gap created by the spacing between adjacent track elements. The spacing should be sufficient to allow the wheels of the robotic load handling device to traverse across the gap created by the spacing between the distal ends of adjacent track sections without excessive snagging of the wheels but not too big for the wheels to sink or fall within the gap. The spacing between the distal ends of adjacent track elements of adjacent track sections in the track system is comparable to the spacing between adjacent vertical uprights of adjacent prefabricated frames in the supporting framework structure, namely, the spacing is in the range 0.5 mm to 3 mm, preferably, between 1 mm to 2 mm, more preferably between 1.5 mm to 2 mm. The spacing between the distal ends of the track elements is largely influenced by the thermal expansion of one or more prefabricated frames of the supporting framework structure. Typically, for a wheel having a diameter of about 120 mm, the spacing can be up to 6 mm without excessive snagging or sinking of the wheels within the gap.

Figures 29A, 29B, 29C:
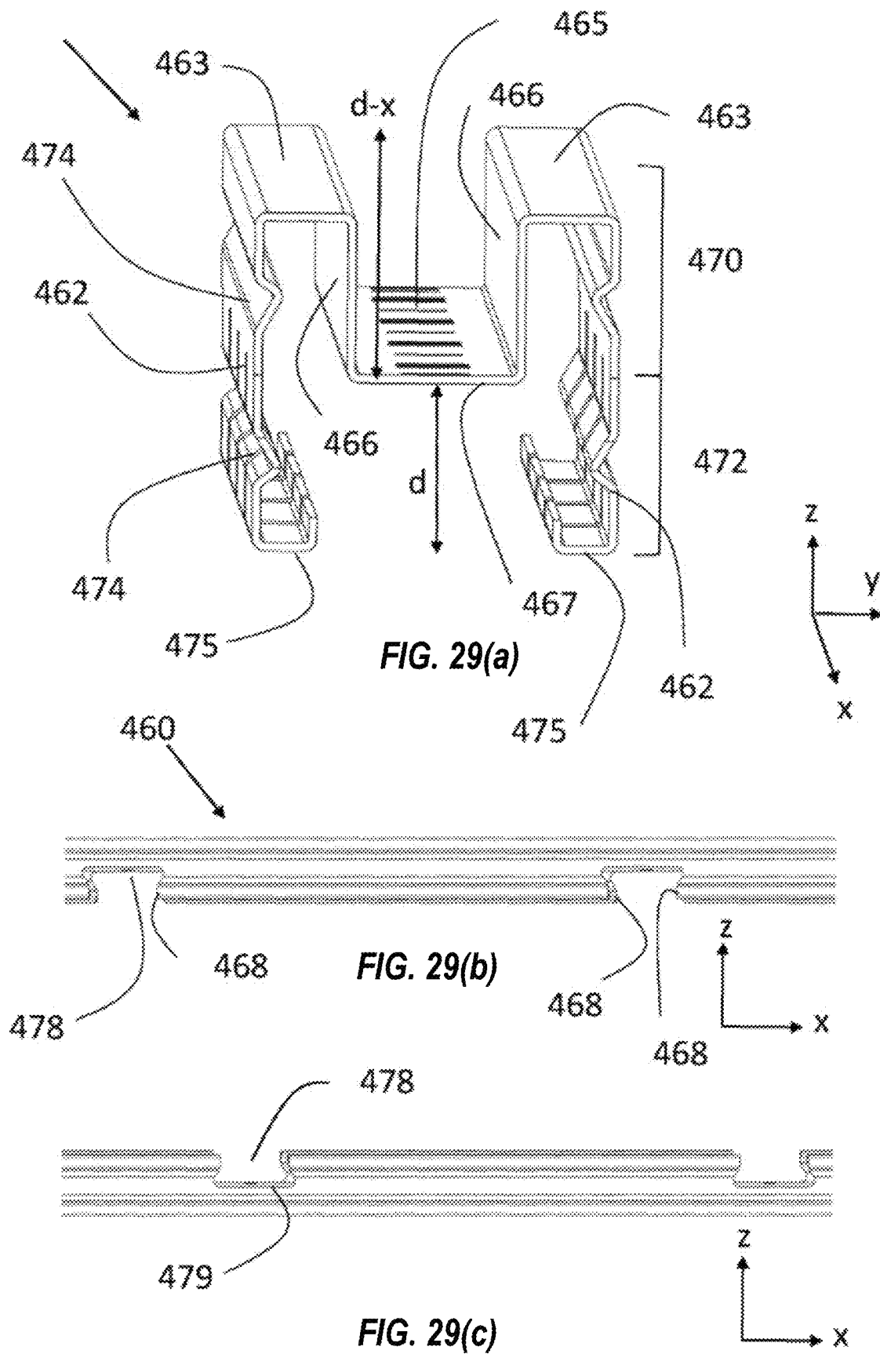
FIG. 29(*a*) is a cross sectional profile of an alternative embodiment of a track support.

A further embodiment of the track support is shown in FIG. 29. The track support 460 is formed from a sheet metal blank. In particular, the sheet metal blank comprises steel, preferably galvanized steel. The sheet metal blank used for forming the track support of FIG. 29 is roll-formed into an H-shape, as shown in FIG. 29(a). The track support 460 comprises a pair of vertical sides 462, a pair of horizontal elevated flanges 463, and a U-shaped portion 465 located centrally within the track support 460. The U-shaped portion comprises a pair of vertical edges extending parallel to and interiorly to the pair of vertical sides 462. The U-shaped portion 465 also comprises a horizontal edge 467 extending between the pair of vertical edges. Specifically, the horizontal edge 467 is positioned approximately centrally of the H-shape with respect to both the width and the height of the H-shaped track support.

The track support 460 comprises an upper portion 470 and a lower portion 472. The upper portion 470 comprises the pair of horizontal elevated flanges 463, the U-shaped portion 465 and approximately half the height of each of the vertical sides 462. The lower portion 472 comprises approximately half the height of each of the vertical sides 462. The vertical sides 462 comprise indentations 474 in both the upper portion 470 and the lower portion 472 to increase the rigidity of the track support. The free ends of the vertical sides 462 are folded inwards to further increase the rigidity of the track support and to create a horizontal base comprising a pair of horizontal base flanges 475.

Each track support is elongated in that it extends in either the x or y direction depending on the direction in which it is orientated. In particular, the track support 460 shown in FIG.

29(a) extends in the x direction. The track support may have a length of 4 grid cells equating to between approximately 2.2 m to 3.1 m. Each track support 460 comprises at least one cut-out 478. There may be a plurality of cut-outs 478 spaced along the length (in an x-direction) of the track support, as shown in FIG. 29(b) which is a side view of the track support of FIG. 29(a) along the x direction. There may be 2, 3, 4, 5, 6, 7, 8, 9, or 10 cut-outs 478 in each track support 260. The track support 460 comprises a plurality of pairs of protrusions 468, each pair of protrusions protruding into each of the cut-outs 478 to create a profile which corresponds with a portion of the cross-sectional profile of the H-shaped track support. FIG. 29(b) shows that the cut-outs 478 are facing downwards, but the same track support 460 can be rotated 180 degrees about the longitudinal direction such that the cut-outs 478 are facing upwards, as shown in FIG. 29(c). The same track supports can be used throughout the track system such that a second set of track supports 460A extending in a second direction have the cut-outs 478 facing upwards (as shown in FIG. 29(c)) and a first set of track supports 460 extending in a first direction have the cut-outs 478 facing downwards (as shown in FIG. 29(b)), wherein the second direction is substantially perpendicular to the first direction. The first set of track supports intersect the second set of tracks and vice versa at one or more nodes in the track system and this is achieved by coupling each cut-out of the first set of track supports with each cut-out of the second set of track supports.

Figures 30A, 30B, 30C:
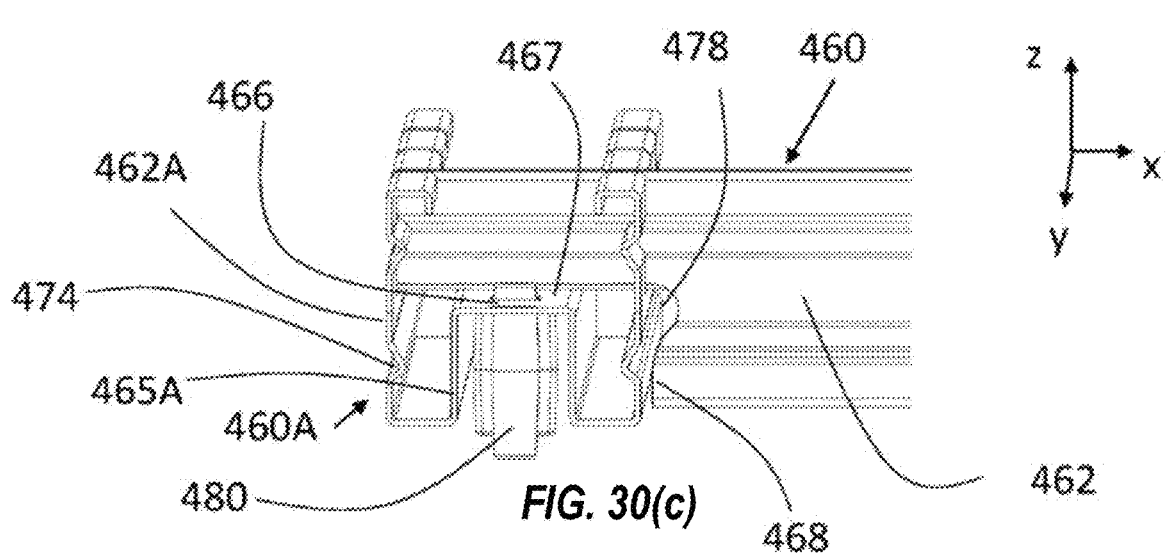
FIG. 30(*a*) is a side view of the track support of FIGS. 29(*a*) and 29(*b*) intersecting the track support of FIG. 29(*c*).

FIGS. 30(a)-(c) show the coupling of the cut-outs 478 of perpendicularly extending track supports more clearly. FIG. 30(a) illustrates a second track support 460A extending in a second direction (in this case, a y direction) and a first track support 460 extending in a first direction (x direction), the second direction being substantially perpendicular to the first direction. The second track support 460A comprises upwardly facing cut-outs 478A whilst the first track support 460 comprises downwardly facing cut-outs 478. Each downwardly facing cut-out 478 of the first track support 460 couples with each upwardly facing cut-out 478A of the second track support 460A at each node. This interaction can be achieved by aligning the downwardly facing cut-outs 478 of the first track support 460 with the upwardly facing cut-outs 478A of the second track support 460A and then lowering the first track support 460 in a substantially vertical direction onto the second track support 460A. Specifically, and as shown in FIG. 30(a) to (c), the U-shaped portion 465 of the first track support 460 rests on the U-shaped portion 465A of the second track support 460A. The vertical sides 462 defining the cut-out 478 on the first track support 460 touch the vertical sides 462A defining the cut-out 478A of the second track support 460A, therefore reducing movement of the first track support 460 along the second direction. In particular, the profile of each cut-out 478 corresponds to half the height of the track support. The protrusions 468 in the vertical sides 462 of the track supports 460 are positioned and shaped such that they fit within and/or around the indentations 474 within the vertical sides of a perpendicularly arranged track support. Beneath the U-shaped portion of the second track support 460A is an anti-crush device 480 which is shown more clearly in FIG. 31. The anti-crush device is located away from the nodes or intersections of the track supports. The anti-crush device 480 is a cast steel component that allows connection of the second support track 460A to the horizontal bracing member. As shown in FIG. 30(c), a portion of the anti-crush device 480 fits within holes 466 in the track support 460A, specifically in the horizontal edge 467 of the U-shaped portion 465 of the second track support 460A.

Figures 31A, 31B, 32:
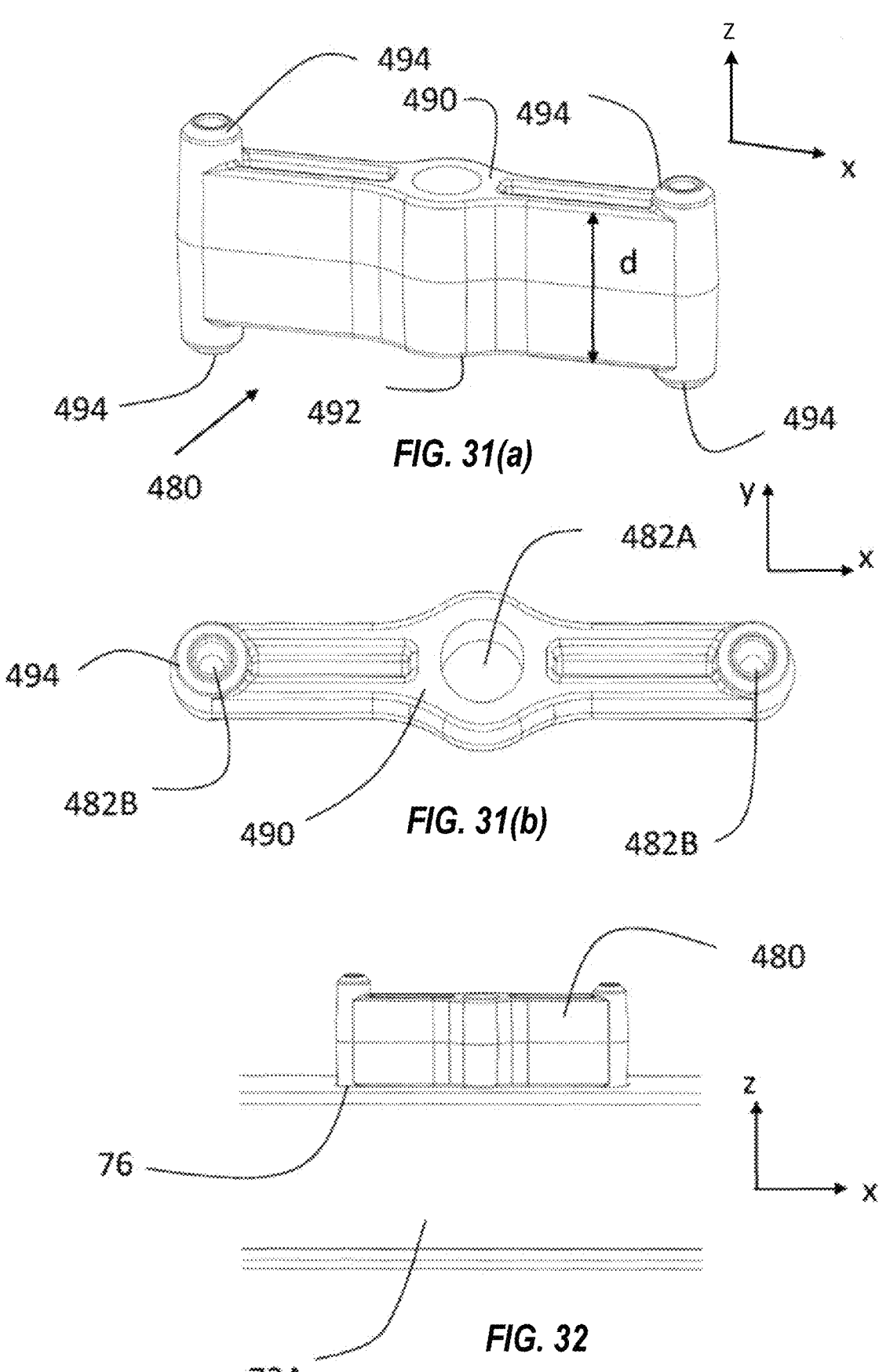
FIG. 32 is a side view of an anti-crush device positioned on a horizontal bracing member.

FIGS. 31(*a*) and (*b*) illustrates the anti-crush device 480 in isolation. The anti-crush device 480 is an elongated component comprising a pair of raised positioning features 494 on a top surface 490 of the anti-crush device and a pair of raised positioning features 494 on a bottom surface 492 of the anti-crush device. Each raised positioning feature 494 is located at each free end of the anti-crush device and each raised positioning feature 494 extends in a vertical direction (z-direction). The pair of raised positioning features 494 on the bottom surface 492 are shaped such that they fit within slots 76 formed in a top surface of an upper horizontal bracing member 72A. This is shown in FIG. 32. Similarly, the pair of raised positioning features 494 on the top surface 490 are shaped such that they fit within holes 466 in the track support 460. The holes 466 in the track support 460 are located in the U-shaped portion, specifically in the horizontal edge 467 of the U-shaped portion 465, as shown in FIG. 30(*c*).

The anti-crush device comprises openings 482 that extend from the top surface 490 to the bottom surface 492, i.e. the openings extend in a z (vertical) direction. One opening 482A is centrally positioned along the length (x direction) of the anti-crush device. A pair of openings 482B are positioned within the raised positioning features 494 on either side of the anti-crush device, and therefore extend in a z (vertical) direction down the raised positioning features 494 from the top surface 490 to the bottom surface 492. Each opening 482 comprises threading (not shown) that can threadingly engage with a (threaded) screw or bolt, such that the anti-crush device can be attached to the overlying track support and the underlying horizontal bracing member by the screw or bolt and a nut. Alternatively, each opening 482 extending from either the top surface 490 or the bottom surface 492 may extend along a portion of the height (z-direction) of the anti-crush device. For example, each opening may extend along substantially half, or substantially a third of the height of the anti-crush device, such that the openings 482 in the top surface 490 of the anti-crush device 480 do not connect to the openings 482 in the bottom surface 492 of the anti-crush device. In this configuration, a screw or bolt can be used to connect the anti-crush device to the overlying track support via the opening in the top surface 490 of the anti-crush device, and a separate screw or bolt can be used to connect the anti-crush device to the underlying horizontal bracing member 72A via the opening in the bottom surface 492 of the anti-crush device. As shown in FIG. 31, the central opening 482A has a larger diameter than the pair of openings 482B within the raised positioning features 494, so a larger bolt or screw can be used in the central opening compared to the bolts used in the pair of openings 482B within the raised positioning features 494.

Figure 33A:
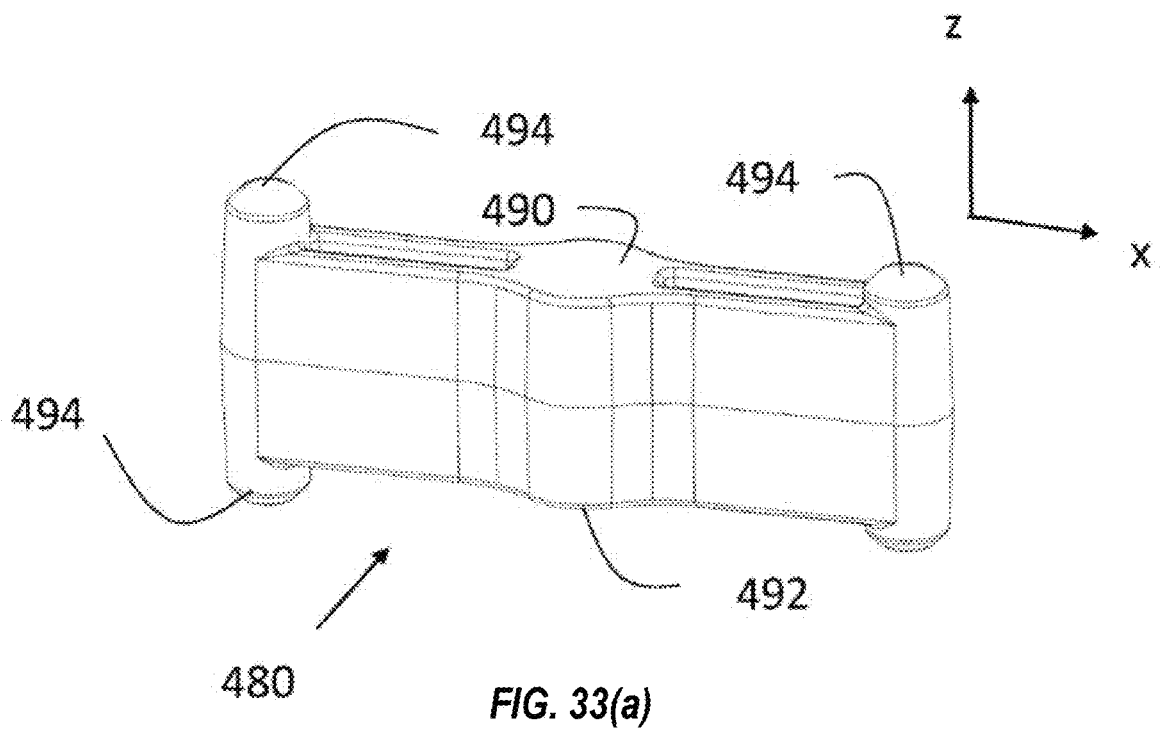
FIG. 33(*a*) is a perspective view of an alternative embodiment of an anti-crush device.
Figure 33B:
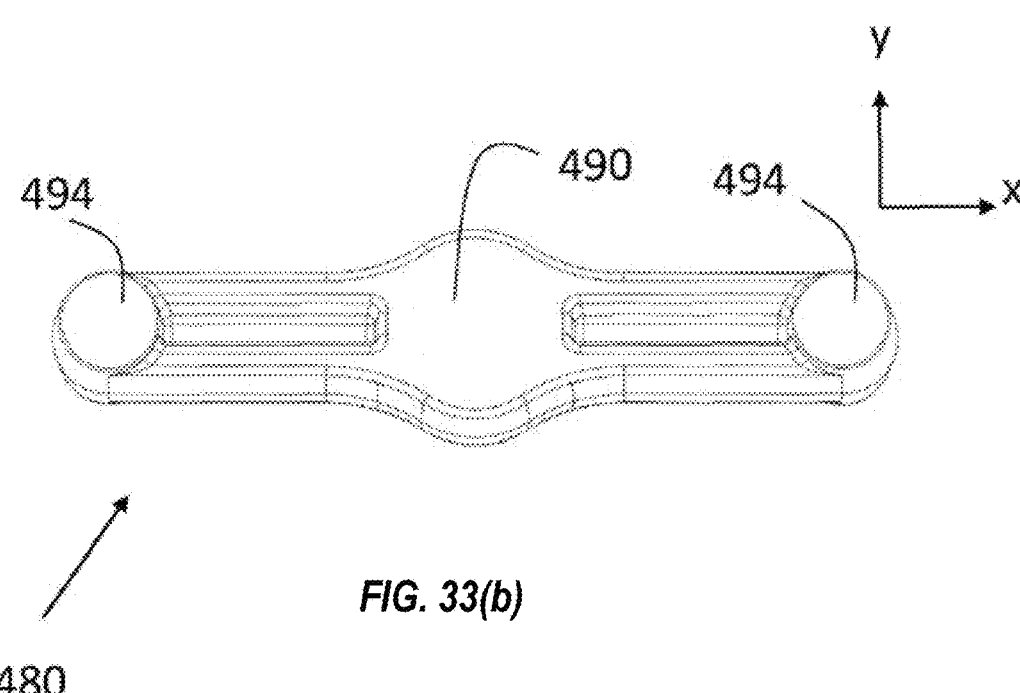

In an alternative embodiment of the anti-crush device, as shown in FIGS. 33(*a*) and (*b*), the anti-crush device does not comprise screw or bolt holes, but has the same size and shape as the anti-crush device shown in FIGS. 31(*a*) and (*b*). In this configuration, the one or more anti-crush devices simply rest on the underlying horizontal bracing members and the track supports rest on the one or more anti-crush devices. The raised positioning features 494 in this embodiment are particularly useful because they enable the anti-crush device to be fitted onto and held in place on the horizontal bracing member and enable the track support to be fitted onto the anti-crush device such that the anti-crush device does not move in a longitudinal direction.

Figure 34A:
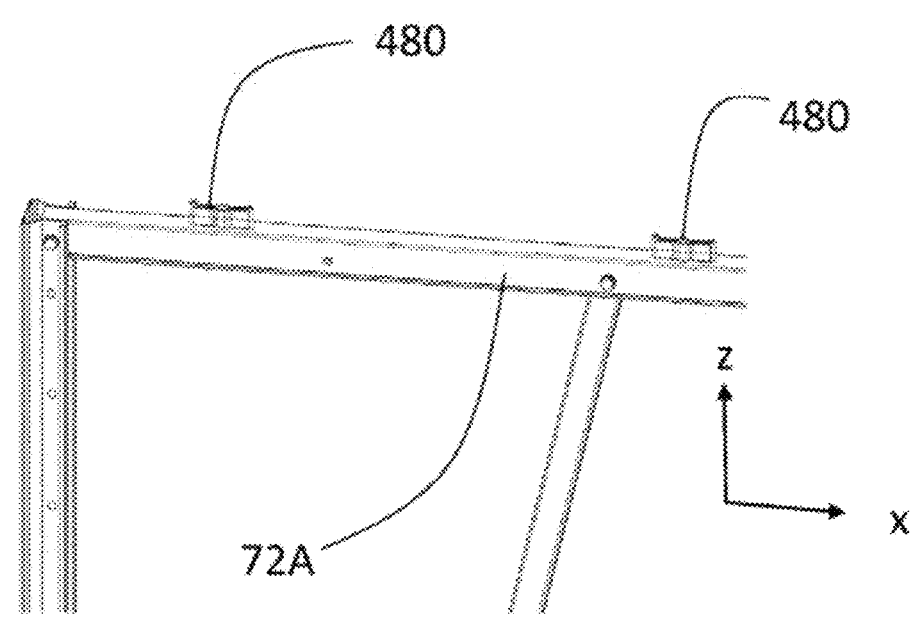
FIG. 34(*a*) is a perspective view of two anti-crush devices positioned on a horizontal bracing member.
Figure 34B:
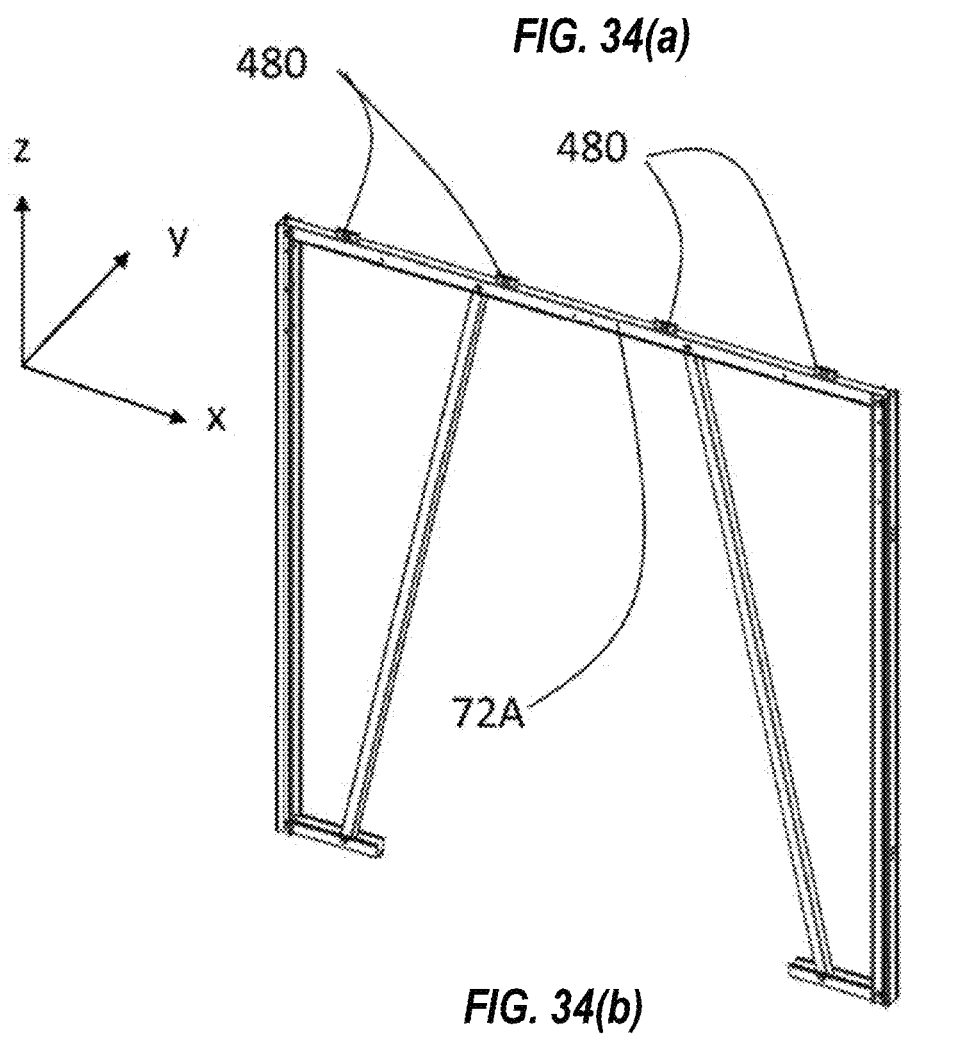
Figure 35A:
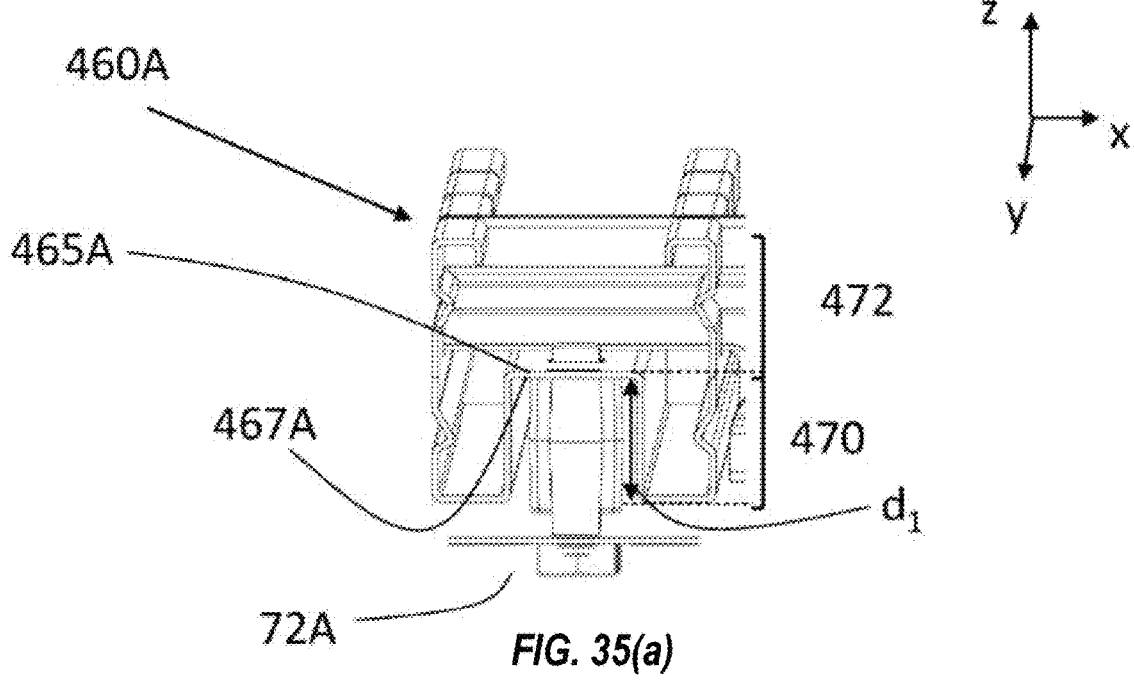
FIG. 35(*a*) is a perspective view of an anti-crush device in position between a track support and a horizontal bracing member.
Figure 35B:
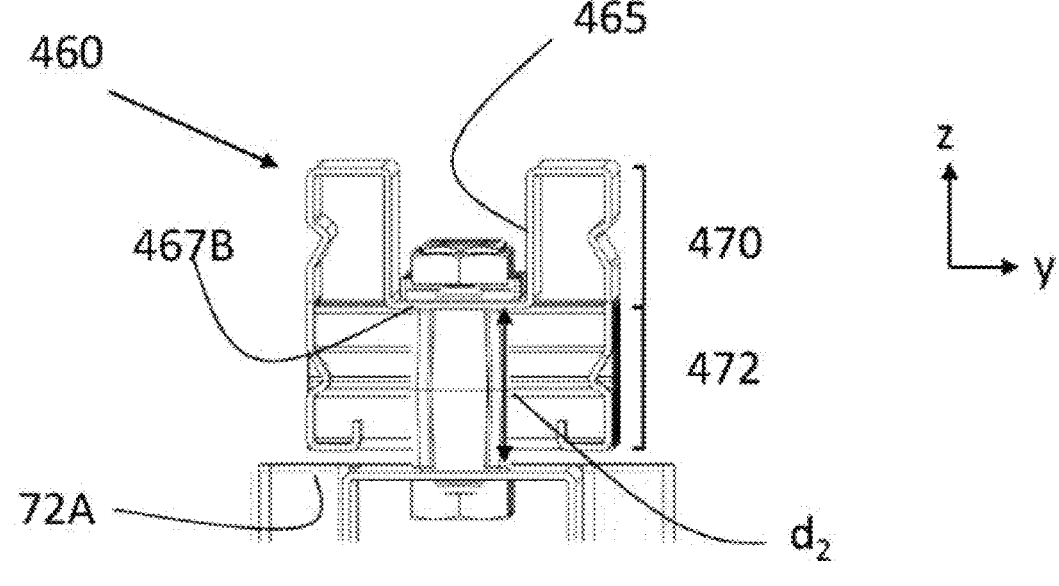

The anti-crush device is designed to be positioned such that it extends in the same direction as the length of the horizontal bracing member, for example the anti-crush device is positioned to extend in an x-direction along a horizontal bracing member extending in the x-direction, and the anti-crush device is positioned to extend in a y-direction along a horizontal bracing member extending in the y-direction. This is shown in FIG. 34(*a*), where two anti-crush devices 480 are orientated such that they extend in the x direction and are connected to a horizontal bracing member 72A which also extends in the x direction. FIG. 34(*b*) shows a complete horizontal bracing member 72A extending in the x direction and four anti-crush devices 480 positioned on top of the horizontal bracing member 72A and extending in the x direction also. As described earlier, the anti-crush devices 480 are positioned away from the nodes between perpendicular track supports and are instead positioned under singular track supports positioned directly on the horizontal bracing members and extending in the same direction as the horizontal bracing members. To accommodate this, there are two anti-crush devices of different sizes and specifically different heights used throughout the grid framework structure. As explained previously and with reference to FIG. 35(*a*), when a second track support 460A is positioned on a horizontal bracing member 72A, the U-shaped portion 465 is inverted, as also shown in FIG. 30(*c*). The anti-crush device 480 is positioned between horizontal bracing member 72A and the inverted U-shaped portion 465A, such that the anti-crush device is located within the inverted U-shaped portion 465A. Additionally and with reference to FIG. 35(*b*), when the first track support 460 is positioned on a horizontal bracing member 72A, the U-shaped portion 465 is in a non-inverted orientation, such that the anti-crush device is located beneath the U-shaped portion 465. The height $d_1$ of the interior space within the U-shaped portion is smaller than the height $d_2$ of the space beneath the U-shaped portion when the U-shaped portion 465 is in a non-inverted orientation (shown in FIG. 35(*b*)). The difference in height between $d_1$ and $d_2$ is due to the thickness x of the sheet metal used to form the track support. The thickness x of the sheet metal is between 1.5 mm and 2 mm, preferably 1.6 mm. Thus, the height $d_2$ of the space beneath the U-shaped portion when the U-shaped portion 465 in a non-inverted orientation is $d_1$+x. Thus, an anti-crush device 480 having a height $d_1$ is used beneath the second set of track supports 460A, whilst the anti-crush device 480 having a height $d_2$ is used beneath the first set of track supports 460.

Whilst endeavoring to draw attention to the features of the invention believed to be of particular importance, it should be understood that the applicant claims protection in respect of any patentable feature or combinations of features referred to herein, and/or shown in the drawings, whether or not particular emphasis has been placed on them. Many variations and modifications not explicitly described above are possible without departing from the scope of the invention as defined in the appended claims.

Example Clauses

Further features of the invention may be described with reference to the following numbered clauses:

Clause 1. A track system for a storage and retrieval system comprising one or more load handling devices operable on the track system, the track system comprising a plurality of tracks upon which the load handling device may move on a grid structure, the plurality of tracks being arranged in a grid pattern to define a grid structure lying in a horizontal plane, each of the plurality of tracks is subdivided into a plurality of elongated track elements; wherein each of the plurality of elongated track elements is formed from a sheet metal blank comprising at least two bend lines to form a substantially U-shaped cross section having a top and bottom flange and a vertical element extending between the top and bottom flanges, wherein one of more of the plurality of tracks is integrated into the top flange.

Clause 2. A track system for a storage and retrieval system comprising one or more load handling devices operable on the track system, the track system comprising a plurality of tracks arranged in a grid pattern comprising a plurality of grid cells upon which the load handling device may move on a grid structure, the plurality of tracks being arranged in a grid pattern to define a grid structure lying in a horizontal plane, each of the plurality of tracks is subdivided into a plurality of elongated track elements; wherein the track system further comprises a track support structure comprising a plurality of track supports arranged in a grid pattern corresponding to the grid pattern of the track system, wherein each of the plurality of track supports is formed from a sheet metal blank comprising at least two bend lines to form a substantially U-shaped cross section having a top and bottom flange and a vertical element extending between the top and bottom flanges, wherein one or more of the plurality of tracks is mounted onto the track support structure.

Clause 3. The track system according to any preceding clause, wherein the U-shaped cross section is formed by cold rolling.

Clause 4. The track system according to any preceding clause, wherein the sheet metal blank comprises steel.

Clause 5. The track system according to any one of clauses 2 to 4, wherein the track is mounted onto the top flange by a fastener.

Clause 6. The track system according to clause 5, wherein the fastener comprises one or more U-shaped brackets configured to clamp the top flange against the track.

Clause 7. The track system according to any one of clauses 2 to 6, wherein the track comprises a recess for receiving the track support.

Clause 8. The track system according to any one of clauses 2 to 7, wherein the track is configured to snap-fit onto the track support.

Clause 9. The track system according to any one of clauses 2 to 8, wherein the track comprises plastic.

Clause 10. The track system according to any preceding clause, wherein the track comprises steel.

Clause 11. The track system according to any preceding clause, wherein the track comprises a raised central region running along the longitudinal length of the track.

Clause 12. The track system of clause 11, wherein the track comprises a pair of depressions running side by side along the longitudinal length of the track, wherein the pair of depressions define a path for the one or more load handling devices.

Clause 13. A track system according to any preceding clause, wherein the plurality of tracks are subdivided into a plurality of track sections, each track sections comprising a first track section element extending in the first direction and a second track section element extending in the second direction.

Clause 14. A track system according to clause 13, wherein each track section is formed as a single integral body.

Clause 15. A grid framework structure for a storage and retrieval system, comprising: a track system as claimed in any preceding clause; a supporting framework structure supporting the track system; and a plurality of stacks of containers arranged in storage columns located below the track system.

Clause 16. A storage and retrieval system, comprising the grid framework of clause 15 and one or more load handling devices for lifting and moving containers stacked in the stacks, each load handling device comprising: a wheel assembly for moving the load handling device on the track system; a container-receiving space located above the track system; and a lifting device arranged to lift a single container from a stack into the container-receiving space.

What is claimed is:

1. A grid framework structure for a storage and retrieval system, comprising:
   a track system, comprising:
      a plurality of tracks arranged in a grid pattern for guiding one or more load handling devices operable on the track system;
      a plurality of track supports arranged in a grid pattern comprising a first set of track supports extending in a first direction and a second set of track supports extending in a second direction, the second direction being substantially perpendicular to the first direction such that the first set of track supports intersect the second set of track supports at one or more nodes in the track system, each of the plurality of track supports being formed from a sheet metal blank folded along a plurality of bend lines, wherein the first set of track supports intersects the second set of track supports by the second set of track supports being received within one or more cut-outs in the first set of track supports at the one or more nodes in the track system; and
   one or more anti-crush devices, wherein:
      the one or more anti-crush devices are interposed between a supporting framework structure and the track supports,
      the one or more anti-crush devices each comprise at least one raised positioning feature, and the plurality of track supports and the supporting framework structure each comprise one or more holes for accommodating at least one raised positioning feature of the one or more anti-crush devices, and
      the at least one raised positioning feature comprises a pair of raised positioning features on a top surface of an anti-crush device and a pair of raised positioning features on a bottom surface of the one or more anti-crush devices;
   the supporting framework structure supporting the track system; and
   a plurality of stacks of containers arranged in storage columns located below the track system.

2. The grid framework structure according to claim 1, wherein each of the one or more anti-crush devices comprise cast steel.

3. The grid framework structure according to claim 1, wherein the one or more anti-crush devices comprise a plurality of anti-crush devices.

4. The grid framework structure according to claim 1, further comprising:
   one or more load handling devices for lifting and moving containers stacked in stacks, each respective load handling device of the one or more load handling devices comprising:
      a wheel assembly for moving the respective load handling device on the track system;

a container-receiving space located above the track system; and a lifting device arranged to lift a single container from a stack into the container-receiving space.

5. A grid framework structure for a storage and retrieval system, comprising:

a track system, comprising:

a plurality of tracks arranged in a grid pattern for guiding one or more load handling devices operable on the track system;

a plurality of track supports arranged in a grid pattern comprising a first set of track supports extending in a first direction and a second set of track supports extending in a second direction, the second direction being substantially perpendicular to the first direction such that the first set of track supports intersect the second set of track supports at one or more nodes in the track system, each of the plurality of track supports being formed from a sheet metal blank folded along a plurality of bend lines, wherein the first set of track supports intersects the second set of track supports by the second set of track supports being received within one or more cut-outs in the first set of track supports at the one or more nodes in the track system; and one or more anti-crush devices, wherein the one or more anti-crush devices are interposed between a supporting framework structure and the track supports, wherein the one or more anti-crush devices are positioned between nodes in the track system;

the supporting framework structure supporting the track system; and a plurality of stacks of containers arranged in storage columns located below the track system.

6. The grid framework structure according to claim 5, wherein the one or more anti-crush devices are attachable to the supporting framework structure and the track supports.

7. The grid framework structure according to claim 5, wherein the one or more anti-crush devices extend in a same direction as the track supports above the one or more anti-crush devices.

8. The grid framework structure according to claim 5, wherein the one or more anti-crush devices are spatially distributed in a direction along a length of the track system and/or the supporting framework structure.

9. The grid framework structure of claim 5, wherein each respective track support of the plurality of track supports comprises a plurality of slots spaced apart in a direction along a longitudinal length of the respective track support, and each respective track of the plurality of tracks comprises a plurality of tabs for engaging with the plurality of slots in a track support of the plurality of track supports so as to prevent the plurality of tracks from detaching from the plurality of track supports.

\* \* \* \* \*